(12) United States Patent
Khoshnevisan et al.

(10) Patent No.: US 11,818,723 B2
(45) Date of Patent: Nov. 14, 2023

(54) DOWNLINK ASSIGNMENT INDEX FOR MULTI-COMPONENT CARRIER SCHEDULING

(71) Applicant: QUALCOMM Incorporated, San Diego, CA (US)

(72) Inventors: Mostafa Khoshnevisan, San Diego, CA (US); Kazuki Takeda, Tokyo (JP); Xiaoxia Zhang, San Diego, CA (US); Peter Gaal, San Diego, CA (US); Wanshi Chen, San Diego, CA (US); Alberto Rico Alvarino, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/157,944

(22) Filed: Jan. 25, 2021

(65) Prior Publication Data
US 2021/0258998 A1    Aug. 19, 2021

Related U.S. Application Data

(60) Provisional application No. 62/977,003, filed on Feb. 14, 2020.

(51) Int. Cl.
*H04W 72/23* (2023.01)
*H04B 7/0456* (2017.01)
(Continued)

(52) U.S. Cl.
CPC .......... *H04W 72/23* (2023.01); *H04B 7/0456* (2013.01); *H04L 1/1819* (2013.01); *H04L 5/0055* (2013.01); *H04W 72/535* (2023.01)

(58) Field of Classification Search
CPC .......... H04W 72/1289; H04W 72/1257; H04B 7/0456; H04L 1/1819; H04L 5/0055;
(Continued)

(56) References Cited

U.S. PATENT DOCUMENTS

2011/0243066 A1   10/2011   Nayeb Nazar et al.
2017/0244532 A1*  8/2017   Lee ...................... H04W 72/042
(Continued)

FOREIGN PATENT DOCUMENTS

CN         107210889 A     9/2017
WO     WO-2019172624 A1   9/2019

OTHER PUBLICATIONS

Partial International Search Report—PCT/US2021/015249—ISA/EPO—dated May 3, 2021 (202207WO).
(Continued)

*Primary Examiner* — Sharmin Chowdhury
(74) *Attorney, Agent, or Firm* — Holland & Hart LLP

(57) ABSTRACT

Methods, systems, and devices for wireless communications are described. A user equipment (UE) may provide hybrid automatic repeat request (HARQ) feedback for multiple physical channels (e.g., multiple physical downlink shared channels (PDSCH)) scheduled via multi-component carrier. The UE may monitor control channel occasions (e.g., physical downlink control channel (PDCCH) occasions), to receive wireless communications from a base station (e.g., a next-generation NodeBs (gNB)). For example, the UE may receive multiple downlink control information (DCI) messages that may schedule multiple PDSCH over different component carriers. The UE may identify one or multiple downlink assignment indices (DAI) in the received DCI messages. In some examples, the UE may generate one or more feedback bits of a HARQ feedback codebook (also referred to as an acknowledgement codebook). The one or
(Continued)

more feedback bits include a same number of feedback bits for each downlink assignment index associated with each DCI message.

29 Claims, 21 Drawing Sheets

(51) Int. Cl.
*H04L 5/00* (2006.01)
*H04L 1/1812* (2023.01)
*H04W 72/50* (2023.01)

(58) Field of Classification Search
CPC ... H04L 1/1861; H04L 1/1896; H04L 5/0044; H04L 5/0053; H04L 5/0094; H04L 1/1614
See application file for complete search history.

(56) References Cited

U.S. PATENT DOCUMENTS

| | | | |
|---|---|---|---|
| 2018/0006790 A1 | 1/2018 | Park et al. | |
| 2020/0015229 A1 | 1/2020 | Yang et al. | |
| 2020/0169990 A1* | 5/2020 | Takeda | H04W 72/042 |
| 2021/0058189 A1* | 2/2021 | Xiao | H04L 5/0053 |
| 2021/0143943 A1* | 5/2021 | Zhou | H04W 72/53 |
| 2021/0368453 A1* | 11/2021 | Lee | H04W 72/0413 |
| 2022/0150030 A1* | 5/2022 | Li | H04L 1/1864 |
| 2022/0166555 A1* | 5/2022 | Takeda | H04L 5/0094 |
| 2022/0174707 A1* | 6/2022 | Kim | H04W 72/0413 |
| 2022/0190980 A1* | 6/2022 | Matsumura | H04L 5/0035 |
| 2022/0272733 A1* | 8/2022 | Gou | H04W 24/08 |
| 2022/0385411 A1* | 12/2022 | Lei | H04L 1/1812 |
| 2023/0038293 A1* | 2/2023 | Liu | H04L 1/1861 |

OTHER PUBLICATIONS

ZTE Corporation: "Remaining Issues on Cross-Carrier Scheduling", 3GPP Draft, 3GPP TSG RAN WG1 Meeting #99, R1-1911974, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823155, 5 Pages, Retrieved from the Internet: URL: https://ftp.3gpp.org/tsg_ran/WG1_RL1/TSGR1_99/Docs/R1-1911974.zip. R1-1911974 RemaTning issues on cross-carrier scheduling.docx [retrieved on Nov. 9, 2019] figures 2-3 section 3.
International Search Report and Written Opinion—PCT/US2021/015249—ISA/EPO—Jun. 25, 2021 (202207WO).

* cited by examiner

DOWNLINK ASSIGNMENT INDEX FOR MULTI-COMPONENT CARRIER SCHEDULING

CROSS REFERENCE

The present application for patent claims the benefit of U.S. Provisional Patent Application No. 62/977,003 by KHOSHNEVISAN et al., entitled "DOWNLINK ASSIGNMENT INDEX FOR MULTI-COMPONENT CARRIER SCHEDULING," filed Feb. 14, 2020, assigned to the assignee hereof, and expressly incorporated by reference herein.

FIELD OF TECHNOLOGY

The following relates generally to wireless communications and more specifically to downlink assignment index (DAI) for multi-component carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support multiple component carriers for communications between UEs and base stations.

SUMMARY

Various aspects of the described techniques relate to configuring a communication device, which may otherwise be known as user equipment (UE), to provide hybrid automatic repeat request (HARQ) feedback for multiple physical channels (e.g., multiple physical downlink shared channels (PDSCH)) scheduled via multi-component (e.g., cross component) carrier, for example, in fifth generation (5G) systems. The UE may monitor control channel occasions (e.g., physical downlink control channel (PDCCH) occasions), to receive wireless communications from another communication device (e.g., a next-generation NodeBs or giga-NodeBs (either of which may be referred to as a gNB)). For example, the described techniques may be used to configure the UE to receive multiple downlink control information (DCI) messages that may schedule multiple PDSCH over different component carriers. The UE may identify one or multiple downlink assignment indices (DAI) in the received DCI messages. In some examples, the UE may generate one or more feedback bits of a HARQ feedback codebook (also referred to as an acknowledgement codebook). The one or more feedback bits include a same number of feedback bits for each downlink assignment index associated with each DCI message.

Various aspects of the described techniques may improve coverage for wireless communications by supporting HARQ feedback for multiple PDSCH scheduled via multi-component carrier. For example, the UE may provide increased flexibility for wireless communications (e.g., control information, data) and improvements to the reliability of the wireless communications in 5G systems. The UE may receive multiple PDSCH over multiple carriers and acknowledge receipt of each of the multiple PDSCH by providing HARQ feedback while maintaining low signaling overhead and system flexibility. The described techniques may also include features for improvements to power consumption and, in some examples, may promote enhanced efficiency for high reliability and low latency operations in 5G systems, among other benefits.

A method of wireless communication at a UE is described. The method may include receiving a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identifying a set of DAI in the received set of DCI messages, each DCI message of the set of DCI messages including a unique DAI of the set of DAI, generating a set of feedback bits of an acknowledgement codebook, the set of feedback bits including a same number of feedback bits for each DAI of the set of DAI, and transmitting the generated set of feedback bits on an uplink control channel.

An apparatus for wireless communication is described. The apparatus may include a processor, memory coupled with the processor, and instructions stored in the memory. The instructions may be executable by the processor to cause the apparatus to receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identify a set of DAI in the received set of DCI messages, each DCI message of the set of DCI messages including a unique DAI of the set of DAI, generate a set of feedback bits of an acknowledgement codebook, the set of feedback bits including a same number of feedback bits for each DAI of the set of DAI, and transmit the generated set of feedback bits on an uplink control channel.

Another apparatus for wireless communication is described. The apparatus may include means for receiving a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identifying a set of DAI in the received set of DCI messages, each DCI message of the set of DCI messages including a unique DAI of the set of DAI, generating a set of feedback bits of an acknowledgement codebook, the set of feedback bits including a same number of feedback bits for each DAI of the set of DAI, and transmitting the generated set of feedback bits on an uplink control channel.

A non-transitory computer-readable medium storing code for wireless communication at a UE is described. The code may include instructions executable by a processor to receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identify a set of DAI in the received set of DCI messages, each DCI message of the set of DCI messages including a unique DAI of the set of DAI, generate a set of feedback bits of an acknowledgement codebook, the set of feedback bits including a same number of feedback bits for each DAI of the set of DAI, and transmit the generated set of feedback bits on an uplink control channel.

In some examples of the method, apparatuses, and non-transitory computer-readable medium described herein each unique DAI associated with each DCI message of the set of DCI messages are assigned a single value by incrementing each unique DAI.

Some examples of the method, apparatuses, and non-transitory computer-readable medium described herein may further include operations, features, means, or instructions for ordering the set of DCI messages based on, for each DCI message of the set of DCI messages, one or more component carrier indices indicated by the DCI message or a control channel occasion associated with the DCI message, or both.

In some examples of the method, apparatuses, and non-transitory computer-readable medium described herein, a corresponding value of each unique DAI of the set of DAI for each DCI message of the set of DCI messages may be based on the ordering of the set of DCI messages.

In some examples of the method, apparatuses, and non-transitory computer-readable medium described herein, the value of each unique DAI of the set of DAI corresponds to one or more pairs of an accumulative number of DCI messages and control channel occasions associated with the number of DCI messages.

Some examples of the method, apparatuses, and non-transitory computer-readable medium described herein may further include operations, features, means, or instructions for identifying a component carrier index of the one or more component carrier indices that may be greater than one or more other component carrier indices of the one or more component carrier indices, where ordering the set of DCI messages may be based on the identified component carrier index of the one or more component carrier indices that may be greater than one or more other component carrier indices of the one or more component carrier indices for each DCI message of the set of DCI messages.

Some examples of the method, apparatuses, and non-transitory computer-readable medium described herein may further include operations, features, means, or instructions for identifying a component carrier index of the one or more component carrier indices that may be less than one or more other component carrier indices of the one or more component carrier indices, where ordering the set of DCI messages may be based on the identified component carrier index of the one or more component carrier indices that may be less than one or more other component carrier indices of the one or more component carrier indices for each DCI message of the set of DCI messages.

In some examples of the method, apparatuses, and non-transitory computer-readable medium described herein, generating the set of feedback bits of the acknowledgement codebook may include operations, features, means, or instructions for generating at least two feedback bits for each DAI of the set of DAI in the acknowledgement codebook. In some examples of the method, apparatuses, and non-transitory computer-readable medium described herein, the at least two feedback bits for a first downlink assignment index of the set of downlink assignment indices includes one feedback bit for the first downlink data channel and one feedback bit for the second downlink data channel. In some examples of the method, apparatuses, and non-transitory computer-readable medium described herein, the at least two feedback bits for a second downlink assignment index of the set of downlink assignment indices includes one feedback bit corresponding to either the first downlink data channel or the second downlink data channel and one non-acknowledgement (NACK) bit.

In some examples of the method, apparatuses, and non-transitory computer-readable medium described herein, generating the set of feedback bits of the acknowledgement codebook may include operations, features, means, or instructions for generating at least one feedback bit for each DAI of the set of DAI in the acknowledgement codebook based on a bundling rule.

In some examples of the method, apparatuses, and non-transitory computer-readable medium described herein, the at least one feedback bit includes acknowledgement information for the first downlink data channel and the second downlink data channel.

In some examples of the method, apparatuses, and non-transitory computer-readable medium described herein, the at least one feedback bit may be one feedback bit based on a binary AND operation of a first bit of acknowledgement information for the first downlink data channel and a second bit of acknowledgement information for the second downlink data channel.

In some examples of the method, apparatuses, and non-transitory computer-readable medium described herein, the at least one feedback bit includes acknowledgement information for the third downlink data channel.

Some examples of the method, apparatuses, and non-transitory computer-readable medium described herein may further include operations, features, means, or instructions for determining that at least one of the first component carrier or the second component carrier may be configured for a code block group-based feedback, where generating the set of feedback bits of the acknowledgement codebook may be based on the code block group-based feedback.

In some examples of the method, apparatuses, and non-transitory computer-readable medium described herein, generating the set of feedback bits of the acknowledgement codebook may include operations, features, means, or instructions for generating, for each unique DAI of the set of DAI for each DCI message of the set of DCI messages, a same number of feedback bits for the first component carrier and the second component carrier based on the determining.

Some examples of the method, apparatuses, and non-transitory computer-readable medium described herein may further include operations, features, means, or instructions for determining that the first component carrier may be configured for a code block group-based feedback and the second component carrier may be not configured for the code block group-based feedback, where generating the set of feedback bits of the acknowledgement codebook may be based on a code block group-based subcodebook.

In some examples of the method, apparatuses, and non-transitory computer-readable medium described herein, a number of acknowledgement bits related to the generated set of feedback bits of the acknowledgement codebook may be based on a multi-component carrier scheduling configuration of the UE.

Some examples of the method, apparatuses, and non-transitory computer-readable medium described herein may further include operations, features, means, or instructions for determining a power level for the uplink control channel transmitting the generated set of feedback bits based on the number of acknowledgement bits.

In some examples of the method, apparatuses, and non-transitory computer-readable medium described herein, a number of acknowledgement bits related to the generated set of feedback bits of the acknowledgement codebook may be based on a bundling configuration related to the generated set of feedback bits of the acknowledgement codebook.

A method of wireless communication at a base station is described. The method may include transmitting a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receiving a generated set of feedback bits of an acknowledgement codebook on an uplink control channel, the set of feedback bits including a same number of feedback bits for each DAI of a set of DAI.

An apparatus for wireless communication is described. The apparatus may include a processor, memory coupled with the processor, and instructions stored in the memory. The instructions may be executable by the processor to cause the apparatus to transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receive a generated set of feedback bits of an acknowledgement codebook on an uplink control channel, the set of feedback bits including a same number of feedback bits for each DAI of a set of DAI.

Another apparatus for wireless communication is described. The apparatus may include means for transmitting a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receiving a generated set of feedback bits of an acknowledgement codebook on an uplink control channel, the set of feedback bits including a same number of feedback bits for each DAI of a set of DAI.

A non-transitory computer-readable medium storing code for wireless communication at a base station is described. The code may include instructions executable by a processor to transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receive a generated set of feedback bits of an acknowledgement codebook on an uplink control channel, the set of feedback bits including a same number of feedback bits for each DAI of a set of DAI.

In some examples of the method, apparatuses, and non-transitory computer-readable medium described herein, the first component carrier and the second component carrier may be configured for a code block group-based feedback, and the generated set of feedback bits of the acknowledgement codebook may be based on the code block group-based feedback.

In some examples of the method, apparatuses, and non-transitory computer-readable medium described herein, the generated set of feedback bits of the acknowledgement codebook include a same number of feedback bits for the first component carrier and the second component carrier.

In some examples of the method, apparatuses, and non-transitory computer-readable medium described herein, the first component carrier may be configured for a code block group-based feedback and the second component carrier may be not configured for the code block group-based feedback, and the generated set of feedback bits of the acknowledgement codebook may be based on the code block group-based subcodebook.

In some examples of the method, apparatuses, and non-transitory computer-readable medium described herein, a number of acknowledgement bits related to the generated set of feedback bits of the acknowledgement codebook may be based on a multi-component carrier scheduling configuration of a UE.

In some examples of the method, apparatuses, and non-transitory computer-readable medium described herein, a number of acknowledgement bits related to the generated set of feedback bits of the acknowledgement codebook may be based on a bundling configuration related to the generated set of feedback bits of the acknowledgement codebook.

A method of wireless communication at a UE is described. The method may include receiving a set of DCI messages scheduling a set of downlink data channels, the set of DCI messages including at least a first DCI message scheduling a first downlink data channel of a first component carrier and a second downlink data channel of a second component carrier, identifying, in the first DCI message, one DAI for both the first downlink data channel and the second downlink data channel, generating a set of feedback bits corresponding to the set of downlink data channels, the set of feedback bits including a first feedback bit and a second feedback bit corresponding to the first downlink data channel and the second downlink data channel, assigning the first feedback bit to a first position in an acknowledgement codebook indicated by the one DAI and the second feedback bit to a second position in the acknowledgement codebook that is adjacent the first position, and transmitting the generated set of feedback bits on an uplink control channel.

An apparatus for wireless communication is described. The apparatus may include a processor, memory coupled with the processor, and instructions stored in the memory. The instructions may be executable by the processor to cause the apparatus to receive a set of DCI messages scheduling a set of downlink data channels, the set of DCI messages including at least a first DCI message scheduling a first downlink data channel of a first component carrier and a second downlink data channel of a second component carrier, identify, in the first DCI message, one DAI for both the first downlink data channel and the second downlink data channel, generate a set of feedback bits corresponding to the set of downlink data channels, the set of feedback bits including a first feedback bit and a second feedback bit corresponding to the first downlink data channel and the second downlink data channel, assign the first feedback bit to a first position in an acknowledgement codebook indicated by the one DAI and the second feedback bit to a second position in the acknowledgement codebook that is adjacent the first position, and transmit the generated set of feedback bits on an uplink control channel.

Another apparatus for wireless communication is described. The apparatus may include means for receiving a set of DCI messages scheduling a set of downlink data channels, the set of DCI messages including at least a first DCI message scheduling a first downlink data channel of a first component carrier and a second downlink data channel of a second component carrier, identifying, in the first DCI message, one DAI for both the first downlink data channel and the second downlink data channel, generating a set of feedback bits corresponding to the set of downlink data channels, the set of feedback bits including a first feedback bit and a second feedback bit corresponding to the first downlink data channel and the second downlink data channel, assigning the first feedback bit to a first position in an acknowledgement codebook indicated by the one DAI and the second feedback bit to a second position in the acknowledgement codebook that is adjacent the first position, and transmitting the generated set of feedback bits on an uplink control channel.

A non-transitory computer-readable medium storing code for wireless communication at a UE is described. The code may include instructions executable by a processor to receive a set of DCI messages scheduling a set of downlink data channels, the set of DCI messages including at least a first DCI message scheduling a first downlink data channel of a first component carrier and a second downlink data channel of a second component carrier, identify, in the first DCI message, one DAI for both the first downlink data channel and the second downlink data channel, generate a set of feedback bits corresponding to the set of downlink data channels, the set of feedback bits including a first feedback bit and a second feedback bit corresponding to the first downlink data channel and the second downlink data channel, assign the first feedback bit to a first position in an acknowledgement codebook indicated by the one DAI and the second feedback bit to a second position in the acknowledgement codebook that is adjacent the first position, and transmit the generated set of feedback bits on an uplink control channel.

Some examples of the method, apparatuses, and non-transitory computer-readable medium described herein may further include operations, features, means, or instructions for assigning a value to the one DAI, based on the first DCI message scheduling the first downlink data channel of the first component carrier and the second downlink data channel of the second component carrier, by incrementing a DAI count by two.

Some examples of the method, apparatuses, and non-transitory computer-readable medium described herein may further include operations, features, means, or instructions for assigning a value to a DAI of a second DCI message, based on the first DCI message scheduling the first downlink data channel of the first component carrier and the second downlink data channel of the second component carrier, by incrementing a DAI count by two, where the first DCI message precedes the second DCI message.

In some examples of the method, apparatuses, and non-transitory computer-readable medium described herein, receiving the set of DCI messages may include operations, features, means, or instructions for receiving a second DCI message scheduling a third downlink data channel.

Some examples of the method, apparatuses, and non-transitory computer-readable medium described herein may further include operations, features, means, or instructions for assigning a value to a second DAI for the third downlink data channel based on the second DCI message scheduling the third downlink data channel by incrementing a DAI count by one.

Some examples of the method, apparatuses, and non-transitory computer-readable medium described herein may further include operations, features, means, or instructions for assigning the first feedback bit to the first position in the acknowledgement codebook indicated by the one DAI and the second feedback bit to the second position in the acknowledgement codebook that may be after the first position.

Some examples of the method, apparatuses, and non-transitory computer-readable medium described herein may further include operations, features, means, or instructions for assigning the first feedback bit to the first position in the acknowledgement codebook indicated by the one DAI and the second feedback bit to the second position in the acknowledgement codebook that may be before the first position.

Some examples of the method, apparatuses, and non-transitory computer-readable medium described herein may further include operations, features, means, or instructions for ordering the set of DCI messages based on, for each DCI message of the set of DCI messages, one or more component carrier indices indicated by the set of DCI messages or a control channel occasion associated with the set DCI messages, or both.

In some examples of the method, apparatuses, and non-transitory computer-readable medium described herein, a corresponding value of each DAI for each DCI message of the set of DCI messages may be based on the ordering.

Some examples of the method, apparatuses, and non-transitory computer-readable medium described herein may further include operations, features, means, or instructions for identifying a component carrier index of the one or more component carrier indices that may be greater than one or more other component carrier indices of the one or more component carrier indices, where ordering the set of DCI messages may be based on the identified component carrier index of the one or more component carrier indices that may be greater than one or more other component carrier indices of the one or more component carrier indices for each DCI message of the set of DCI messages.

Some examples of the method, apparatuses, and non-transitory computer-readable medium described herein may further include operations, features, means, or instructions for identifying, based on the ordering, a component carrier index of the one or more component carrier indices that may be less than one or more other component carrier indices of the one or more component carrier indices, where ordering the set of DCI messages may be based on the identified component carrier index of the one or more component carrier indices that may be less than one or more other component carrier indices of the one or more component carrier indices for each DCI message of the set of DCI messages.

Some examples of the method, apparatuses, and non-transitory computer-readable medium described herein may further include operations, features, means, or instructions for determining that the first component carrier and the second component carrier may be configured for a code block group-based feedback, where generating the set of feedback bits may be based on the code block group-based feedback.

In some examples of the method, apparatuses, and non-transitory computer-readable medium described herein, generating the set of feedback bits may include operations, features, means, or instructions for generating, for each unique DAI for each DCI message of the set of DCI messages, a same number of feedback bits for the first component carrier and the second component carrier based on the determining.

Some examples of the method, apparatuses, and non-transitory computer-readable medium described herein may further include operations, features, means, or instructions for determining that the first component carrier may be configured for a code block group-based feedback and the second component carrier may be not configured for a code block group-based feedback, where generating the set of feedback bits may be based on a code block group-based subcodebook.

In some examples of the method, apparatuses, and non-transitory computer-readable medium described herein, a number of acknowledgement bits related to the generated set of feedback bits of the acknowledgement codebook may be based on the first DCI message scheduling the first downlink data channel of the first component carrier and the second downlink data channel of the second component carrier.

A method of wireless communication at a base station is described. The method may include transmitting a set of DCI messages scheduling a set of downlink data channels, the set of DCI messages including at least a first DCI message scheduling a first downlink data channel of a first component carrier and a second downlink data channel of a second component carrier and receiving a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

An apparatus for wireless communication is described. The apparatus may include a processor, memory coupled with the processor, and instructions stored in the memory. The instructions may be executable by the processor to cause the apparatus to transmit a set of DCI messages scheduling a set of downlink data channels, the set of DCI messages including at least a first DCI message scheduling a first downlink data channel of a first component carrier and a second downlink data channel of a second component carrier and receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

Another apparatus for wireless communication is described. The apparatus may include means for transmitting a set of DCI messages scheduling a set of downlink data channels, the set of DCI messages including at least a first DCI message scheduling a first downlink data channel of a first component carrier and a second downlink data channel of a second component carrier and receiving a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

A non-transitory computer-readable medium storing code for wireless communication at a base station is described. The code may include instructions executable by a processor to transmit a set of DCI messages scheduling a set of downlink data channels, the set of DCI messages including at least a first DCI message scheduling a first downlink data channel of a first component carrier and a second downlink data channel of a second component carrier and receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

Some examples of the method, apparatuses, and non-transitory computer-readable medium described herein may further include operations, features, means, or instructions for determining that the first component carrier and the second component carrier may be configured for a code block group-based feedback, where generating the set of feedback bits may be based on the code block group-based feedback.

In some examples of the method, apparatuses, and non-transitory computer-readable medium described herein, the generated set of feedback bits includes a same number of feedback bits for the first component carrier and the second component carrier based on the determining.

In some examples of the method, apparatuses, and non-transitory computer-readable medium described herein, the first component carrier may be configured for a code block group-based feedback and the second component carrier may be not configured for the code block group-based feedback, where the generated set of feedback bits may be based on a code block group-based subcodebook.

In some examples of the method, apparatuses, and non-transitory computer-readable medium described herein, a number of acknowledgement bits related to the generated set of feedback bits of the acknowledgement codebook may be based on the DCI message including at least two DAI values.

A method of wireless communication at a UE is described. The method may include receiving a set of DCI messages including a first DCI message scheduling a first downlink data channel of a first component carrier and a second downlink data channel of a second component carrier, each DCI message of the set of DCI messages including at least two DAI values, generating a set of feedback bits of an acknowledgement codebook, including at least a first feedback bit corresponding to the first downlink data channel based on a first DAI value, a second feedback bit corresponding to the second downlink data channel based on a second DAI value, and transmitting the generated set of feedback bits on an uplink control channel.

An apparatus for wireless communication is described. The apparatus may include a processor, memory coupled with the processor, and instructions stored in the memory. The instructions may be executable by the processor to cause the apparatus to receive a set of DCI messages including a first DCI message scheduling a first downlink data channel of a first component carrier and a second downlink data channel of a second component carrier, each DCI message of the set of DCI messages including at least two DAI values, generate a set of feedback bits of an acknowledgement codebook, including at least a first feedback bit corresponding to the first downlink data channel based on a first DAI value, a second feedback bit corresponding to the second downlink data channel based on a second DAI value, and transmit the generated set of feedback bits on an uplink control channel.

Another apparatus for wireless communication is described. The apparatus may include means for receiving a set of DCI messages including a first DCI message scheduling a first downlink data channel of a first component carrier and a second downlink data channel of a second component carrier, each DCI message of the set of DCI messages including at least two DAI values, generating a set of feedback bits of an acknowledgement codebook, including at least a first feedback bit corresponding to the first downlink data channel based on a first DAI value, a second feedback bit corresponding to the second downlink data channel based on a second DAI value, and transmitting the generated set of feedback bits on an uplink control channel.

A non-transitory computer-readable medium storing code for wireless communication at a UE is described. The code may include instructions executable by a processor to receive a set of DCI messages including a first DCI message scheduling a first downlink data channel of a first component carrier and a second downlink data channel of a second component carrier, each DCI message of the set of DCI messages including at least two DAI values, generate a set of feedback bits of an acknowledgement codebook, including at least a first feedback bit corresponding to the first downlink data channel based on a first DAI value, a second feedback bit corresponding to the second downlink data channel based on a second DAI value, and transmit the generated set of feedback bits on an uplink control channel.

In some examples of the method, apparatuses, and non-transitory computer-readable medium described herein, the set of DCI messages further includes a second DCI message scheduling a third downlink data channel of a third component carrier, and selecting the first DAI value from the at least two DAI values to use to generate feedback information and ignoring the second DAI value, where generating the set of feedback bits of the acknowledgement codebook includes: generating the set of feedback bits of the acknowledgement codebook, including at least a third feedback bit corresponding to the third downlink data channel, based on the selected first DAI value.

Some examples of the method, apparatuses, and non-transitory computer-readable medium described herein may further include operations, features, means, or instructions for generating the set of feedback bits of the acknowledgement codebook including at least the first feedback bit corresponding to the first downlink data channel may be based on the first component carrier being configured for a code block group-based feedback.

In some examples of the method, apparatuses, and non-transitory computer-readable medium described herein, the first component carrier may be configured for a code block group-based feedback.

Some examples of the method, apparatuses, and non-transitory computer-readable medium described herein may further include operations, features, means, or instructions for generating a code block group-based feedback sub-codebook based on the selected first DAI value.

In some examples of the method, apparatuses, and non-transitory computer-readable medium described herein, the second component carrier may be not configured for a code block group-based feedback.

Some examples of the method, apparatuses, and non-transitory computer-readable medium described herein may further include operations, features, means, or instructions for generating a transport block-based feedback sub-codebook based on a second DAI value from the at least two DAI values.

In some examples of the method, apparatuses, and non-transitory computer-readable medium described herein, a number of acknowledgement bits related to the generated set of feedback bits of the acknowledgement codebook may be based on the first DCI message scheduling the first downlink data channel of the first component carrier and the second downlink data channel of the second component carrier.

A method of wireless communication at a base station is described. The method may include transmitting a set of DCI messages including a first DCI message scheduling a first downlink data channel of a first component carrier and a second downlink data channel of a second component carrier, each DCI message of the set of DCI messages including at least two DAI values and receiving a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

An apparatus for wireless communication is described. The apparatus may include a processor, memory coupled with the processor, and instructions stored in the memory. The instructions may be executable by the processor to cause the apparatus to transmit a set of DCI messages including a first DCI message scheduling a first downlink data channel of a first component carrier and a second downlink data channel of a second component carrier, each DCI message of the set of DCI messages including at least two DAI values and receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

Another apparatus for wireless communication is described. The apparatus may include means for transmitting a set of DCI messages including a first DCI message scheduling a first downlink data channel of a first component carrier and a second downlink data channel of a second component carrier, each DCI message of the set of DCI messages including at least two DAI values and receiving a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

A non-transitory computer-readable medium storing code for wireless communication at a base station is described. The code may include instructions executable by a processor to transmit a set of DCI messages including a first DCI message scheduling a first downlink data channel of a first component carrier and a second downlink data channel of a second component carrier, each DCI message of the set of DCI messages including at least two DAI values and receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

In some examples of the method, apparatuses, and non-transitory computer-readable medium described herein, the generated set of feedback bits of the acknowledgement codebook including at least the first feedback bit corresponding to the first downlink data channel may be based on the first component carrier being configured for a code block group-based feedback.

In some examples of the method, apparatuses, and non-transitory computer-readable medium described herein, the first component carrier may be configured for a code block group-based feedback.

In some examples of the method, apparatuses, and non-transitory computer-readable medium described herein, the second component carrier may be not configured for a code block group-based feedback.

In some examples of the method, apparatuses, and non-transitory computer-readable medium described herein, a number of acknowledgement bits related to the generated set of feedback bits of the acknowledgement codebook may be based on the DCI message including at least two DAI values.

DETAILED DESCRIPTION

Figure 1:
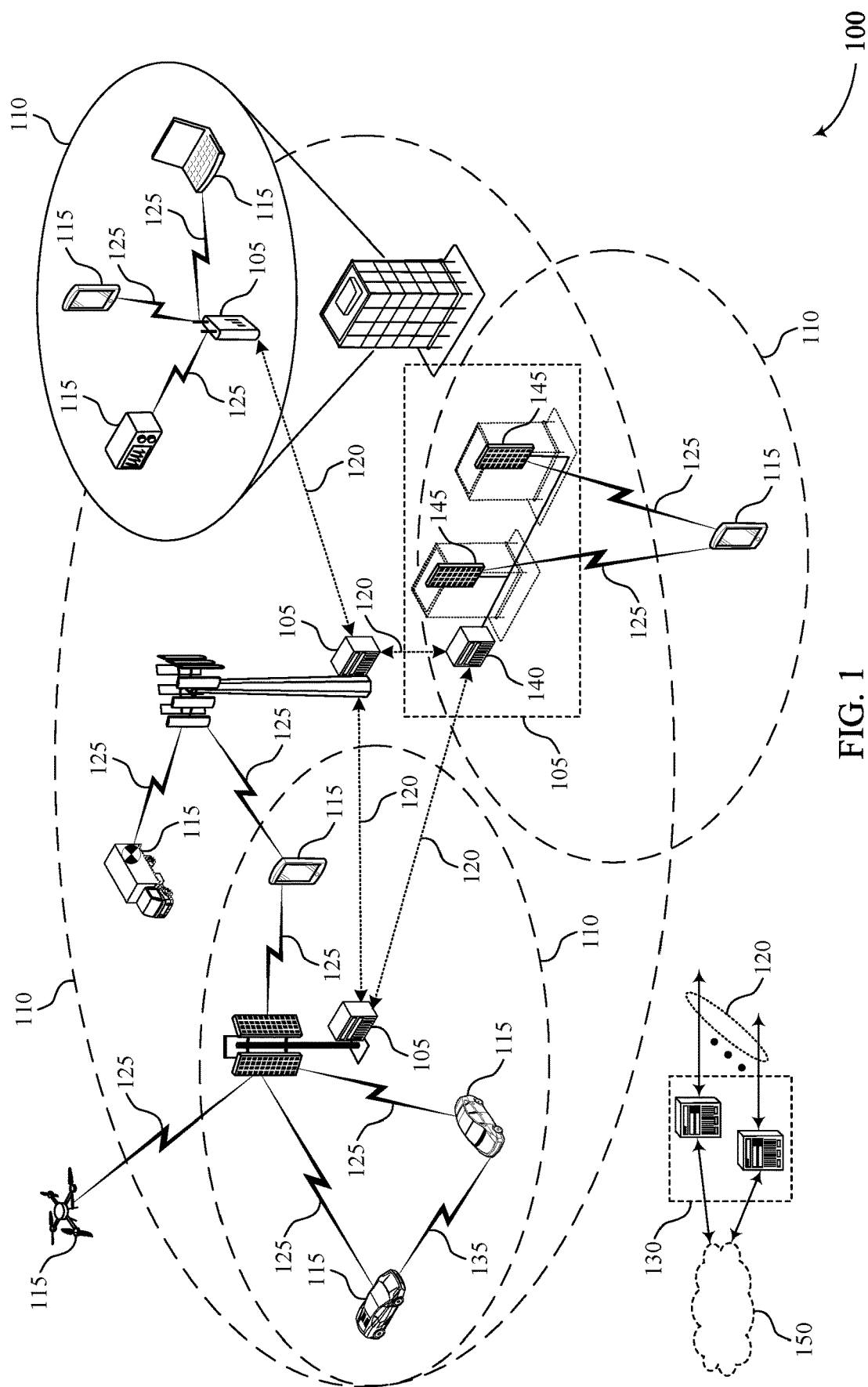
FIGS. 1 and 2 illustrate examples of wireless communications systems that support downlink assignment index (DAI) for multi-component carrier scheduling in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support hybrid automatic repeat request (HARQ) feedback for multiple physical channels (e.g., multiple physical downlink shared channels (PDSCH)). In some examples, the described techniques may be used to configure the UEs to support HARQ feedback for multiple PDSCH scheduled via multi-component (e.g., cross-component) carrier to improve reliability of various types of communication (e.g., data).

A base station may schedule multiple downlink data channels for a UE by transmitting downlink control information (DCI) messages over a downlink control channel. A downlink data channel may include a PDSCH, while a downlink control channel may include a physical downlink control channel (PDCCH). The base station may thus schedule multiple PDSCH for the UE by transmitting DCI messages over the PDCCH. Each PDSCH of the multiple PDSCH may carry a number of downlink data channel transmissions. In some examples of joint-scheduling, the DCI messages may schedule a first PDSCH of a first component carrier and a second PDSCH of a second component carrier. The UE may receive and attempt to decode the first PDSCH and the second PDSCH, respectively.

In some examples, based on successfully or unsuccessfully decoding the first PDSCH and the second PDSCH, the UE may transmit feedback (e.g., a HARQ feedback) associated with the first PDSCH and the second PDSCH. The feedback may be an acknowledgement (ACK) or a non-acknowledgement (NACK) of the receipt of the scheduled PDSCHs and information associated with an ability of the UE to decode the first PDSCH and the second PDSCH. For each of the first PDSCH and the second PDSCH, the UE may transmit either an ACK (in the case that the UE successfully receives the data transmission) or a NACK (in the case that the UE unsuccessfully receives the data transmission).

In some examples, the UE may identify a set of DAI in a set of DCI messages. Each DCI message of the set of DCI messages may include a unique DAI. The UE may generate a set of feedback bits of a HARQ feedback codebook (also referred to as an acknowledgement codebook). The set of feedback bits may include a same number of feedback bits for each DAI. In some examples, the UE may transmit the feedback to the base station in one or more uplink control channels (or one or more resources associated with an uplink control channel), such as a physical uplink control channel (PUCCH). For example, the UE may transmit the generated set of feedback bits on a PUCCH on determined resources (e.g., PUCCH resources).

The UE may determine a resource allocation for a PUCCH and one or more parameters for the feedback transmission based on a number of control fields or indicators (e.g., downlink assignment indices (DAI)) included in the DCI message). In some examples, the feedback transmission for the multiple PDSCH may be carried on same resources (e.g., same PUCCH resources). Alternatively, the feedback transmission for the multiple PDSCH may be carried on different resources (e.g., different PUCCH resources). The UE may determine the resource allocation for the PUCCH based on one or more values provided in the DCI message. In some examples, the DCI message may include one or more separate values (also referred to as fields or indicators) that convey information for providing HARQ feedback for the multiple scheduled PDSCH.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to wireless communications when operating in 5G systems. In some examples, configuring the UE to support HARQ feedback for multiple PDSCH scheduled via multi-component carrier, among other examples in 5G systems, may support improvements to power consumption, resource usage, coverage enhancement, spectral efficiency, higher data rates, and in some examples, may promote enhanced efficiency for wireless operations, among other benefits. Techniques described herein as applicable to or using HARQ or HARQ-ACK feedback may be applied to other types of acknowledgement feedback.

Aspects of the disclosure are initially described in the context of wireless communications systems. Aspects of the disclosure are further illustrated by and described with reference to block diagrams that relate to DAI for multi-component carrier scheduling. Aspects of the disclosure are further illustrated by and described with reference to apparatus diagrams, system diagrams, and flowcharts that relate to DAI for multi-component carrier scheduling.

FIG. 1 illustrates an example of a wireless communications system 100 that supports DAI for multi-component carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit DCI messages in a PDCCH to a UE 115 to schedule multiple physical channels (e.g., multiple PDSCHs) between the base station 105 and the UE 115. In some examples, the base station 105 may schedule the multiple physical channels over multiple component carriers. For example, the base station 105 may schedule the multiple physical channels on multiple cells, where each cell is associated with a component carrier. Accordingly, the UE 115 may receive the DCI messages and monitor the multiple component carriers for the multiple scheduled physical channels. In some examples, the UE 115 may transmit feedback information (e.g., HARQ feedback) to the base station 105 based on receiving and decoding each of the multiple physical channels.

In some examples, the UE 115 may identify a set of DAI in the DCI messages. Each DCI message of the DCI messages may include a unique DAI. The UE 115 may generate a set of feedback bits of a HARQ feedback codebook. The set of feedback bits may include a same number of feedback bits for each DAI. In some examples, the UE 115 may transmit the feedback to the base station 105 in one or more uplink control channels (or one or more resources associated with an uplink control channel), such as a PUCCH. For example, the UE 115 may transmit the generated set of feedback bits on a PUCCH on determined resources (e.g., PUCCH resources).

Figure 2:
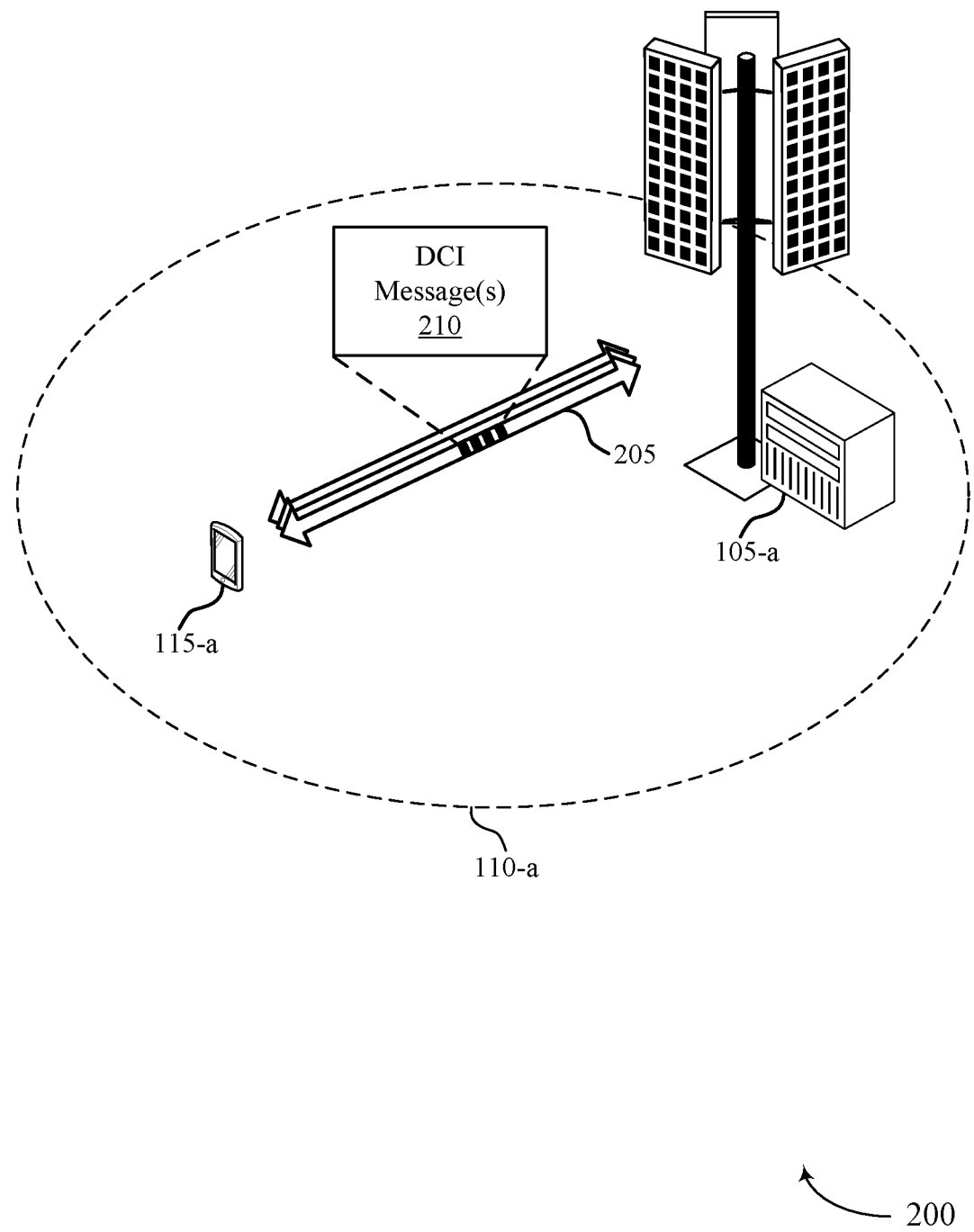

FIG. 2 illustrates an example of a wireless communications system 200 that supports DAI for multi-component carrier scheduling in accordance with aspects of the present disclosure. In some examples, the wireless communications system 200 may implement aspects of the wireless communications system 100. For example, the wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption and, in some examples, may promote enhanced efficiency for high reliability and low latency wireless communication operations, among other benefits.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various multiple-input multiple-output or beamforming operations. Additionally or alternatively, an antenna panel may support radio frequency beamforming for a signal transmitted via one or more antenna ports. The base station 105-a and the UE 115-a may thus be configured to support directional communications 205 using the multiple antennas.

In some examples, the base station 105-a and the UE 115-a may communicate via the directional communications 205 using multiple component carriers. For example, the base station 105-a and the UE 115-a may be configured to support multiple downlink component carriers and multiple uplink component carriers. A component carrier may be associated with a carrier bandwidth of a radio frequency spectrum, and in some examples, the carrier bandwidth may be referred to as a system bandwidth of the carrier or the wireless communications system 200. For example, the carrier bandwidth may be one of a number of determined bandwidths for carriers of a particular radio access technology (e.g., 1.4, 3, 5, 10, 15, 20, 40, or 80 megahertz (MHz)). The base station 105-a and the UE 115-a may be configured to support the directional communications 205 over a carrier bandwidth or may be configured to support the directional communications 205 over one of multiple carrier bandwidths. In some examples, the base station 105-a or the UE 115-a may support simultaneous communications via carriers associated with multiple carrier bandwidths.

The UE 115-a, in the wireless communications system 200, may support operations to preserve resources (for example, time and frequency resources of the wireless communications system 200), a battery life of the UE 115-a, among other examples. In some examples, the UE 115-a may be configured to support operations to manage or improve the directional communications 205 between the base station 105-a and the UE 115-a. For example, the base station 105-a may configure the UE 115-a to support multi-component carrier scheduling for some physical channels, such as PDSCH to improve efficiency and reliability of the directional communications 205. In some examples, the base station 105-a may configure the UE 115-a to support efficient resource determination (e.g., PUCCH resource determination) for providing feedback information (e.g., HARQ feedback) for multiple scheduled PDSCH.

The base station 105-a may transmit, and the UE 115-a may receive, control information, for example, DCI messages 210 that may schedule physical channels (e.g., PDSCH) across multiple component carriers. In some examples, the base station 105-a and the UE 115-a may support multi-component carrier scheduling to balance a load (e.g., traffic) and scheduling across different component carriers associated with the UE 115-a. By supporting multi-component carrier scheduling, the UE 115-a may receive some physical channel (e.g., PDSCH) on a component carrier other than, or in addition to, the one on which other physical channels (e.g., PDCCH) carrying the DCI messages 210 was received on. Examples of multi-component carrier scheduling for multiple physical channels is described with reference to FIG. 3.

Figure 3:
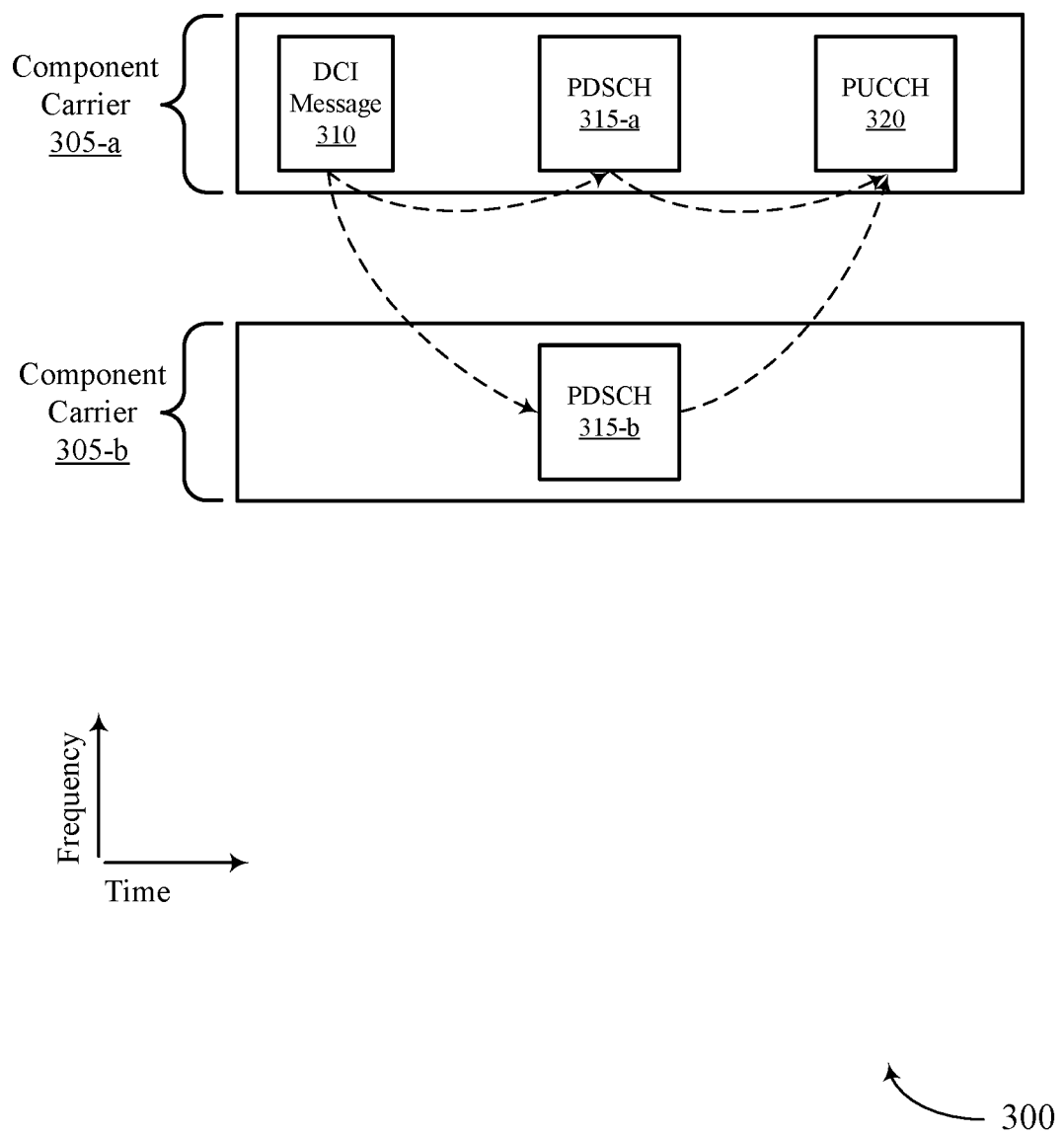
FIGS. 3 through 7 illustrates examples of block diagrams that supports DAI for multi-component carrier scheduling in accordance with aspects of the present disclosure.

FIG. 3 illustrates an example of a block diagram 300 that supports DAI for multi-component carrier scheduling in accordance with aspects of the present disclosure. The block diagram 300 may implement aspects of the wireless communications systems 100 and 200 described with reference to FIGS. 1 and 2, respectively. For example, the block diagram 300 may be based on a configuration by a base station 105, and implemented by a UE 115. In the example illustrated in FIG. 3, the block diagram 300 may be applicable to implementations or instances when the UE 115 is configured to support NR dynamic spectrum sharing (DSS). DSS may allow different radio access technologies to share a bandwidth (e.g., radio frequency spectrum band). For example, DSS may allow deployment of both 4G and 5G in a same band and dynamically allocates spectrum resources between 4G and 5G based on user demand (e.g., data traffic). Additionally, in the example illustrated in FIG. 3, the block diagram 300 may be applicable to implementations or instances when the UE 115 is configured to provide HARQ feedback (e.g., a HARQ ACK, a HARQ NACK) for multiple physical channels (e.g., multiple PDSCH) scheduled via multi-component carrier.

For example, a UE 115 may communicate with a base station 105 over multiple component carriers 305. The component carriers 305 may correspond to a system bandwidth, which may correspond to time resources (e.g., a symbol, a minislot, a slot, a subframe, a frame), as well as frequency resources (e.g., subcarriers, carriers). In some examples, the UE 115 may communicate with a primary cell, a primary secondary cell, or a secondary cell using a component carrier 305-a or a component carrier 305-b, or both. Examples of a primary cell, a primary secondary cell, or a secondary cell may be examples of a base station 105, as described with reference to FIGS. 1 and 2.

In the example of FIG. 3, a UE 115 may receive, from a base station 105, a DCI message 310 on the component carrier 305-a. For example, the UE 115 may receive a PDCCH carrying the DCI message 310 on the component carrier 305-a. The PDCCH may, in some examples, be associated with a secondary cell scheduling PDSCH or PUSCH on a primary cell or a primary secondary cell. For example, the DCI message 310 may schedule both a PDSCH 315-a associated with the component carrier 305-a and a PDSCH 315-b associated with the component carrier 305-b. In some other examples, the PDCCH may be associated with a primary cell, a primary secondary cell, or a secondary cell and may schedule PDSCH or PUSCH on multiple cells (e.g., multiple component carriers 305) using a single DCI message. In some cases, a number of cells (e.g., a number of component carriers) may be preconfigured (e.g., two cells).

In some examples, in addition to scheduling the PDSCH 315-a associated with the component carrier 305-a and the PDSCH 315-b associated with the component carrier 305-b, the DCI message 310 may schedule a PUCCH 320. The UE 115 may be configured to provide HARQ feedback (e.g., a HARQ ACK, a HARQ NACK) for the PDSCH 315-a or the PDSCH 315-b, or both, via the PUCCH 320. In other words, the PUCCH 320 may carry HARQ feedback for multiple PDSCH 315. Thus, a base station 105 may transmit, to a UE 115, a DCI message that jointly schedules multiple PDSCH across multiple component carriers, as well as a PUCCH for the UE 115 to provide HARQ feedback for the joint scheduled PDSCH on at least one component carrier of the multiple component carriers, as well as a PUCCH for the UE 115 to provide feedback for the jointly scheduled PDSCH on at least one component carrier of the multiple component carriers. In some examples, the UE 115 may determine the PUCCH (and PUCCH resources associated with the PUCCH) based on identifying a number of fields (e.g., multiple DAI) in the DCI messages. As described herein, to support system flexibility the DCI message may include various indicators to indicate PUCCH resources for the HARQ feedback for the joint scheduled PDSCH.

Returning to FIG. 2, as demand for communication efficiency increases, some wireless communications systems may be unable to support efficient HARQ feedback for multiple physical channels (e.g., multiple PDSCH) scheduled via multi-component carrier, among other examples. Various aspects of the described techniques relate to configuring the UE 115-a to provide HARQ feedback for multiple physical channels (e.g., multiple PDSCH) scheduled via multi-component carrier, in the wireless communications system 200. For example, the base station 105-a may provide the UE 115-a with a HARQ feedback timing, which may indicate resources for a HARQ feedback for multiple PDSCH. The resources may include time resources (e.g., a symbol, a minislot, a slot, a subframe, a frame), as well as frequency resources (e.g., subcarriers, carriers). The UE 115-a may be configured with a codebook type for HARQ feedback (e.g., HARQ-ACK) payload determination (e.g., Type 1 or semi-static HARQ-ACK codebook, and Type 2 or dynamic HARQ-ACK codebook).

By way of example, the base station 105-a may transmit, and the UE 115-a may receive, the DCI messages 210. The DCI messages 210 may schedule multiple PDSCH across multiple component carriers. In some examples, the UE 115-a may be configured to handle HARQ feedback for the multiple scheduled PDSCH. The UE 115-a may, for example, determine resources (also referred to as PUCCH resource) of a PUCCH for providing HARQ feedback for the multiple scheduled PDSCH based on one or more values provided in the DCI messages 210. In some examples, the DCI messages 210 may include one or more separate values (also referred to as fields or indicator fields) that convey information for providing HARQ feedback for the multiple scheduled PDSCH.

For example, the DCI messages 210 may include a feedback timing indicator field (e.g., a PDSCH-to-HARQ feedback timing indicator field ($K_1$)), a resource indicator field (e.g., a PUCCH resource indicator (PRI) field), a transmit power control (TPC) indicator field, or a DAI field, among other examples. The UE 115-a may be configured to determine a payload of HARQ feedback for the multiple scheduled PDSCH based in part on one or more DAI fields. A DAI field may be a counter DAI field (both terms may be used interchangeable), which may be used to assign a count to a received DCI message.

In some examples of the wireless communications system 200, the base station 105-a may configure the UE 115-a to generate a HARQ feedback codebook (e.g., a HARQ-ACK codebook) for providing HARQ feedback for multiple scheduled PDSCH. In some examples, the base station 105-a may configure the UE 115-a to generate a first HARQ feedback codebook (e.g., a Type-1 HARQ feedback codebook, or semi-static codebook type) or to generate a second codebook (e.g., a Type-2 HARQ feedback codebook, or dynamic codebook type), or both. The UE 115-a may thus generate HARQ feedback codebooks for multiple PDSCH on multiple component carriers, and transmit HARQ feedback for the PDSCH. In some examples, a HARQ feedback codebook may be arranged according to PDSCH occasion and cell (e.g., primary cell, secondary cell). The HARQ feedback codebook may thus include a number of HARQ feedback bits to be reported for each PDSCH. In some examples, for a Type-2 HARQ feedback codebook, the UE 115-a may be configured to use separate DAI fields or a single DAI field for multiple DCI messages. Examples of a dynamic HARQ feedback codebook is described with reference to FIG. 4.

Figure 4:
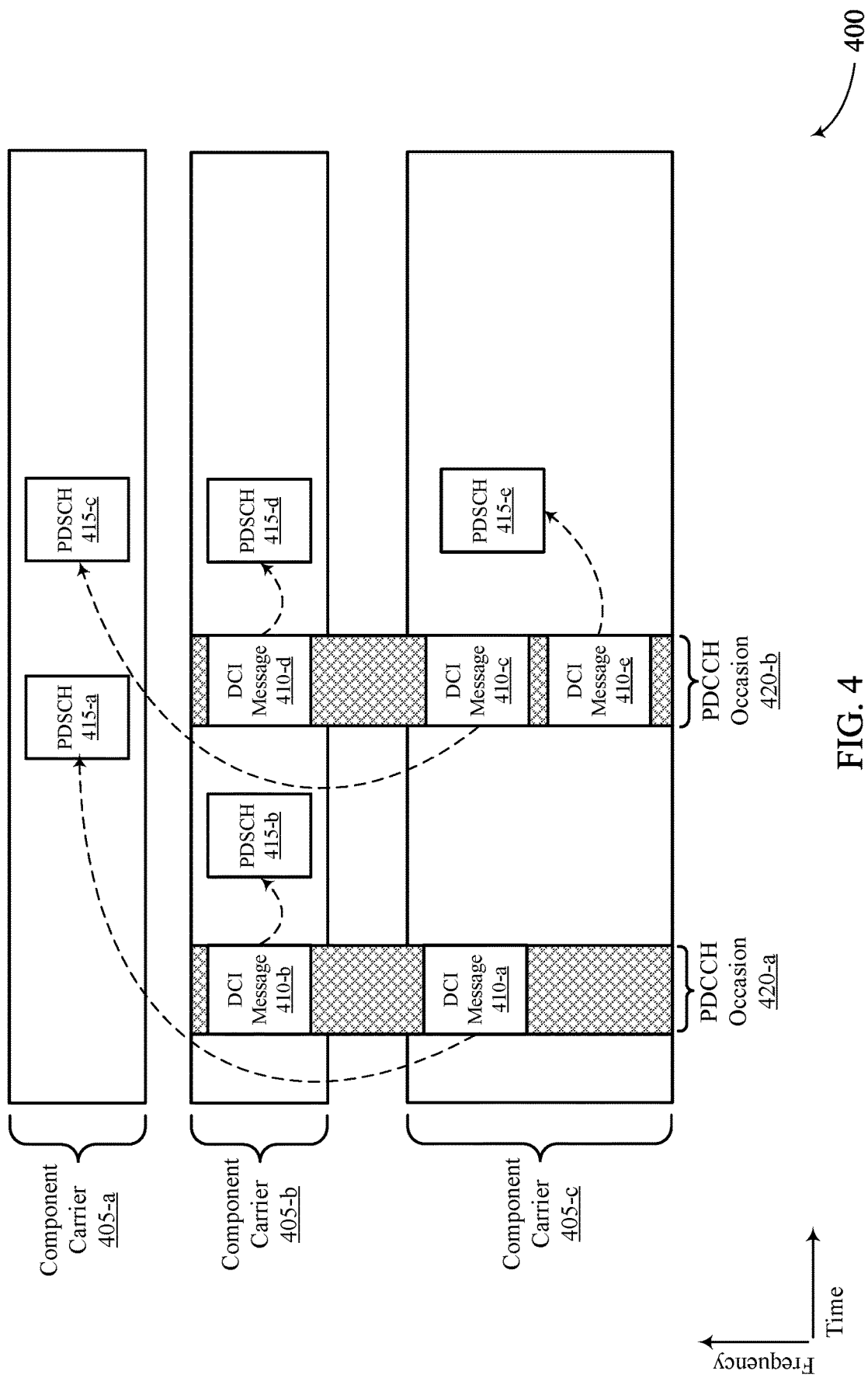

FIG. 4 illustrates an example of a block diagram 400 that supports DAI for multi-component carrier scheduling in accordance with aspects of the present disclosure. The block diagram 400 may implement aspects of the wireless communications systems 100 and 200 described with reference to FIGS. 1 and 2, respectively. For example, the block diagram 400 may be based on a configuration by a base station 105, and implemented by a UE 115. In the example illustrated in FIG. 4, the block diagram 400 may be applicable to implementations or instances when the UE 115 is configured to provide HARQ feedback (e.g., a HARQ ACK, a HARQ NACK) for physical channels (e.g., PDSCH) scheduled via multi-component carrier.

A UE 115 may communicate with a base station 105 over multiple component carriers 405. The component carriers 405 may correspond to a system bandwidth, which may correspond to time resources (e.g., a symbol, a minislot, a slot, a subframe, a frame), as well as frequency resources (e.g., subcarriers, carriers). In some examples, the component carriers 405 may have a same or different subcarrier spacing. In some examples, the UE 115 may communicate with a primary cell, a primary secondary cell, or a secondary cell using a component carrier 405-a, a component carrier 405-b, or a component carrier 405-c, or any combination thereof. Examples of a primary cell, a primary secondary cell, or a secondary cell may be examples of a base station 105, as described with reference to FIGS. 1 and 2.

In the example of FIG. 4, a UE 115 may receive, from a base station 105, multiple DCI messages 410 scheduling various PDSCH 415 (e.g., at least one PDSCH 41) associated with various component carriers 405 (e.g., at least one component carrier 405). For example, the UE 115 may receive, via the component carrier 405-c, a DCI message 410-a that schedules a PDSCH 415-a on the component carrier 405-a. In some examples, the UE 115 may receive, via the component carrier 405-b, a DCI message 410-b that schedules a PDSCH 415-b on the component carrier 405-b. The UE 115 may, in some examples, receive, via the component carrier 405-c, a DCI message 410-c that schedules a PDSCH 415-c on the component carrier 405-a. In some examples, the UE 115 may receive, via the component carrier 405-b, a DCI message 410-d that schedules a PDSCH 415-d on the component carrier 405-d. The UE 115 may receive, via the component carrier 405-c, a DCI message 410-e that schedules a PDSCH 415-e on the component carrier 405-c. One or more DCI messages 410 may belong to a same PDCCH occasion 420. Alternatively, one or more DCI messages 410 may belong to a different PDCCH occasion 420. For example, the UE 115 may receive the DCI message 410-a and the DCI message 410-b during a PDCCH occasion 420-a, and may receive the DCI messages 410-a through 410-e during a PDCCH occasion 420-b.

The DCI messages 410 may include one or more separate values (also referred to as fields) that convey information for providing HARQ feedback for the various scheduled PDSCH 415. For example, each DCI message 410 may include a DAI, among other indicator fields. A DAI field may be a counter DAI field, which may be used to assign a count to a received DCI message 410. In some examples, each DCI message 410 may correspond to a control format (e.g., a DCI format 1_0 or a DCI format 1_1). A value of a counter DAI field for a DCI format 1_0 or a DCI format 1_1 may define a number (e.g., serving cells and PDCCH occasions pairs) in which PDSCH reception(s) or semi-persistent scheduling (SPS) PDSCH release associated with the DCI format 1_0 or the DCI format 1_1, or both, is present. The number may be up to a current serving cell and a current PDCCH occasion.

In some examples, the value of the counter DAI field may be assigned based in part on an ascending order of a serving cell index or a PDCCH occasion index, or both. For example, based in part on a serving cell index or a PDCCH occasion index, or both, for each DCI message 410, the DCI message 410-a may be assigned a value one in a corresponding counter DAI field, the DCI message 410-b may be assigned a value two in a corresponding counter DAI field, the DCI message 410-c may be assigned a value three in a corresponding counter DAI field, the DCI message 410-d may be assigned a value four in a corresponding counter DAI field, and the DCI message 410-e may be assigned a value five in a corresponding counter DAI field. The serving cell index may correspond to a scheduled cell and not a scheduling cell.

The UE 115 may be configured, in some examples, to provide HARQ feedback (e.g., a HARQ ACK, a HARQ NACK) for the PDSCH 415 via a PUCCH. In some examples, the UE 115 may generate a HARQ feedback codebook based in part on the counter DAI fields. The HARQ feedback codebook may include rows and columns, where each row and column correspond to HARQ feedback bits (e.g., NACK, A/N). In the HARQ feedback codebook, the UE 115 may insert an actual A/N for a PDSCH occasion if the UE 115 receives a DCI message that indicates to the UE 115 to feedback A/N for the PDSCH (e.g., in the PUCCH slot). Otherwise, the UE 115 may generate a NACK. For example, if a DCI message is missed, the UE 115 may transmit a NACK. The UE 115 may determine a number of HARQ feedback bits to be reported for each PDSCH 415, and transmit a HARQ feedback for the PDSCH 415.

Returning to FIG. 2, in some examples, the UE 115-a may be configured to manage DAI fields, and more particularly assigning counts to DCI messages including the DCI messages 210 that schedule multiple PDSCH. Additionally, the UE 115-b may be configured to support HARQ feedback codebook generation based on the DAI fields associated with the DCI messages 210 that schedule multiple PDSCH. In some examples, the UE 115-a may be configured, such that a counter DAI field is counted by one value per DCI message irrespective of whether the DCI message schedules one component carrier or multiple component carriers. The UE 115-a may be configured to assign a value of a counter DAI field of corresponding DCI messages based in part on an ordering of the DCI messages with respective to each other.

The value of each counter DAI field may define a number (e.g., of DCI messages and PDCCH occasion pairs) in which PDSCH reception(s) or SPS PDSCH release associated with a DCI control format is present. In some examples, the value may be up to a current DCI message and a current PDCCH occasion. The ordering may be in an ascending order of an associated serving cell index with DCI messages in a given PDCCH occasion, and then in an ascending order of PDCCH occasion index. In some examples, for each DCI message of the DCI messages 210, the UE 115-a may be configured to identify a component carrier index that is a largest scheduled component carrier index (in case more than one component carriers are scheduled). Otherwise, the UE 115-a may be configured to identify a component carrier index that is a smallest scheduled component carrier index (in case more than one component carriers are scheduled).

In some examples, if the UE 115-*a* is configured with multi-component carrier cross scheduling, the UE 115-*a* may generate multiple feedback bits (e.g., two A/N bits) per DAI position in a generated HARQ feedback codebook even if a component carrier actually schedules one PDSCH (e.g., if a DCI message actually schedules one PDSCH, the UE 115-*a* may assign a dummy feedback bit (e.g., dummy NACK)). This is to prevent HARQ feedback codebook size mismatch issues in the case of missing DCI messages. In some cases, this may be similar to when the UE 115-*a* may use multiple codewords (e.g., maximum of two codewords) in at least one component carrier. In addition, if multiple codewords (e.g., maximum of two codewords) correspond to at least one component carrier, the UE 115-*a* may generate multiple feedback bits (e.g., four A/N bits) per DAI position in the generated HARQ feedback codebook. In other words, the UE 115-*a* may generate dummy NACKs and insert them in the generated HARQ feedback codebook in case the DCI message schedules less than a number of transport blocks (TB) (e.g., less than four TBs across two component carriers, or if a DCI message schedules one component carrier).

The UE 115-*a* may, in some examples, be configured with a feedback bundling (e.g., a HARQ bundling) to transmit one or more feedback bits (e.g., at least one feedback bit A/N) in the generated HARQ feedback codebook for multiple PDSCHs. In some examples, if the UE 115-*a* is configured with the feedback bundling, then the UE 115-*a* may generate one or more feedback bits (e.g., at least one feedback bit A/N) per DAI position in the generated HARQ feedback codebook. The one or more feedback bits may correspond to multiple PDCSH. In some examples, the UE 115-*a* may perform a binary AND operation on the multiple feedback bits, and report the feedback bits corresponding to the multiple PDSCH.

Figure 5:
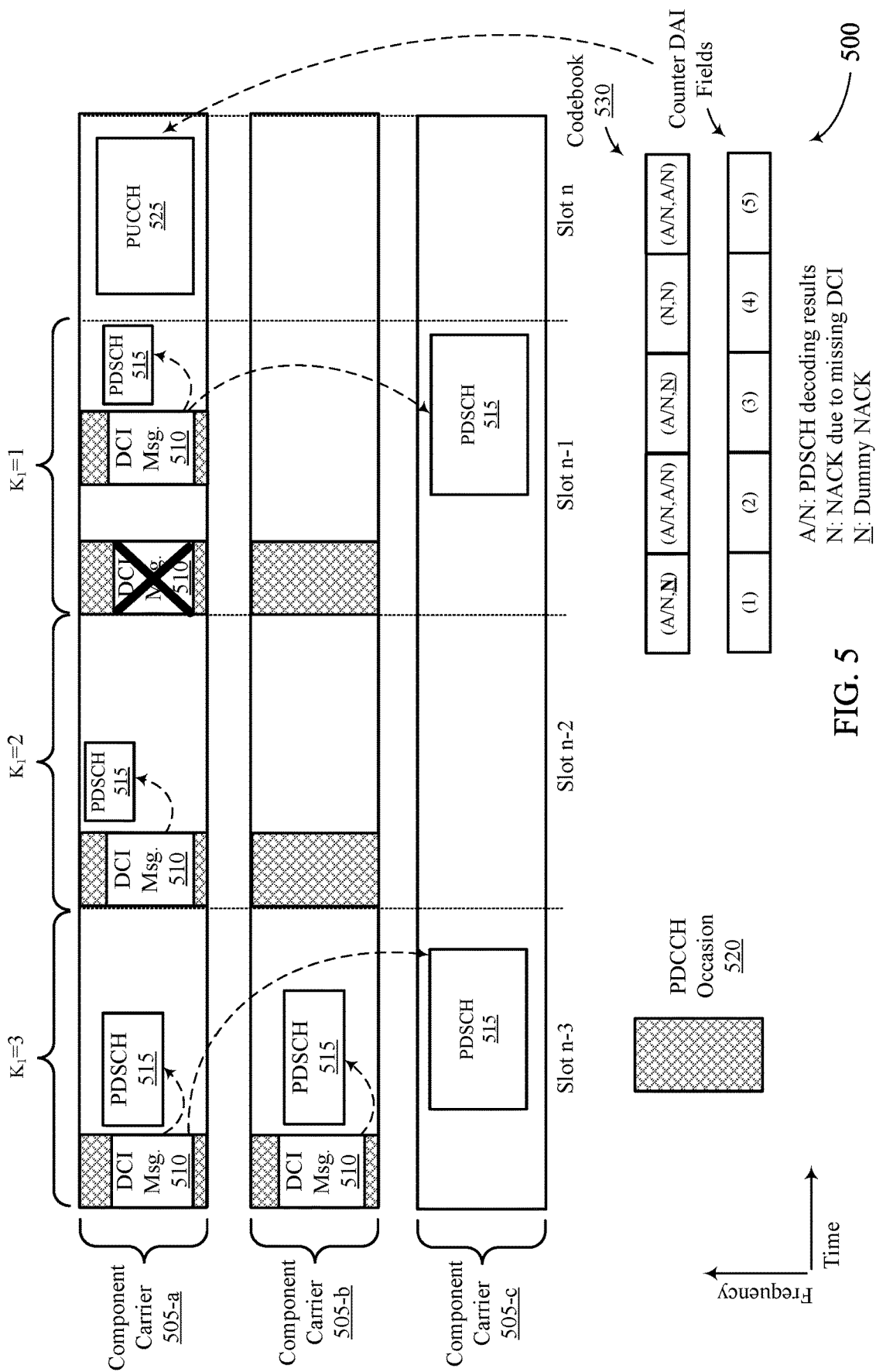

FIG. 5 illustrates an example of a block diagram 500 that supports DAI for multi-component carrier scheduling in accordance with aspects of the present disclosure. The block diagram 500 may implement aspects of the wireless communications systems 100 and 200 described with reference to FIGS. 1 and 2, respectively. For example, the block diagram 500 may be based on a configuration by a base station 105, and implemented by a UE 115. In the example illustrated in FIG. 5, the block diagram 500 may be applicable to implementations or instances when the UE 115 is configured to support NR DSS. Additionally, in the example illustrated in FIG. 5, the block diagram 500 may be applicable to implementations or instances when the UE 115 is configured to provide HARQ feedback for multiple physical channels (e.g., multiple PDSCH) scheduled via multi-component carrier.

For example, a UE 115 may communicate with a base station 105 over multiple component carriers 505. The component carriers 505 may correspond to a system bandwidth, which may correspond to time resources (e.g., a symbol, a minislot, a slot, a subframe, a frame), as well as frequency resources (e.g., subcarriers, carriers). In some examples, the component carriers 505 may have different subcarrier spacings, as described herein. In some examples, the UE 115 may communicate with a primary cell, a primary secondary cell, or a secondary cell using a component carrier 505-*a*, a component carrier 505-*b*, or a component carrier 505-*c*, or any combination thereof. Examples of a primary cell, a primary secondary cell, or a secondary cell may be examples of a base station 105, as described with reference to FIGS. 1 and 2.

In the example of FIG. 5, a UE 115 may receive one or more DCI messages 510, each DCI message 510 may schedule one or multiple PDSCH 515. In some examples, the UE 115 may receive one or more DCI messages 510 during one or more PDCCH occasions 520. A PDCCH occasion may correspond to a number of symbols, minislots, slots, subframes, or frames. For example, as illustrated in FIG. 5, the UE 115 may receive a DCI message 510 over the component carrier 505-*a* during a PDCCH occasion 520. This received DCI message 510 may schedule multiple PDSCH 515 over a same slot (e.g., slot n-3), for example, such as one PDSCH 515 on the component carrier 505-*a* and another PDSCH 515 on the component carrier 505-*c*. In some examples, the UE 115 may receive another DCI message 510 over the component carrier 505-*b* during a same PDCCH occasion 520. This received DCI message 510 may schedule a single PDSCH 515 on the component carrier 505-*b* over the same slot (e.g. slot n-3).

The UE 115 may, in some examples, receive a DCI message 510 over the component carrier 505-*a* during a different PDCCH occasion 520. This received DCI message 510 may schedule a single PDSCH 515 on the component carrier 505-*b* over a different slot (e.g., slot n2). In some examples, the UE 115 may miss reception of a DCI message 510. For example, the UE 115 may miss receiving a DCI message 510 over the component carrier 505-*a* during a different PDCCH occasion 520 over a different slot (e.g., slot n-1). However, in some examples, the UE 115 may receive a subsequent DCI message 510 over the component carrier 505-*a* during a different PDCCH occasion 520, but during the same slot (e.g., slot n-1).

In the example of FIG. 5, the UE 115 may be configured, such that a counter DAI field is counted by one value per DCI message 510 irrespective of whether the DCI message 510 schedules one component carrier 505 or multiple component carriers 505. The UE 115 may be configured to assign a value of a counter DAI field in each DCI message 510 based on the ordering of the DCI messages 510. With reference to FIG. 5, the UE 115 may generate a codebook 530 (e.g., a HARQ-ACK codebook) and assign HARQ feedback (e.g., A/N, N, or N) associated with each of the DCI messages 510. The HARQ feedback may include one or more HARQ feedback bits. For example, the UE 115 may assign one or more HARQ feedback bits (e.g., A/N) for each DCI message 510 based on a decoding result of each DCI message 510. In some other examples, the UE 115 may assign one or more HARQ feedback bits (e.g., N) for each DCI message 510 based on the UE 115 missing a DCI message 510. In other examples, the UE 115 may assign one or more HARQ feedback dummy bits (e.g., N) for each DCI message 510 that schedules a single PDSCH.

In some examples, in addition to scheduling the various PDSCH 515, the UE 115 may be configured to provide HARQ feedback on a PUCCH 525. The UE 115 may determine or select a resource (e.g. a PUCCH resource associated with the PUCCH 525) based on an ordering of the DCI messages 510. In some examples, the UE 115 may order the DCI messages 510 to generate a feedback codebook (e.g., a HARQ-ACK codebook (since the value of DAI is used to generate the HARQ-ACK codebook, and DAI is defined with respect to the ordering. In the example of FIG. 5, the UE 115 may order the DCI messages 510 based on a component carrier index associated with a scheduled PDSCH by each of the DCI messages 510, as well as PDCCH occasions 520. For example, the UE 115 may order the DCI messages 510 and determine a DCI message 510 having a highest component carrier index associated with a scheduled PDSCH 515, and generate the HARQ-ACK codebook to determine a HARQ payload based on the DCI message 510 having the highest component carrier index.

Alternatively, the UE 115 may determine a DCI message 510 having a lowest component carrier index associated with a scheduled PDSCH 515, and select a corresponding payload for HARQ feedback carried via the PUCCH 525 based on the DCI message 510 having the lowest component carrier index. In some examples, each DCI message 510 may also identify a feedback timing indicator field ($K_1$), which may indicate a timing value (also referred to as a timing offset) in resources (e.g., a symbol, a minislot, a slot, a subframe, a frame) between reception of a PDSCH 515 (e.g., reception of a PDSCH transmission) and transmission of a corresponding PUCCH 525 (e.g., transmission of HARQ feedback on the PUCCH). The UE 115 may therefore determine an ordering of the DCI messages 510 and select a PUCCH resource based on the ordering.

There are several advantages of DAI for multi-component carrier scheduling in accordance with aspects of the present disclosure, and in particular with reference to the techniques described with reference to block diagram 500. One advantage that DAI for multi-component carrier scheduling provides is more robust technique for consecutive missed DCI messages. A second advantage that DAI for multi-component carrier scheduling provides is reduced overhead for DCI messages.

Returning to FIG. 2, in some other examples, the UE 115-a may be configured to manage DAI fields, and more particularly assigning counts to DCI messages 210 that schedule multiple PDSCH. Additionally, the UE 115-b may be configured to support HARQ feedback codebook generation based on the DAI fields associated with the DCI messages 210 that schedule multiple PDSCH. In some examples, the UE 115-a may be configured, such that a counter DAI field is counted by one or two depending on whether a DCI message schedules one component carrier or multiple component carriers (e.g., whether the DCI message schedules one PDSCH or multiple PDSCH).

For example, if the DCI messages 210 schedule a single PDSCH, the UE 115-a may be configured to increment a count in a corresponding counter DAI field by one. Alternatively, if the DCI messages 210 schedule multiple PDSCH, the UE 115-a may be configured to increment a count in a corresponding counter DAI field(s) by two. The UE 115-a may, in the HARQ feedback codebook, add one DAI position before the indicated DAI in each detected DCI message of the DCI messages 210 that schedules multiple PDSCH. In other examples, if the DCI messages 210 schedule a single PDSCH, the UE 115-a may be configured to increment a count in a corresponding counter DAI field of a following DCI message (e.g., a next DCI message) by one. Alternatively, if the DCI messages 210 schedule multiple PDSCH, the UE 115-a may be configured to increment a count in a corresponding counter DAI field(s) of a following DCI message (e.g., a next DCI message) by two. The UE 115-a may, in the HARQ feedback codebook, add one DAI position after the indicated DAI in each detected DCI message of the DCI messages 210 that schedules multiple PDSCH.

The UE 115-a may assign values to counter DAI based on an ordering of the DCI messages 210. In some examples, the DCI messages 210 may be ordered in ascending order of an associated serving cell index with DCI messages in a given PDCCH occasion, and then in ascending order of PDCCH occasion index. In some examples, for each DCI message 210, the UE 115-a may be configured to identify a component carrier index that is a largest scheduled component carrier index (in case more than one component carriers are scheduled). Otherwise, the UE 115-a may be configured to identify a component carrier index that is a smallest scheduled component carrier index (in case more than one component carriers are scheduled). For a detected DCI message 210 that schedules multiple PDSCHs, an indicated counter DAI field in the DCI message 210 may correspond to the scheduled PDSCH in an associated component carrier index, and the added DAI position may correspond to the other scheduled PDSCH.

Figure 6:
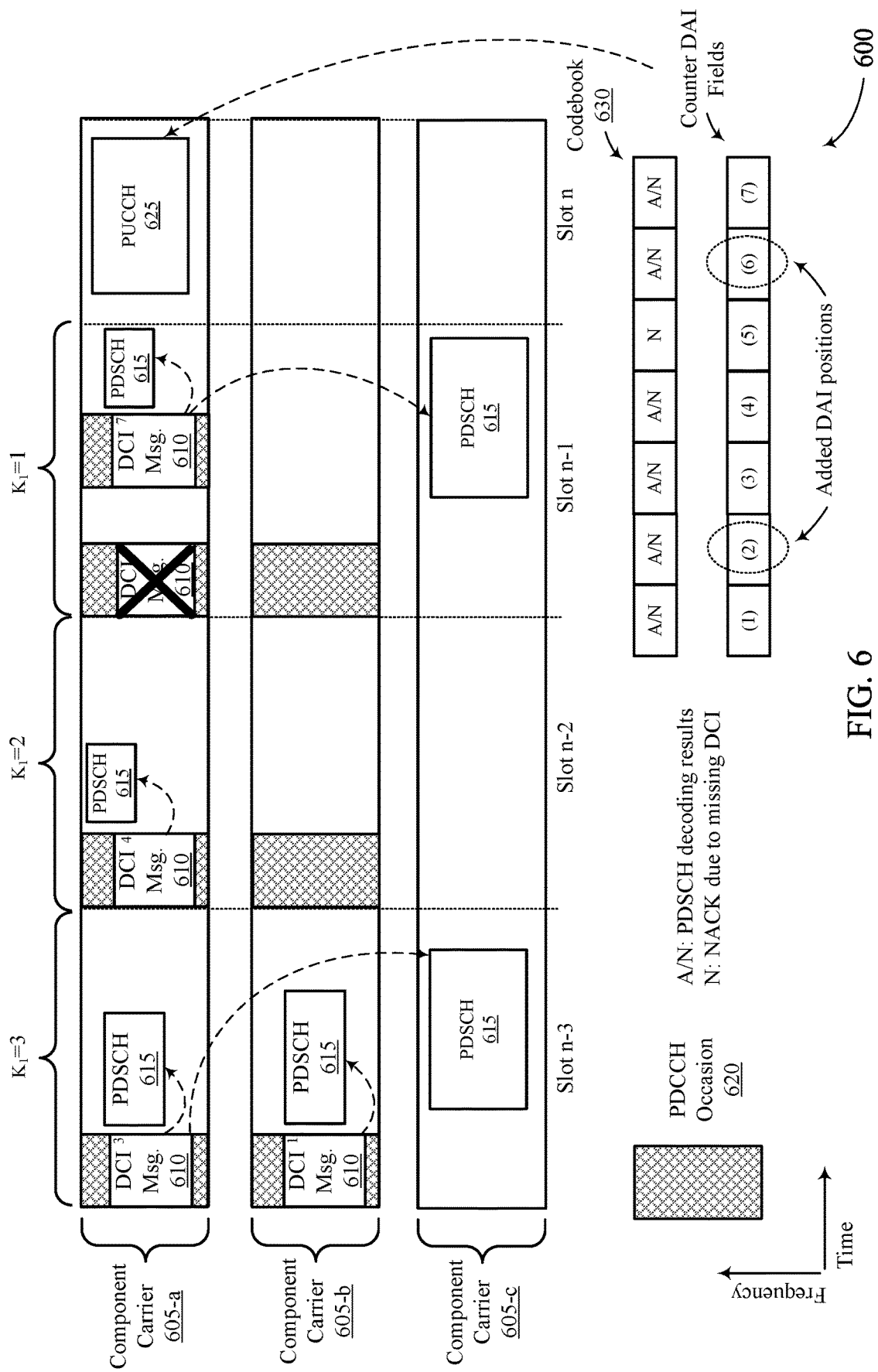

FIG. 6 illustrates an example of a block diagram 600 that supports DAI for multi-component carrier scheduling in accordance with aspects of the present disclosure. The block diagram 600 may implement aspects of the wireless communications systems 100 and 200 described with reference to FIGS. 1 and 2, respectively. For example, the block diagram 600 may be based on a configuration by a base station 105, and implemented by a UE 115. In the example illustrated in FIG. 6, the block diagram 600 may be applicable to implementations or instances when the UE 115 is configured to support NR DSS. Additionally, in the example illustrated in FIG. 6, the block diagram 600 may be applicable to implementations or instances when the UE 115 is configured to provide HARQ feedback for multiple physical channels (e.g., multiple PDSCH) scheduled via multi-component carrier.

For example, a UE 115 may communicate with a base station 105 over multiple component carriers 605. The component carriers 605 may correspond to a system bandwidth, which may correspond to time resources (e.g., a symbol, a minislot, a slot, a subframe, a frame), as well as frequency resources (e.g., subcarriers, carriers). In some examples, the component carriers 605 may have different subcarrier spacings, as described herein. In some examples, the UE 115 may communicate with a primary cell, a primary secondary cell, or a secondary cell using a component carrier 605-a, a component carrier 605-b, or a component carrier 605-c, or any combination thereof. Examples of a primary cell, a primary secondary cell, or a secondary cell may be examples of a base station 105, as described with reference to FIGS. 1 and 2.

In the example of FIG. 6, a UE 115 may receive one or more DCI messages 610, each DCI message 610 may schedule one or multiple PDSCH 615. In some examples, the UE 115 may receive one or more DCI messages 610 during one or more PDCCH occasions 620. A PDCCH occasion may include a number of symbols, minislots, slots, subframes, or frames. For example, as illustrated in FIG. 6, the UE 115 may receive a DCI message 610 over the component carrier 605-a during a PDCCH occasion 620. This received DCI message 610 may schedule multiple PDSCH 615 over a same slot (e.g., slot n-3), for example, such as one PDSCH 615 on the component carrier 605-a and another PDSCH 615 on the component carrier 605-c. In some examples, the UE 115 may receive another DCI message 610 over the component carrier 605-b during a same PDCCH occasion 620. This received DCI message 610 may schedule a single PDSCH 615 on the component carrier 605-b over the same slot (e.g. slot n-3).

The UE 115 may, in some examples, receive a DCI message 610 over the component carrier 605-a during a different PDCCH occasion 620. This received DCI message 610 may schedule a single PDSCH 615 on the component carrier 605-b over a different slot (e.g., slot n-2). In some examples, the UE 115 may miss reception of a DCI message 610. For example, the UE 115 may miss receiving a DCI message 610 over the component carrier 605-a during a different PDCCH occasion 620 over a different slot (e.g., slot n-1). However, in some examples, the UE 115 may receive a subsequent DCI message 610 over the component carrier 605-*a* during a different PDCCH occasion 620, but during the same slot (e.g., slot n-1).

In the example of FIG. 6, the UE 115 may be configured, such that a counter DAI field is counted by one or two depending on whether a DCI message 610 schedules one component carrier 605 or multiple component carriers 605 (e.g., whether the DCI message schedules one PDSCH 615 or multiple PDSCH 615). For example, if the DCI messages 610 schedule a single PDSCH 615, the UE 115 may be configured to increment a count in a corresponding counter DAI field by one. Alternatively, if the DCI messages 610 schedule multiple PDSCH 615, the UE 115 may be configured to increment a count in a corresponding counter DAI field(s) by two.

The UE 115 may, in a codebook 630, add one DAI position before the indicated DAI in each detected DCI message 610 that schedules multiple PDSCH 615. In other examples, if the detected DCI message 610 schedules a single PDSCH 615, the UE 115 may be configured to increment a count in a corresponding counter DAI field of a following DCI message 610 (e.g., a next DCI message 610) by one. Alternatively, if the detected DCI message 610 schedules multiple PDSCH 615, the UE 115 may be configured to increment a count in a corresponding counter DAI field(s) of a following DCI message (e.g., a next DCI message) by two. The UE 115 may, in the codebook 630, add one DAI position after the indicated DAI field in each detected DCI message 610 that schedules multiple PDSCH 615.

The UE 115 may generate the codebook 630 and assign HARQ feedback (e.g., A/N, N, or N) associated with each of the DCI messages 610. The HARQ feedback may include one or more HARQ feedback bits. For example, the UE 115 may assign one or more HARQ feedback bits (e.g., A/N) for each DCI message 610 based on a decoding result of each DCI message 610. In some other examples, the UE 115 may assign one or more HARQ feedback bits (e.g., N) for each DCI message 610 based on the UE 115 missing a DCI message 610. In some examples, the UE 115 may determine that the missing DCI message 610 (based on DAI holes after adding the DAI positions for DCI messages 610 that schedule multiple PDSCHs 615) should have scheduled one PDSCH 615 only in this case, since there is one DAI hole. In other examples, the UE 115 may assign one or more HARQ feedback dummy bits (e.g., N) for each DCI message 610 that schedules a single PDSCH.

In some examples, in addition to scheduling the various PDSCH 615, the UE 115 may be configured to provide HARQ feedback on a PUCCH 625. The UE 115 may determine or select a resource (e.g. a PUCCH resource associated with the PUCCH 625), or determine a payload for HARQ feedback carried via the PUCCH 625, based on an ordering of the DCI messages 610. In the example of FIG. 6, the UE 115 may order the DCI messages 610 based on a component carrier index associated with a scheduled PDSCH 615 by each of the DCI messages 610, as well as PDCCH occasions 620. For example, the UE 115 may order the DCI messages 610 and determine a DCI message 610 having a highest component carrier index associated with a scheduled PDSCH 615, and select a corresponding resource for the PUCCH 625, or determine a payload for HARQ feedback carried via the PUCCH 625, based on the DCI message 610 having the highest component carrier index.

Alternatively, the UE 115 may determine a DCI message 610 having a lowest component carrier index associated with a scheduled PDSCH 615, and generate a HARQ-ACK codebook at least in part the DCI message 610 having the lowest component carrier index. In some examples, each DCI message 610 may also identify a feedback timing indicator field ($K_1$), which may indicate a timing value (also referred to as a timing offset) in resources (e.g., a symbol, a minislot, a slot, a subframe, a frame) between reception of a PDSCH 615 (e.g., reception of a PDSCH transmission) and transmission of a corresponding PUCCH 625 (e.g., transmission of HARQ feedback on the PUCCH). The UE 115 may therefore determine an ordering of the DCI messages 610 and select a PUCCH resource, or determine a payload for HARQ feedback carried via the PUCCH 625, based on the ordering.

There are several advantages of DAI for multi-component carrier scheduling in accordance with aspects of the present disclosure, and in particular with reference to the techniques described with reference to block diagram 600. One advantage that DAI for multi-component carrier scheduling provides is a smaller overhead (e.g., smaller HARQ-ACK overhead). A second advantage that DAI for multi-component carrier scheduling provides is that with the smaller overhead, there is no need to insert dummy feedback bits (e.g., dummy NACKs) in the codebook if a DCI message schedules only one PDSCH. A third advantage that DAI for multi-component carrier scheduling provides is scheduling component carriers with TB-based feedback (e.g., TB-based A/N) or code block group-based feedback (e.g., code block group-based A/N). A fourth advantage that DAI for multi-component carrier scheduling provides is reduced overhead for DCI messages.

Returning to FIG. 2, in some examples, multiple counter DAI values (e.g., two counter DAI values) may be indicated in a single DCI message of the DCI messages 210. The multiple counter DAI values may be represented by one or more bits (e.g., a bit sequence). In some examples, if the DCI message schedules a single PDSCH, the UE 115-*a* may be configured to ignore counter DAI values other than the one associated with the scheduled PDSCH (e.g. by setting the ignored counter DAI values to zero (e.g., setting one or more bits to zero "00"). Alternatively, if the DCI message schedules multiple PDSCH (e.g., two PDSCH), the multiple counter DAI values (e.g., the two counter DAI values) may correspond to the multiple scheduled PDSCH (e.g., the two scheduled PDSCH). In this case, a value of the counter DAI filed associated with a DCI message having a specific control format (e.g., a DCI format 1_0, a DCI format 1_1) may define a number (e.g., of serving cells, PDCCH occasions, pairs) in which PDSCH reception(s) or SPS PDSCH releases associated with the specific control format are present, and up to a current serving cell and a current PDCCH occasion. The UE 115-*a* may order the DCI message in an ascending (or descending) order based on a serving cell index and a PDCCH occasion index.

Figure 7:
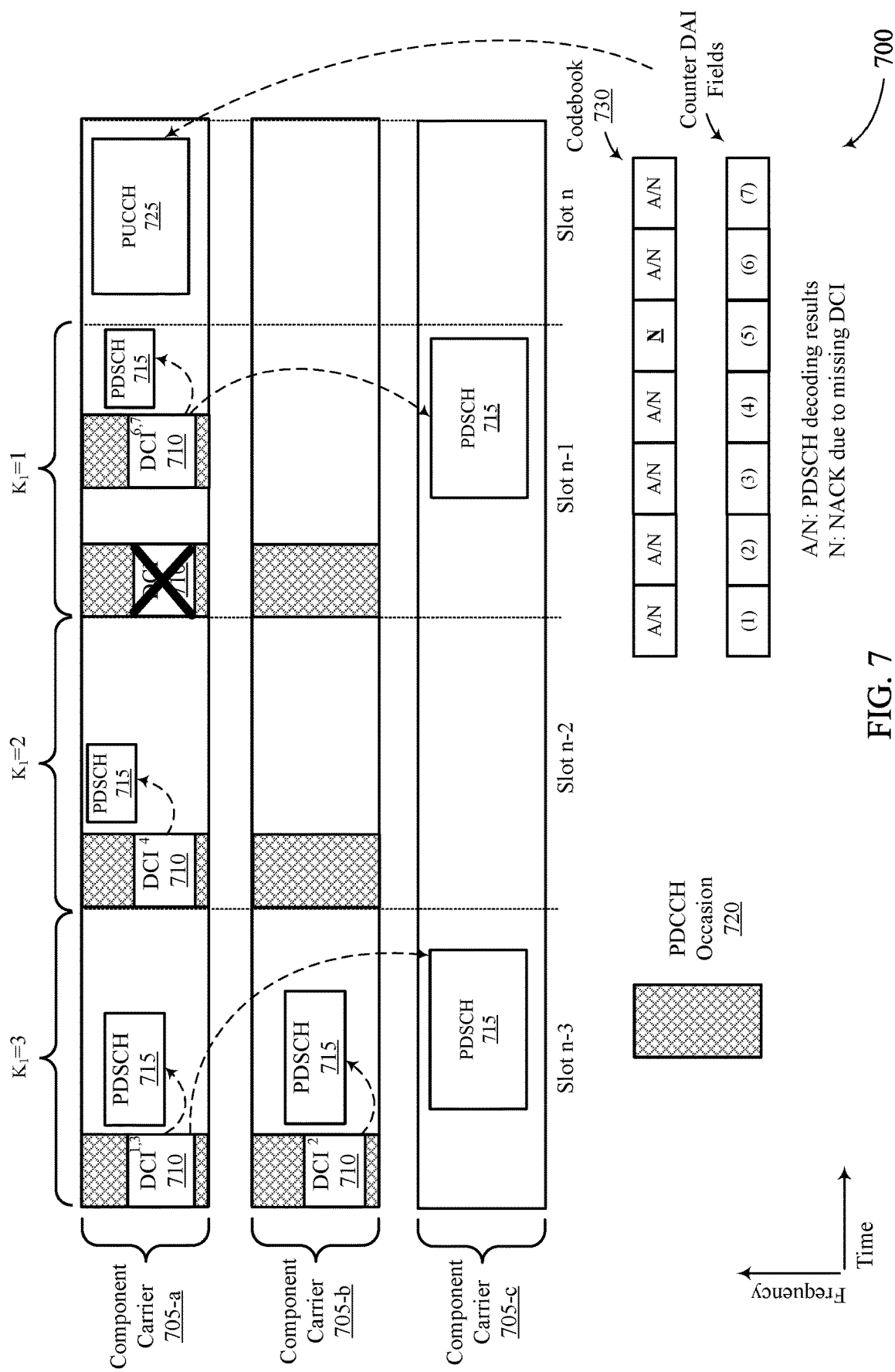

FIG. 7 illustrates an example of a block diagram 700 that supports DAI for multi-component carrier scheduling in accordance with aspects of the present disclosure. The block diagram 700 may implement aspects of the wireless communications systems 100 and 200 described with reference to FIGS. 1 and 2, respectively. For example, the block diagram 700 may be based on a configuration by a base station 105, and implemented by a UE 115. In the example illustrated in FIG. 7, the block diagram 700 may be applicable to implementations or instances when the UE 115 is configured to support NR DSS. Additionally, in the example illustrated in FIG. 7, the block diagram 700 may be applicable to implementations or instances when the UE 115 is configured to provide HARQ feedback for multiple physical channels (e.g., multiple PDSCH) scheduled via multi-component carrier.

For example, a UE 115 may communicate with a base station 105 over multiple component carriers 705. The component carriers 705 may correspond to a system bandwidth, which may correspond to time resources (e.g., a symbol, a minislot, a slot, a subframe, a frame), as well as frequency resources (e.g., subcarriers, carriers). In some examples, the component carriers 705 may have different subcarrier spacings, as described herein. In some examples, the UE 115 may communicate with a primary cell, a primary secondary cell, or a secondary cell using a component carrier 705-a, a component carrier 705-b, or a component carrier 705-c, or any combination thereof. Examples of a primary cell, a primary secondary cell, or a secondary cell may be examples of a base station 105, as described with reference to FIGS. 1 and 2.

In the example of FIG. 7, a UE 115 may receive one or more DCI messages 710, each DCI message 710 may schedule one or multiple PDSCH 715. In some examples, the UE 115 may receive one or more DCI messages 710 during one or more PDCCH occasions 720. A PDCCH occasion may include a number of symbols, minislots, slots, subframes, or frames. For example, as illustrated in FIG. 7, the UE 115 may receive a DCI message 710 over the component carrier 705-a during a PDCCH occasion 720. This received DCI message 710 may schedule multiple PDSCH 715 over a same slot (e.g., slot n-3), for example, such as one PDSCH 715 on the component carrier 705-a and another PDSCH 715 on the component carrier 705-c. In some examples, the UE 115 may receive another DCI message 710 over the component carrier 705-b during a same PDCCH occasion 720. This received DCI message 710 may schedule a single PDSCH 715 on the component carrier 705-b over the same slot (e.g. slot n-3).

The UE 115 may, in some examples, receive a DCI message 710 over the component carrier 705-a during a different PDCCH occasion 720. This received DCI message 710 may schedule a single PDSCH 715 on the component carrier 705-b over a different slot (e.g., slot n-2). In some examples, the UE 115 may miss reception of a DCI message 710. For example, the UE 115 may miss receiving a DCI message 710 over the component carrier 705-a during a different PDCCH occasion 720 over a different slot (e.g., slot n-1). However, in some examples, the UE 115 may receive a subsequent DCI message 710 over the component carrier 705-a during a different PDCCH occasion 720, but during the same slot (e.g., slot n-1).

In the example of FIG. 7, multiple counter DAI values (e.g., two counter DAI values) may be indicated in a single DCI message 710. The multiple counter DAI values may be represented by one or more bits (e.g., a bit sequence). In some examples, if a DCI message 710 schedules a single PDSCH 715, the UE 115 may be configured to ignore counter DAI values other than the one associated with the scheduled PDSCH 715 (e.g. by setting the ignored counter DAI values to zero (e.g., setting one or more bits to zero "00"). Alternatively, if a DCI message 710 schedules multiple PDSCH 715 (e.g., two PDSCH 715), the multiple counter DAI values (e.g., the two counter DAI values) may correspond to the multiple scheduled PDSCH 715 (e.g., the two scheduled PDSCH 715).

The UE 115 may generate the codebook 730 and assign HARQ feedback (e.g., A/N, N, or N) associated with each of the DCI messages 710. The HARQ feedback may include one or more HARQ feedback bits. For example, the UE 115 may assign one or more HARQ feedback bits (e.g., A/N) for each DCI message 710 based on a decoding result of each DCI message 710. In some other examples, the UE 115 may assign one or more HARQ feedback bits (e.g., N) for each DCI message 710 based on the UE 115 missing a DCI message 710. In other examples, the UE 115 may assign one or more HARQ feedback dummy bits (e.g., N) for each DCI message 710 that schedules a single PDSCH.

In some examples, in addition to scheduling the various PDSCH 715, the UE 115 may be configured to provide HARQ feedback on a PUCCH 725. The UE 115 may determine or select a resource (e.g. a PUCCH resource associated with the PUCCH 725), or determine a payload for HARQ feedback carried via the PUCCH 725, based on an ordering of the DCI messages 710. In the example of FIG. 7, the UE 115 may order the DCI messages 710 based on a component carrier index associated with a scheduled PDSCH 715 by each of the DCI messages 710, as well as PDCCH occasions 720. For example, the UE 115 may order the DCI messages 710 and determine a DCI message 710 having a highest component carrier index associated with a scheduled PDSCH 715, and select a corresponding resource for the PUCCH 725, or a payload for HARQ feedback carried via the PUCCH 725, based on the DCI message 710 having the highest component carrier index.

Alternatively, the UE 115 may determine a DCI message 710 having a lowest component carrier index associated with a scheduled PDSCH 715, and select a corresponding payload for HARQ feedback carried via the PUCCH 725 based on the DCI message 710 having the lowest component carrier index. In some examples, each DCI message 710 may also identify a feedback timing indicator field ($K_1$), which may indicate a timing value (also referred to as a timing offset) in resources (e.g., a symbol, a minislot, a slot, a subframe, a frame) between reception of a PDSCH 715 (e.g., reception of a PDSCH transmission) and transmission of a corresponding PUCCH 725 (e.g., transmission of HARQ feedback on the PUCCH). The UE 115 may therefore determine an ordering of the DCI messages 710 and select a PUCCH resource, or determine a payload for HARQ feedback carried via the PUCCH 725, based on the ordering.

There are several advantages of DAI for multi-component carrier scheduling in accordance with aspects of the present disclosure, and in particular with reference to the techniques described with reference to block diagram 700. One advantage that DAI for multi-component carrier scheduling provides is a smaller overhead (e.g., smaller HARQ-ACK overhead). For example, with the smaller overhead, there is no need to insert dummy feedback bits (e.g., dummy NACKs) in the codebook if a DCI message schedules only one PDSCH. A second advantage that DAI for multi-component carrier scheduling provides is a smaller specification impact. A third advantage that DAI for multi-component carrier scheduling provides is support for requesting TB-based feedback (e.g., TB-based A/N) for one component carrier and a code block group-based feedback (e.g., code block group-based A/N) for another component carrier. Because TB-based and code block group-based are two sub-codebooks with separate counting, DAIs corresponding to TB-based feedback are counted separately than DAIs corresponding to CBG-based feedback. Thus, because two separate counter DAIs are indicated, two separate total DAIs may be indicated in a DCI message. A fourth advantage that DAI for multi-component carrier scheduling provides is that two indicated DAI in the DCI message might not be consecutive depending on component carrier indices that are scheduled. A fifth advantage that DAI for multi-component carrier scheduling provides is scheduling component carriers with TB-based feedback (e.g., TB-based A/N) or code block group-based feedback (e.g., code block group-based A/N).

Returning to FIG. 2, in some examples, the base station 105-*a* may configure the UE 115-*a* to support a code block group-based feedback for a HARQ feedback codebook (e.g., a Type-2 codebook). For example, the UE 115-*a* may be configured via an RRC parameter in an RRC configuration (e.g., a PDSCH-CodeBlockGroupTransmission) to support a code block group-based feedback for a Type-2 codebook. In some examples, the code block group-based feedback may be configured for one or more downlink serving cells. The HARQ feedback codebook may include one or multiple sub-codebooks (e.g., two sub-codebooks).

In some examples, the UE 115-*a* may be configured to provide code block group-based feedback for one or more serving cells $N_{cells}^{DL,CBG}$ serving cells. Alternatively, the UE 115-*a* may not be configured to provide code block group-based feedback for one or more serving cells for $N_{cells}^{DL,TB}$ serving cells where $N_{cells}^{DL,TB} + N_{cells}^{DL,CBG} = N_{cells}^{DL}$. The UE 115-*a* may determine a number of feedback bits $\tilde{o}_0^{ACK}, \tilde{o}_1^{ACK}, \ldots, \tilde{o}_{o^{ACK}-1}^{ACK}$. In some examples, the UE 115-*a* may use $N_{cells}^{DL}$ for the determination of a first HARQ-ACK sub-codebook for SPS PDSCH release, SPS PDSCH reception, and for TB-based PDSCH receptions on the $N_{cells}^{DL,CBG}$ serving cells and on the $N_{cells}^{DL,TB}$ serving cells. In some examples, the UE 115-*a* may replace $N_{cells}^{DL}$ by $N_{cells}^{DL,CBG}$ for the determination of a second HARQ-ACK sub-codebook corresponding to the $N_{cells}^{DL,CBG}$ serving cells for CBG-based PDSCH receptions.

In some examples, a counter DAI value and a total DAI values may apply separately for each sub-codebook. The UE 115-*a* may, in some examples, be configured to use a first sub-codebook for all downlink serving cells when code block group-based feedback is not needed (e.g., when code block group-based feedback is not configured for a component carrier), or a DCI message (e.g., a DCI format 1_0) is used for SPS. The UE 115-*a* may be configured to generate feedback bits (e.g., A/N bits) per TB. For each location in the first sub-codebook, the UE 115-*a* may be configured to use one feedback bit (e.g., one A/N bit). Alternatively, the for each location in the first sub-codebook, the UE 115-*a* may be configured to use multiple feedback bits (e.g., two A/N bits). For example, the UE 115-*a* may be configured to use multiple feedback bits, for at least one component carrier if a number of codewords scheduled by a DCI message (e.g., the DCI message 210) is two for at least one component carrier.

The UE 115-*a* may, in some other examples, be configured to use a second sub-codebook for downlink serving cells when code block group-based feedback is configured for a component carrier or multiple component carriers. Here, the UE 115-*a* may use a maximum number of code block group-based feedback for the component carrier or the multiple component carriers, and generate a single feedback bit (e.g., one A/N bit) per code block group. For each DAI location in the second sub-codebook, the UE 115-*a* may be configured to use a maximum code block group number of feedback bits (e.g. A/N bits) for HARQ feedback.

In some examples, the UE 115-*a* may be configured to support one DCI message scheduling multiple component carriers (e.g., two component carriers), if the component carriers (e.g., both component carriers) are configured with code block group-based feedback or are not configured with code block group-based feedback. Alternatively, the UE 115-*a* may be configured to support DCI messages that schedule multiple component carriers (e.g., two component carriers) and at least one component carrier is configured with code block group-based feedback (e.g., through an RRC parameter (e.g., PDSCH-CodeBlockGroupTransmission) while the other component carrier is not configured with code block group-based feedback. The UE 115-*a* may report HARQ feedback for multiple component carriers (e.g., both component carriers) as part of code block group-based feedback sub-codebook.

The UE 115-*a* may be configured to generate, for each DAI position, a maximum number of feedback bits $$\max\left(2 * N_c^{TBs} * N_c^{\frac{CBGs}{TB}}\right)$$

as described herein, for example in combination with one or more of the examples described with reference to FIGS. 2 through 7, where the maximum number of feedback bits is applicable over all component carriers configured with code block group-based feedback. In some other examples as described herein, for example in combination with one or more of the examples described with reference to FIGS. 2 through 7, the UE 115-*a* may be configured to generate, for each DAI position (including added DAI positions), a maximum number of feedback bits (e.g., $$\max\left(N_c^{TBs} * N_c^{\frac{CBGs}{TB}}\right)$$

where the maximum number of feedback bits is applicable over all component carriers that are configured with code block group-based feedback. In some examples, for component carriers that are not configured with code block group-based feedback, a number of feedback bits per TB per DAI position may be equal to a max number of code block groups per TB (e.g., across all component carriers configured with code block group-based feedback). In some examples, a first feedback bit may be used for decoding of a TB and the remaining bits may be dummy feedback bits (e.g., dummy NACKs). In some examples, if the DCI messages 210 schedule multiple component carriers, for example, such as two component carriers, a first component carrier may be configured with code block group-based feedback (e.g., via an RRC parameter (e.g., PDSCH-CodeBlockGroupTransmission)) while a second component carrier is not configured with code block group-based feedback. The indicated DAI for the first component carrier may be used for code block group-based sub-codebook generation. In some examples, the indicated DAI for the second component carrier may be used for TB-based sub-codebook generation.

Additionally or alternatively, the UE 115-*a* may use the DCI messages 210 to determine one or more power control parameters associated with HARQ feedback on a PUCCH. In some examples, the PUCCH may carry uplink control information (UCI), which may include a payload associated with the HARQ feedback (e.g., the UCI may include the HARQ feedback). In some examples (e.g., when the UCI payload is less than or equal to 11 bits), the UE 115-*a* may calculate a number of feedback bits and use the calculated bits to determine a PUCCH power control formula. The calculated bits may exclude a number of dummy NACKs from the payload and may include a number of NACKs due to missing DCI messages (e.g., a NACK transmission based on not receiving a physical channel in the absence of a DCI message), as well as a number of received TBs. In some examples, the number of feedback bits may be calculated based on Equation 1 below.

$$n_{HARQ-ACK} =$$
$$n_{HARQ-ACK,TB} = \left(\left(V_{DAI,m_{last}}^{DL} - \sum_{c=0}^{N_{cells}^{DL}-1} U_{DAI,c}\right) \bmod 4\right) N_{TB,max}^{DL} +$$
$$\sum_{c=0}^{N_{cells}^{DL}-1}\left(\sum_{m=0}^{M-1} N_{m,c}^{received} + N_{SPS,c}\right) \quad (1)$$

In some examples, $n_{HARQ-ACK}$ and $n_{HARQ-ACK,TB}$ may be the number of feedback bits (e.g., HARQ-ACK bits). In some examples, $V_{DAI,m_{last}}^{DL}$ may be the value of the total DAI (if any) in the last PDCCH monitoring occasion or the last value of the counter associated with the DAI field in the last monitoring occasion. In some examples, the value of $V_{DAI,m_{last}}^{DL}$ may be 0 if the UE 115-a does not detect any DCI messages 210 (e.g., DCI format 1_0 or DCI format 1_1) scheduling PDSCH reception or indicating a downlink SPS release for any serving cell c in any of the M monitoring occasions. In some examples, $U_{DAI,c}$ may be the total number of a DCI format scheduling PDSCH receptions or indicating SPS PDSCH release that the UE 115-a may detect within the M PDDCH monitoring occasions for a serving cell c. Alternatively, in some examples, $U_{DAI,c}$ may be the total number of a DCI format scheduling PDSCH receptions or indicating SPS PDSCH release that the UE 115-a detects within the M PDCCH monitoring occasions for serving cell c, where a detected DCI format that schedules two PDSCHs is counted as two times. In some examples, the $N_{TB,max}^{DL}$ may be the maximum number of downlink TBs associated with a corresponding DCI message 210. The value of $N_{TB,max}^{DL}$ may be equal to two if the value of the higher layer parameter maxNofCodeWordsScheduledByDCI is two for any serving cell c and the higher layer parameter harq-ACK-SpatialBundlingPUCCH is not provided. Otherwise, the value of $N_{TB,max}^{DL}$ may be one.

In some examples, the value of $N_{TB,max}^{DL}$ may be two, if the UE 115-a is configured with multi-component carrier scheduling (even if a maximum number of codewords is one for all component carriers). In some other examples, the value of $N_{TB,max}^{DL}$ may be one, if the UE 115-a is configured with multi-component carrier scheduling but HARQ-Ack bundling across two PDSCHs is configured. In other examples, the value of $N_{TB,max}^{DL}$ may be four, if the UE 115-a is configured with one or multiple component carriers (that can be schedule via multi-component carrier scheduling) and are also configured with a maximum of two codewords (e.g., a multi-component carrier DCI message can schedule four codewords total).

In some examples, the $N_{cells}^{DL}$ may be the number of downlink serving cells, which may be associated with the number of component carriers over which the DCI messages 210 schedules PDSCHs. $N_{m,c}^{received}$ may be the number of TBs that the UE 115-a receives in a PDSCH scheduled by a DCI message 210 (e.g., DCI format 1_0 or DCI format 1_1) that the UE 115-a detects in a PDCCH monitoring occasion m for a serving cell c if the higher layer parameter harq-ACK-SpatialBundlingPUCCH is unprovided (e.g., if the UE 115-a does not identify harq-ACK-SpatialBundling-PUCCH). If the higher layer parameter harq-ACK-SpatialBundlingPUCCH is provided (e.g., if the UE 115-a identifies harq-ACK-SpatialBundlingPUCCH), $N_{m,c}^{received}$ may be the number of PDSCH scheduled by the DCI message 210 (e.g., a DCI format 1_0 and a DCI format 1_1 that the UE 115-a detects in the PDDCH occasion m for a serving cell c. Alternatively, $N_{m,c}^{received}$ may be the number of DCI messages 210 (e.g., DCI format 1_0) that the UE 115-a detects and indicates for SPS PDSCH release in PDCCH monitoring occasion m for a serving cell c. In some examples, $N_{SPS,c}$ may be the number of SPS PDSCH receptions by the UE 115-a on a serving cell c for which the UE 115-a transmits corresponding feedback (e.g., HARQ-ACK information) in the same PUCCH as the UE 115-a uses for feedback corresponding to PDSCH receptions or SPS PDSCH release scheduled by the DCI message 210 (e.g., DCI format 1_0) within the M PDCCH monitoring occasions.

There are several advantages of DAI for multi-component carrier scheduling in accordance with aspects of the present disclosure, and in particular with reference to the techniques described with reference to block diagrams 600 through 700. One advantage is a more robust to consecutive DCI messages being missed. One advantage is a reduction in issues related to consecutive DCI message missing (e.g., where 4 consecutive DCI messages due to modulo 4 operation for DAI). For example, with reference to block diagrams 600 through 700, if 2 consecutive DCI messages are missed and both schedule 2 PDSCHs, then codebook size may still be corrected. Alternatively, with reference to block diagrams 600 through 700, if 3 consecutive DCI messages are missed and at least one of them schedules 2 PDSCHs, the codebook size may not be able to be corrected.

Figure 8:
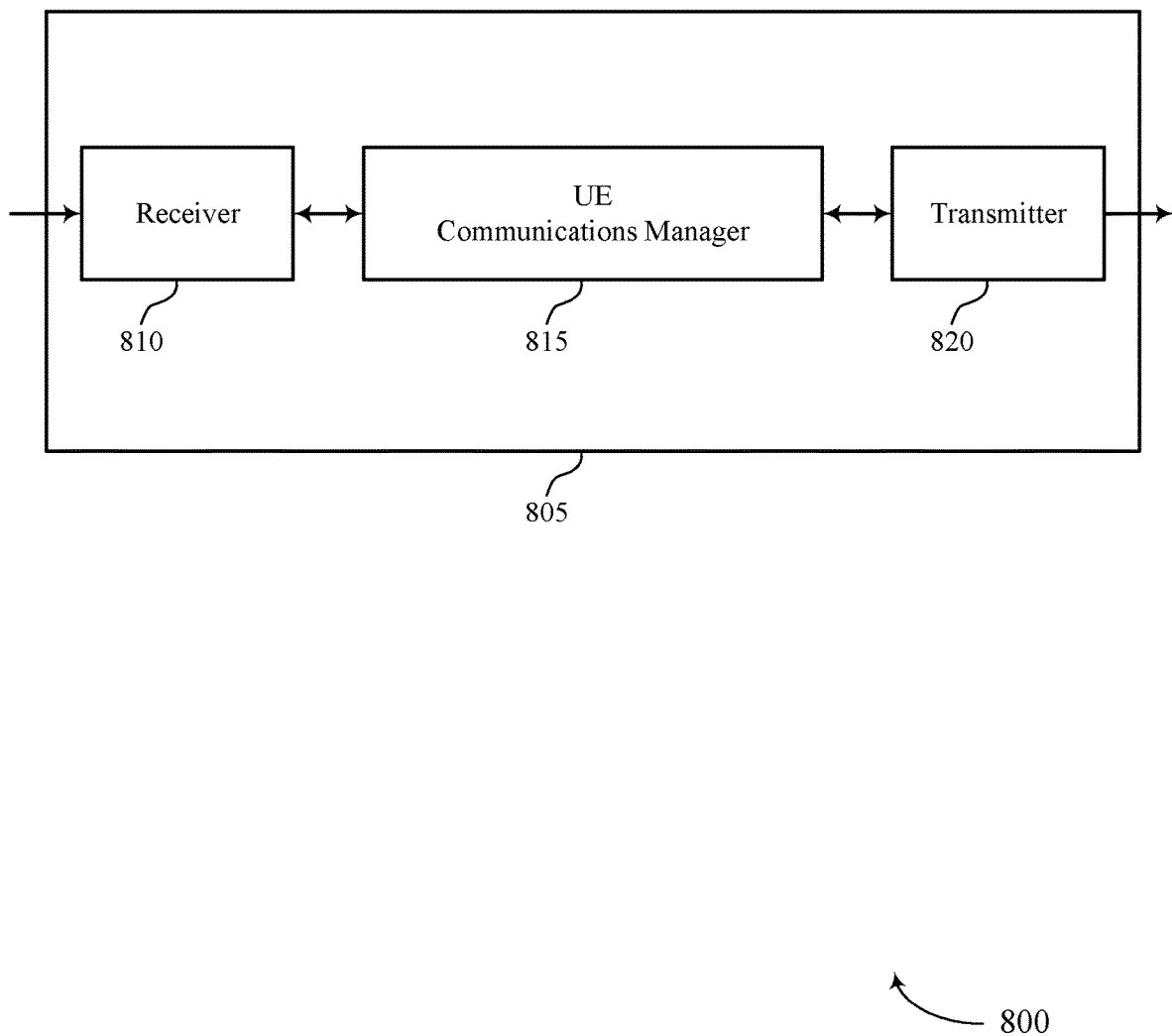
FIGS. 8 and 9 show block diagrams of devices that support DAI for multi-component carrier scheduling in accordance with aspects of the present disclosure.

FIG. 8 shows a block diagram 800 of a device 805 that supports DAI for multi-component carrier scheduling in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DAI for multi-component carrier scheduling, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identify a set of DAI in the received set of DCI messages, each DCI message of the set of DCI messages including a unique DAI of the set of DAI, generate a set of feedback bits of an acknowledgement codebook, the set of feedback bits including a same number of feedback bits for each DAI of the set of DAI, and transmit the generated set of feedback bits on an uplink control channel.

The UE communications manager 815 may also receive a set of DCI messages scheduling a set of downlink data channels, the set of DCI messages including at least a first DCI message scheduling a first downlink data channel of a first component carrier and a second downlink data channel of a second component carrier, identify, in the first DCI message, one DAI for both the first downlink data channel and the second downlink data channel, generate a set of feedback bits corresponding to the set of downlink data channels, the set of feedback bits including a first feedback bit and a second feedback bit corresponding to the first downlink data channel and the second downlink data channel, assign the first feedback bit to a first position in an acknowledgement codebook indicated by the one DAI and the second feedback bit to a second position in the acknowledgement codebook that is adjacent the first position, and transmit the generated set of feedback bits on an uplink control channel.

The UE communications manager 815 may also receive a set of DCI messages including a first DCI message scheduling a first downlink data channel of a first component carrier and a second downlink data channel of a second component carrier, each DCI message of the set of DCI messages including at least two DAI values, generate a set of feedback bits of an acknowledgement codebook, including at least a first feedback bit corresponding to the first downlink data channel based on a first DAI value, a second feedback bit corresponding to the second downlink data channel based on a second DAI value, and transmit the generated set of feedback bits on an uplink control channel. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
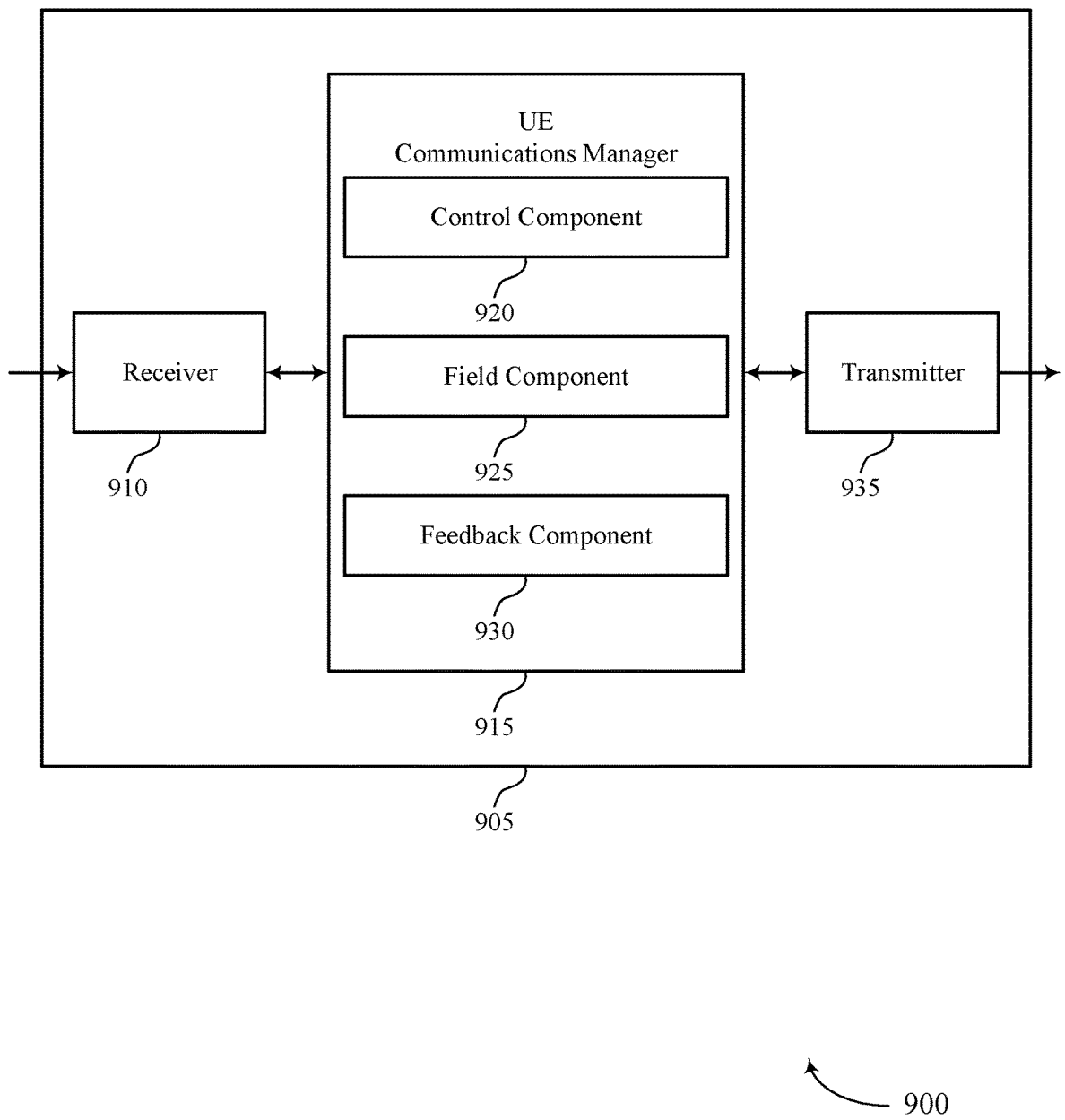

FIG. 9 shows a block diagram 900 of a device 905 that supports DAI for multi-component carrier scheduling in accordance with aspects of the present disclosure. The device 905 may be an example of aspects of a device 805, or a UE 115 as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to DAI for multi-component carrier scheduling, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a control component 920, a field component 925, and a feedback component 930. The UE communications manager 915 may be an example of aspects of the UE communications manager 1110 described herein.

The control component 920 may receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. The field component 925 may identify a set of DAI in the received set of DCI messages, each DCI message of the set of DCI messages including a unique DAI of the set of DAI. The feedback component 930 may generate a set of feedback bits of an acknowledgement codebook, the set of feedback bits including a same number of feedback bits for each DAI of the set of DAI and transmit the generated set of feedback bits on an uplink control channel.

The control component 920 may receive a set of DCI messages scheduling a set of downlink data channels, the set of DCI messages including at least a first DCI message scheduling a first downlink data channel of a first component carrier and a second downlink data channel of a second component carrier. The field component 925 may identify, in the first DCI message, one DAI for both the first downlink data channel and the second downlink data channel. The feedback component 930 may generate a set of feedback bits corresponding to the set of downlink data channels, the set of feedback bits including a first feedback bit and a second feedback bit corresponding to the first downlink data channel and the second downlink data channel, assign the first feedback bit to a first position in an acknowledgement codebook indicated by the one DAI and the second feedback bit to a second position in the acknowledgement codebook that is adjacent the first position, and transmit the generated set of feedback bits on an uplink control channel.

The control component 920 may receive a set of DCI messages including a first DCI message scheduling a first downlink data channel of a first component carrier and a second downlink data channel of a second component carrier, each DCI message of the set of DCI messages including at least two DAI values. The feedback component 930 may generate a set of feedback bits of an acknowledgement codebook, including at least a first feedback bit corresponding to the first downlink data channel based on a first DAI value, a second feedback bit corresponding to the second downlink data channel based on a second DAI value and transmit the generated set of feedback bits on an uplink control channel.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
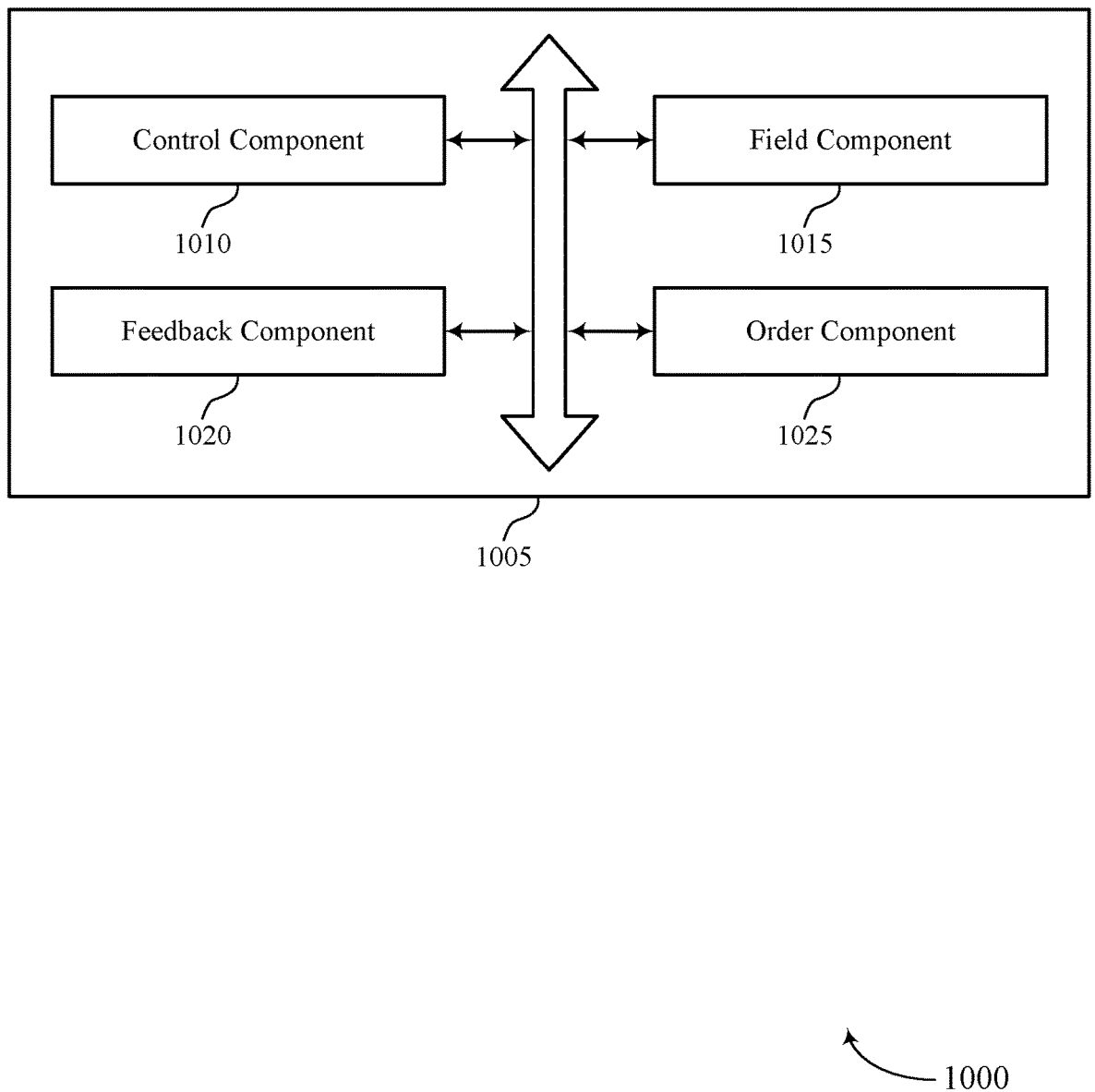
FIG. 10 shows a block diagram of a user equipment (UE) communications manager that supports DAI for multi-component carrier scheduling in accordance with aspects of the present disclosure.

FIG. 10 shows a block diagram 1000 of a UE communications manager 1005 that supports DAI for multi-component carrier scheduling in accordance with aspects of the present disclosure. The UE communications manager 1005 may be an example of aspects of a UE communications manager 815, a UE communications manager 915, or a UE communications manager 1110 described herein. The UE communications manager 1005 may include a control component 1010, a field component 1015, a feedback component 1020, and an order component 1025. Each of these components may communicate, directly or indirectly, with one another (e.g., via one or more buses).

The control component 1010 may receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. In some examples, the control component 1010 may receive a set of DCI messages scheduling a set of downlink data channels, the set of DCI messages including at least a first DCI message scheduling a first downlink data channel of a first component carrier and a second downlink data channel of a second component carrier. In some examples, the control component 1010 may receive a set of DCI messages including a first DCI message scheduling a first downlink data channel of a first component carrier and a second downlink data channel of a second component carrier, each DCI message of the set of DCI messages including at least two DAI values.

In some examples, the control component 1010 may determine that at least one of the first component carrier or the second component carrier are configured for a code block group-based feedback, where generating the set of feedback bits of the acknowledgement codebook is based on the code block group-based feedback. In some examples, the control component 1010 may generate, for each unique DAI of the set of DAI for each DCI message of the set of DCI messages, the same number of feedback bits for the first component carrier and the second component carrier based on the determining. In some examples, the control component 1010 may receive a second DCI message scheduling a third downlink data channel. In some examples, the control component 1010 may assign a value to a second DAI for the third downlink data channel based on the second DCI message scheduling the third downlink data channel by incrementing a DAI count by one.

In some examples, the control component 1010 may generate a code block group-based feedback sub-codebook based on the selected first DAI value. In some examples, the control component 1010 may generate a transport block-based feedback sub-codebook based on a second DAI value from the at least two DAI values. In some cases, the set of DCI messages further includes a second DCI message scheduling a third downlink data channel of a third component carrier. In some cases, the control component 1010 may select the first DAI value from the at least two DAI values to use to generate feedback information and ignoring the second DAI value, where generating the set of feedback bits of the acknowledgement codebook includes: generating the set of feedback bits of the acknowledgement codebook, including at least a third feedback bit corresponding to the third downlink data channel, based on the selected first DAI value. In some cases, the first component carrier is configured for a code block group-based feedback. In some cases, the second component carrier is not configured for a code block group-based feedback.

The field component 1015 may identify a set of DAI in the received set of DCI messages, each DCI message of the set of DCI messages including a unique DAI of the set of DAI. In some examples, the field component 1015 may identify, in the first DCI message, one DAI for both the first downlink data channel and the second downlink data channel. In some examples, the field component 1015 for each unique DAI associated with each DCI message of the set of DCI messages are assigned a single value by incrementing each unique DAI. In some examples, the field component 1015 may identify a component carrier index of the one or more component carrier indices that is greater than one or more other component carrier indices of the one or more component carrier indices, where ordering the set of DCI messages is based on the identified component carrier index of the one or more component carrier indices that is greater than one or more other component carrier indices of the one or more component carrier indices for each DCI message of the set of DCI messages.

In some examples, the field component 1015 may identify a component carrier index of the one or more component carrier indices that is less than one or more other component carrier indices of the one or more component carrier indices, where ordering the set of DCI messages is based on the identified component carrier index of the one or more component carrier indices that is less than one or more other component carrier indices of the one or more component carrier indices for each DCI message of the set of DCI messages. In some examples, the field component 1015 may assign a value to the one DAI, based on the first DCI message scheduling the first downlink data channel of the first component carrier and the second downlink data channel of the second component carrier, by incrementing a DAI count by two. In some examples, the field component 1015 may assign a value to a DAI of a second DCI message, based on the first DCI message scheduling the first downlink data channel of the first component carrier and the second downlink data channel of the second component carrier, by incrementing a DAI count by two, where the first DCI message precedes the second DCI message.

The feedback component 1020 may generate a set of feedback bits of an acknowledgement codebook, the set of feedback bits including a same number of feedback bits for each DAI of the set of DAI. In some examples, the feedback component 1020 may transmit the generated set of feedback bits on an uplink control channel. In some examples, the feedback component 1020 may generate a set of feedback bits corresponding to the set of downlink data channels, the set of feedback bits including a first feedback bit and a second feedback bit corresponding to the first downlink data channel and the second downlink data channel. In some examples, the feedback component 1020 may assign the first feedback bit to a first position in an acknowledgement codebook indicated by the one DAI and the second feedback bit to a second position in the acknowledgement codebook that is adjacent the first position.

In some examples, the feedback component 1020 may transmit the generated set of feedback bits on an uplink control channel. In some examples, the feedback component 1020 may generate a set of feedback bits of an acknowledgement codebook, including at least a first feedback bit corresponding to the first downlink data channel based on a first DAI value, a second feedback bit corresponding to the second downlink data channel based on a second DAI value. In some examples, the feedback component 1020 may transmit the generated set of feedback bits on an uplink control channel. In some examples, the feedback component 1020 may generate at least two feedback bits for each DAI of the set of DAI in the acknowledgement codebook.

In some examples, the feedback component 1020 may generate at least one feedback bit for each DAI of the set of DAI in the acknowledgement codebook based on a bundling rule. In some examples, the feedback component 1020 may determine that the first component carrier is configured for a code block group-based feedback and the second component carrier is not configured for the code block group-based feedback, where generating the set of feedback bits of the acknowledgement codebook is based on a code block group-based subcodebook. In some examples, the feedback component 1020 may determine a power level for the uplink control channel transmitting the generated set of feedback bits based on the number of acknowledgement bits. In some examples, the feedback component 1020 may assign the first feedback bit to the first position in the acknowledgement codebook indicated by the one DAI and the second feedback bit to the second position in the acknowledgement codebook that is after the first position.

In some examples, the feedback component 1020 may assign the first feedback bit to the first position in the acknowledgement codebook indicated by the one DAI and the second feedback bit to the second position in the acknowledgement codebook that is before the first position. In some examples, the feedback component 1020 may determine that at least one of the first component carrier or the second component carrier are configured for a code block group-based feedback, where generating the set of feedback bits is based on the code block group-based feedback. In some examples, the feedback component 1020 may generate, for each unique DAI for each DCI message of the set of DCI messages, the same number of feedback bits for the first component carrier and the second component carrier based on the determining. In some examples, the feedback component 1020 may determine that the first component carrier is configured for a code block group-based feedback and the second component carrier is not configured for a code block group-based feedback, where generating the set of feedback bits is based on a code block group-based subcodebook.

In some examples, the feedback component 1020 may generate the set of feedback bits of the acknowledgement codebook including at least the first feedback bit corresponding to the first downlink data channel is based on the first component carrier being configured for a code block group-based feedback. In some cases, the at least one feedback bit includes acknowledgement information for the first downlink data channel and the second downlink data channel. In some cases, the at least one feedback bit is one feedback bit based on a binary AND operation of a first bit of acknowledgement information for the first downlink data channel and a second bit of acknowledgement information for the second downlink data channel.

In some cases, the at least one feedback bit includes acknowledgement information for the third downlink data channel. In some cases, a number of acknowledgement bits related to the generated set of feedback bits of the acknowledgement codebook is based on a multi-component carrier scheduling configuration of the UE. In some cases, a number of acknowledgement bits related to the generated set of feedback bits of the acknowledgement codebook is based on a bundling configuration related to the generated set of feedback bits of the acknowledgement codebook. In some cases, a number of acknowledgement bits related to the generated set of feedback bits of the acknowledgement codebook is based on the first DCI message scheduling the first downlink data channel of the first component carrier and the second downlink data channel of the second component carrier.

In some cases, a number of acknowledgement bits related to the generated set of feedback bits of the acknowledgement codebook is based on the first DCI message scheduling the first downlink data channel of the first component carrier and the second downlink data channel of the second component carrier. The order component 1025 may order the set of DCI messages based on, for each DCI message of the set of DCI messages, one or more component carrier indices indicated by the DCI message or a control channel occasion associated with the DCI message, or both. In some examples, the order component 1025 may order the set of DCI messages based on, for each DCI message of the set of DCI messages, one or more component carrier indices indicated by the set of DCI messages or a control channel occasion associated with the set DCI messages, or both. In some examples, the order component 1025 may identify a component carrier index of the one or more component carrier indices that is greater than one or more other component carrier indices of the one or more component carrier indices, where ordering the set of DCI messages is based on the identified component carrier index of the one or more component carrier indices that is greater than one or more other component carrier indices of the one or more component carrier indices for each DCI message of the set of DCI messages.

In some examples, the order component 1025 may identify, based on the ordering, a component carrier index of the one or more component carrier indices that is less than one or more other component carrier indices of the one or more component carrier indices, where ordering the set of DCI messages is based on the identified component carrier index of the one or more component carrier indices that is less than one or more other component carrier indices of the one or more component carrier indices for each DCI message of the set of DCI messages. In some cases, a corresponding value of each unique DAI of the set of DAI for each DCI message of the set of DCI messages is based on the ordering of the set of DCI messages. In some cases, the value of each unique DAI of the set of DAI corresponds to one or more pairs of an accumulative number of DCI messages and control channel occasions associated with the number of DCI messages. In some cases, a corresponding value of each DAI for each DCI message of the set of DCI messages is based on the ordering.

Figure 11:
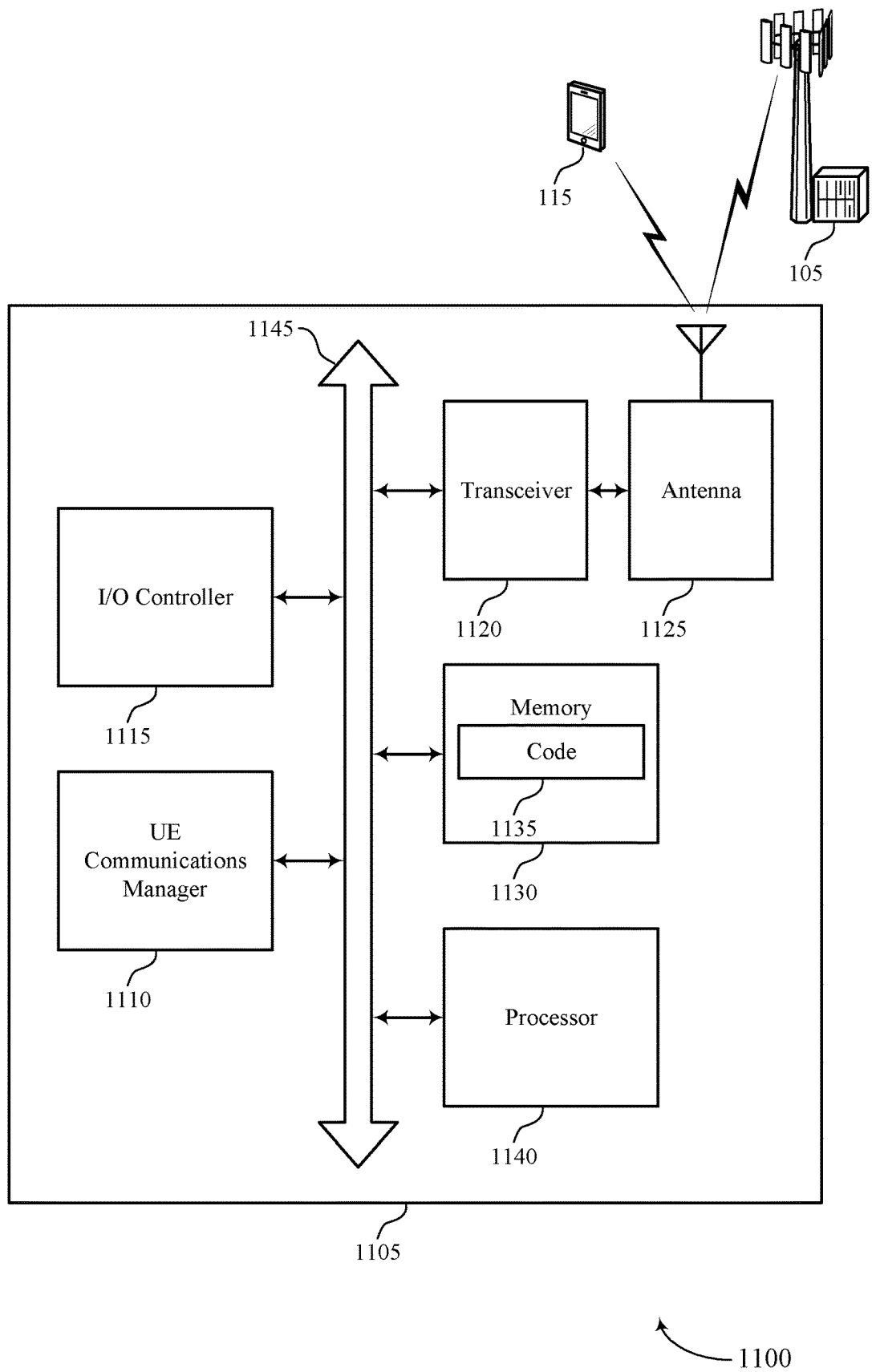
FIG. 11 shows a diagram of a system including a device that supports DAI for multi-component carrier scheduling in accordance with aspects of the present disclosure.

FIG. 11 shows a diagram of a system 1100 including a device 1105 that supports DAI for multi-component carrier scheduling in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel, identify a set of DAI in the received set of DCI messages, each DCI message of the set of DCI messages including a unique DAI of the set of DAI, generate a set of feedback bits of an acknowledgement codebook, the set of feedback bits including a same number of feedback bits for each DAI of the set of DAI, and transmit the generated set of feedback bits on an uplink control channel.

The UE communications manager 1110 may also receive a set of DCI messages scheduling a set of downlink data channels, the set of DCI messages including at least a first DCI message scheduling a first downlink data channel of a first component carrier and a second downlink data channel of a second component carrier, identify, in the first DCI message, one DAI for both the first downlink data channel and the second downlink data channel, generate a set of feedback bits corresponding to the set of downlink data channels, the set of feedback bits including a first feedback bit and a second feedback bit corresponding to the first downlink data channel and the second downlink data channel, assign the first feedback bit to a first position in an acknowledgement codebook indicated by the one DAI and the second feedback bit to a second position in the acknowledgement codebook that is adjacent the first position, and transmit the generated set of feedback bits on an uplink control channel.

The UE communications manager 1110 may also receive a set of DCI messages including a first DCI message scheduling a first downlink data channel of a first component carrier and a second downlink data channel of a second component carrier, each DCI message of the set of DCI messages including at least two DAI values, generate a set of feedback bits of an acknowledgement codebook, including at least a first feedback bit corresponding to the first downlink data channel based on a first DAI value, a second feedback bit corresponding to the second downlink data channel based on a second DAI value, and transmit the generated set of feedback bits on an uplink control channel.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DAI for multi-component carrier scheduling).

Figure 12:
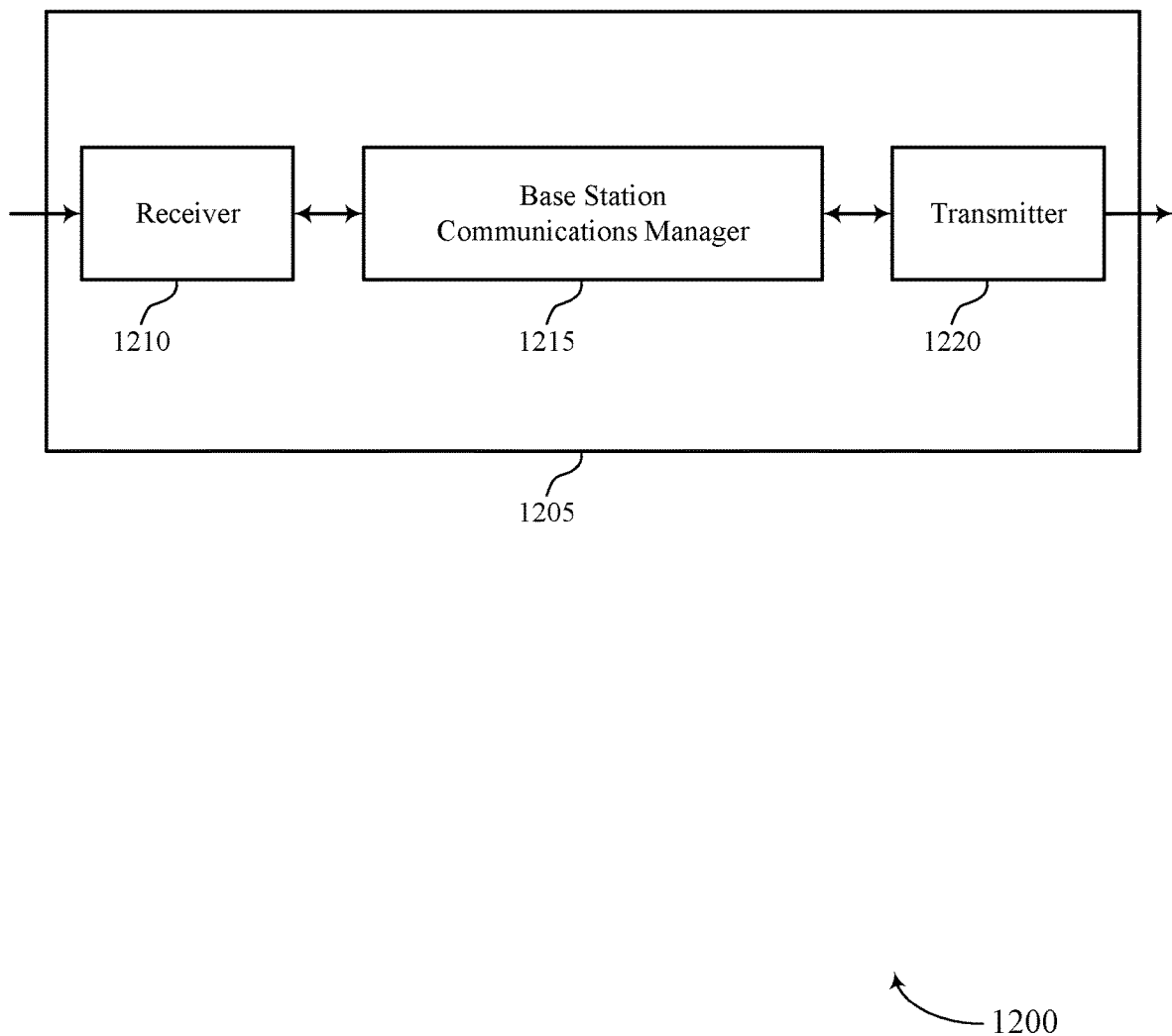
FIGS. 12 and 13 show block diagrams of devices that support DAI for multi-component carrier scheduling in accordance with aspects of the present disclosure.

FIG. 12 shows a block diagram 1200 of a device 1205 that supports DAI for multi-component carrier scheduling in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to DAI for multi-component carrier scheduling, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receive a generated set of feedback bits of an acknowledgement codebook on an uplink control channel, the set of feedback bits including a same number of feedback bits for each DAI of a set of DAI.

The base station communications manager 1215 may also transmit a set of DCI messages scheduling a set of downlink data channels, the set of DCI messages including at least a first DCI message scheduling a first downlink data channel of a first component carrier and a second downlink data channel of a second component carrier and receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

The base station communications manager 1215 may also transmit a set of DCI messages including a first DCI message scheduling a first downlink data channel of a first component carrier and a second downlink data channel of a second component carrier, each DCI message of the set of DCI messages including at least two DAI values and receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
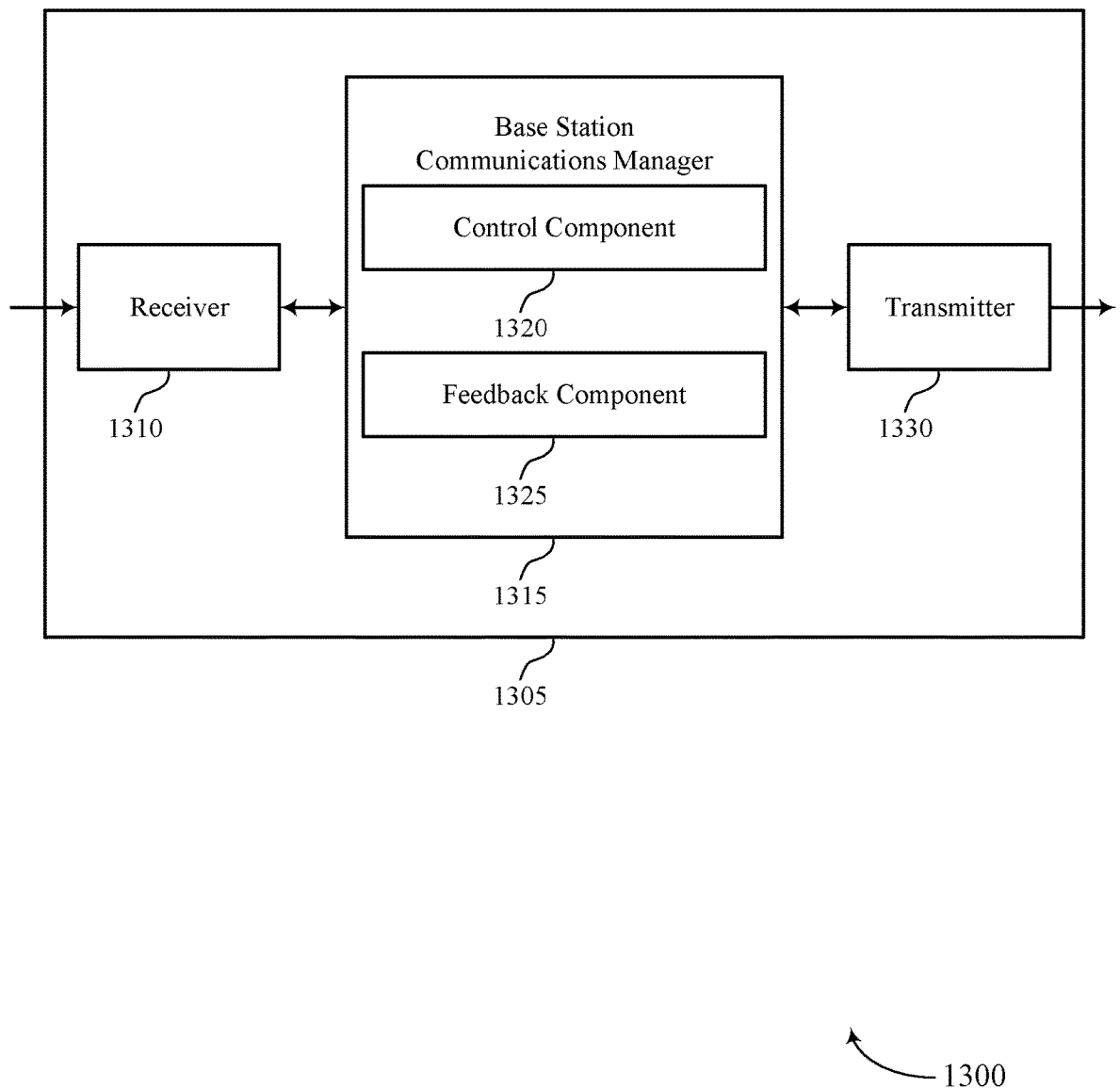

FIG. 13 shows a block diagram 1300 of a device 1305 that supports DAI for multi-component carrier scheduling in accordance with aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to DAI for multi-component carrier scheduling, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a control component 1320 and a feedback component 1325. The base station communications manager 1315 may be an example of aspects of the base station communications manager 1510 described herein.

The control component 1320 may transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. The feedback component 1325 may receive a generated set of feedback bits of an acknowledgement codebook on an uplink control channel, the set of feedback bits including a same number of feedback bits for each DAI of a set of DAI.

The control component 1320 may transmit a set of DCI messages scheduling a set of downlink data channels, the set of DCI messages including at least a first DCI message scheduling a first downlink data channel of a first component carrier and a second downlink data channel of a second component carrier. The feedback component 1325 may receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

The control component 1320 may transmit a set of DCI messages including a first DCI message scheduling a first downlink data channel of a first component carrier and a second downlink data channel of a second component carrier, each DCI message of the set of DCI messages including at least two DAI values. The feedback component 1325 may receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
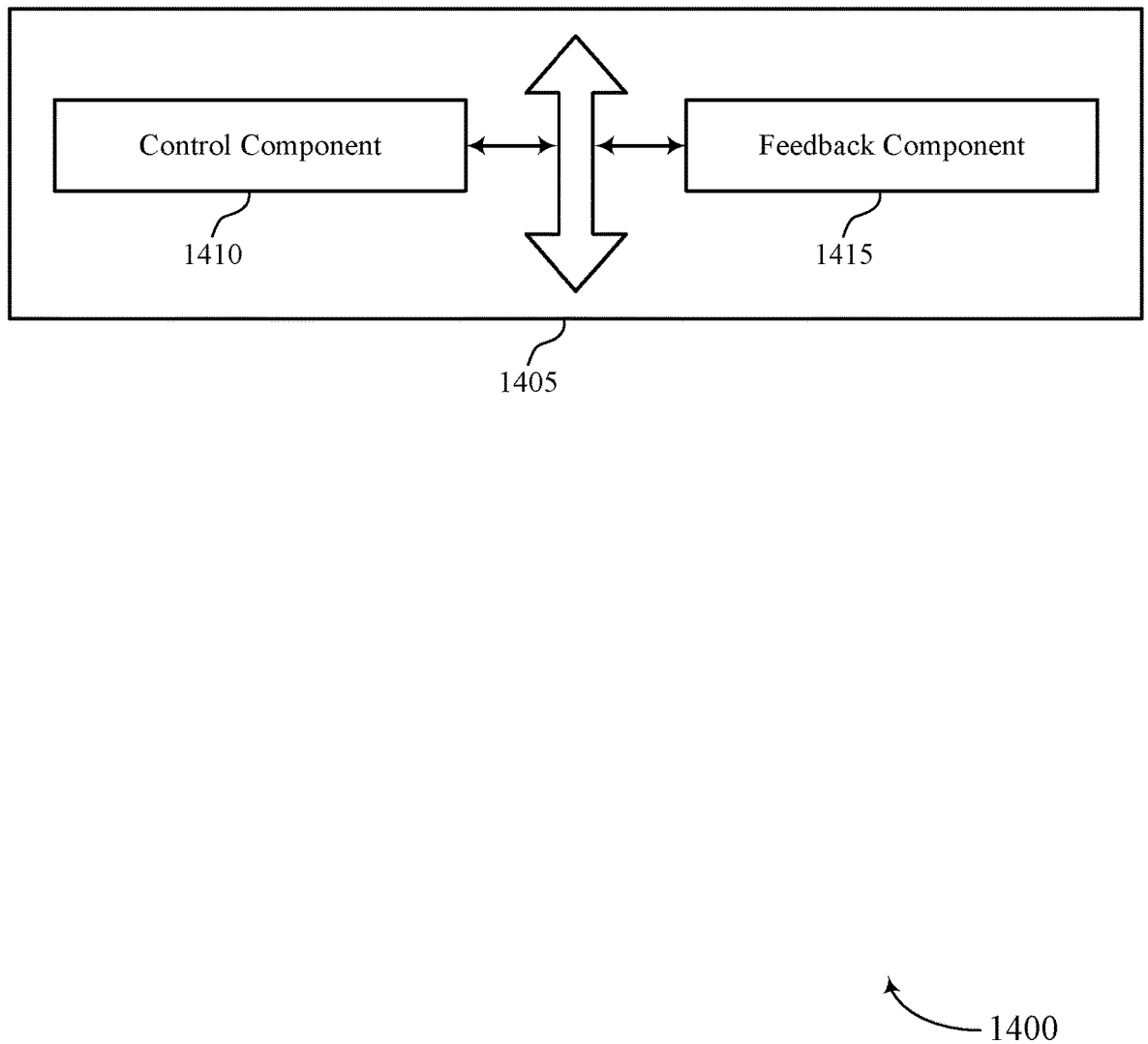
FIG. 14 shows a block diagram of a communications manager that supports DAI for multi-component carrier scheduling in accordance with aspects of the present disclosure.

FIG. 14 shows a block diagram 1400 of a base station communications manager 1405 that supports DAI for multi-component carrier scheduling in accordance with aspects of the present disclosure. The base station communications manager 1405 may be an example of aspects of a base station communications manager 1215, a base station communications manager 1315, or a base station communications manager 1510 described herein. The base station communications manager 1405 may include a control component 1410 and a feedback component 1415. Each of these components may communicate, directly or indirectly, with one another (e.g., via one or more buses).

The control component 1410 may transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. In some examples, the control component 1410 may transmit a set of DCI messages scheduling a set of downlink data channels, the set of DCI messages including at least a first DCI message scheduling a first downlink data channel of a first component carrier and a second downlink data channel of a second component carrier. In some examples, the control component 1410 may transmit a set of DCI messages including a first DCI message scheduling a first downlink data channel of a first component carrier and a second downlink data channel of a second component carrier, each DCI message of the set of DCI messages including at least two DAI values.

In some examples, the control component 1410 may determine that at least one of the first component carrier or the second component carrier are configured for a code block group-based feedback, where generating the set of feedback bits is based on the code block group-based feedback. In some cases, the first component carrier and the second component carrier are configured for a code block group-based feedback, and the generated set of feedback bits of the acknowledgement codebook is based on the code block group-based feedback. In some cases, the generated set of feedback bits of the acknowledgement codebook include a same number of feedback bits for the first component carrier and the second component carrier. In some cases, the first component carrier is configured for a code block group-based feedback and the second component carrier is not configured for the code block group-based feedback, and the generated set of feedback bits of the acknowledgement codebook is based on the code block group-based subcodebook.

In some cases, the generated set of feedback bits includes a same number of feedback bits for the first component carrier and the second component carrier based on the determining. In some cases, the first component carrier is configured for a code block group-based feedback and the second component carrier is not configured for the code block group-based feedback, where the generated set of feedback bits is based on a code block group-based sub-codebook. In some cases, the first component carrier is configured for a code block group-based feedback. In some cases, the second component carrier is not configured for a code block group-based feedback.

The feedback component 1415 may receive a generated set of feedback bits of an acknowledgement codebook on an uplink control channel, the set of feedback bits including a same number of feedback bits for each DAI of a set of DAI. In some examples, the feedback component 1415 may receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position. In some examples, the feedback component 1415 may receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

In some cases, a number of acknowledgement bits related to the generated set of feedback bits of the acknowledgement codebook is based on a multi-component carrier scheduling configuration of a UE. In some cases, a number of acknowledgement bits related to the generated set of feedback bits of the acknowledgement codebook is based on a bundling configuration related to the generated set of feedback bits of the acknowledgement codebook. In some cases, a number of acknowledgement bits related to the generated set of feedback bits of the acknowledgement codebook is based on the DCI message including at least two DAI values. In some cases, the generated set of feedback bits of the acknowledgement codebook including at least the first feedback bit corresponding to the first downlink data channel is based on the first component carrier being configured for a code block group-based feedback. In some cases, a number of acknowledgement bits related to the generated set of feedback bits of the acknowledgement codebook is based on the DCI message including at least two DAI values.

Figure 15:
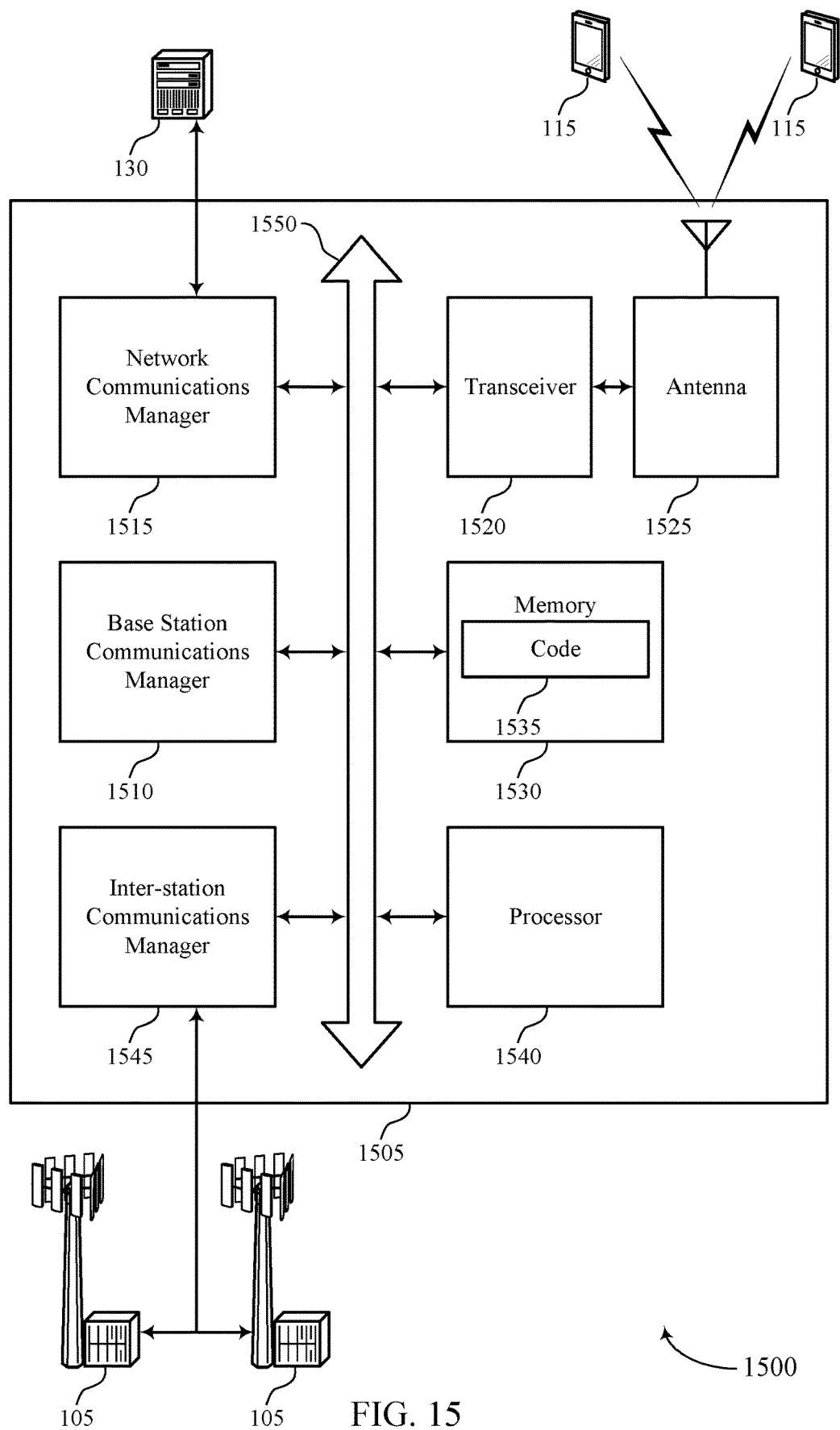
FIG. 15 shows a diagram of a system including a device that supports DAI for multi-component carrier scheduling in accordance with aspects of the present disclosure.

FIG. 15 shows a diagram of a system 1500 including a device 1505 that supports DAI for multi-component carrier scheduling in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel and receive a generated set of feedback bits of an acknowledgement codebook on an uplink control channel, the set of feedback bits including a same number of feedback bits for each DAI of a set of DAI.

The base station communications manager 1510 may also transmit a set of DCI messages scheduling a set of downlink data channels, the set of DCI messages including at least a first DCI message scheduling a first downlink data channel of a first component carrier and a second downlink data channel of a second component carrier and receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position.

The base station communications manager 1510 may also transmit a set of DCI messages including a first DCI message scheduling a first downlink data channel of a first component carrier and a second downlink data channel of a second component carrier, each DCI message of the set of DCI messages including at least two DAI values and receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases, the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting DAI for multi-component carrier scheduling).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
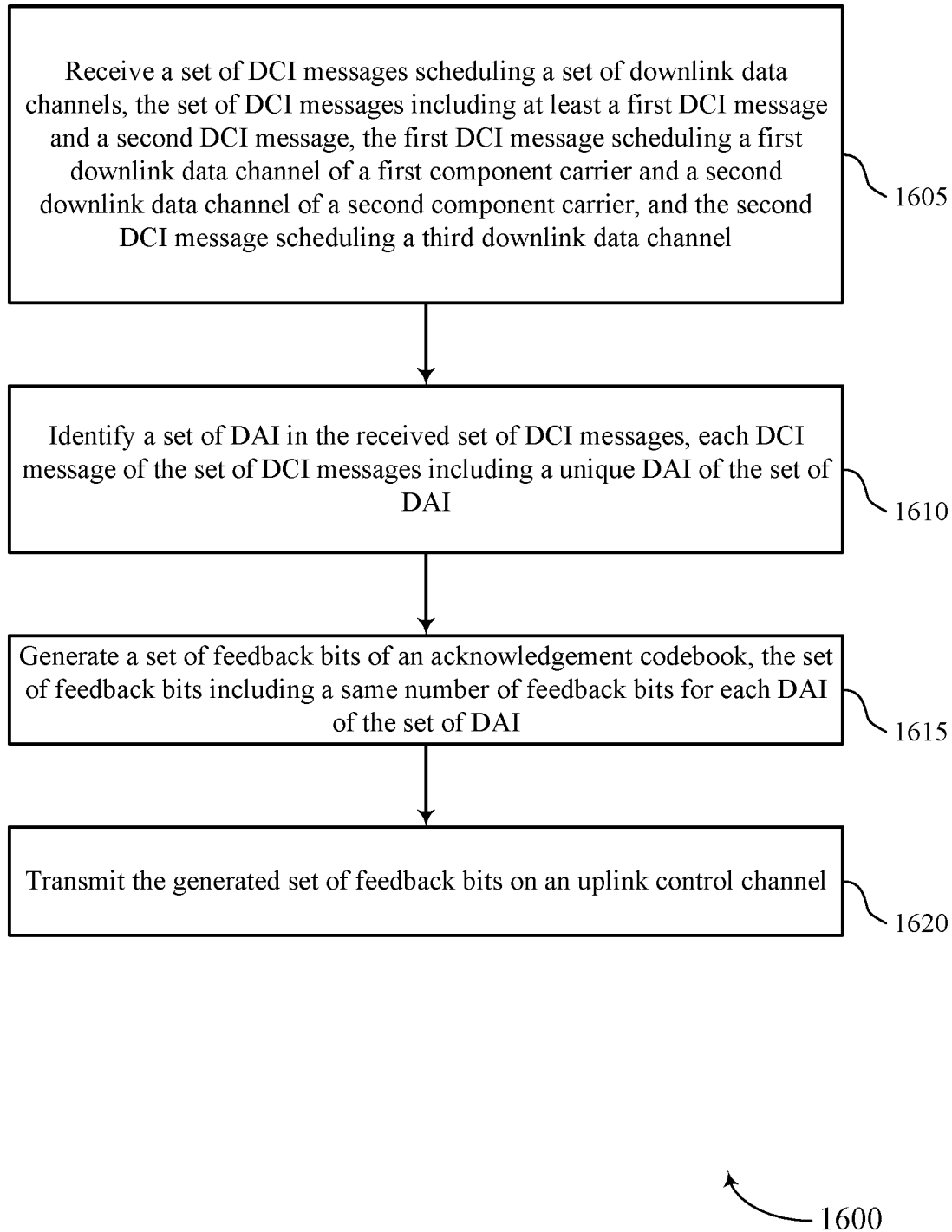
FIGS. 16 through 21 show flowcharts illustrating methods that support DAI for multi-component carrier scheduling in accordance with aspects of the present disclosure.

FIG. 16 shows a flowchart illustrating a method 1600 that supports DAI for multi-component carrier scheduling in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. The operations of 1605 may be performed according to the methods described herein. In some examples, aspects of the operations of 1605 may be performed by a control component as described with reference to FIGS. 8 through 11.

At 1610, the UE may identify a set of DAI in the received set of DCI messages, each DCI message of the set of DCI messages including a unique DAI of the set of DAI. The operations of 1610 may be performed according to the methods described herein. In some examples, aspects of the operations of 1610 may be performed by a field component as described with reference to FIGS. 8 through 11.

At 1615, the UE may generate a set of feedback bits of an acknowledgement codebook, the set of feedback bits including a same number of feedback bits for each DAI of the set of DAI. The operations of 1615 may be performed according to the methods described herein. In some examples, aspects of the operations of 1615 may be performed by a feedback component as described with reference to FIGS. 8 through 11.

At 1620, the UE may transmit the generated set of feedback bits on an uplink control channel. The operations of 1620 may be performed according to the methods described herein. In some examples, aspects of the operations of 1620 may be performed by a feedback component as described with reference to FIGS. 8 through 11.

Figure 17:
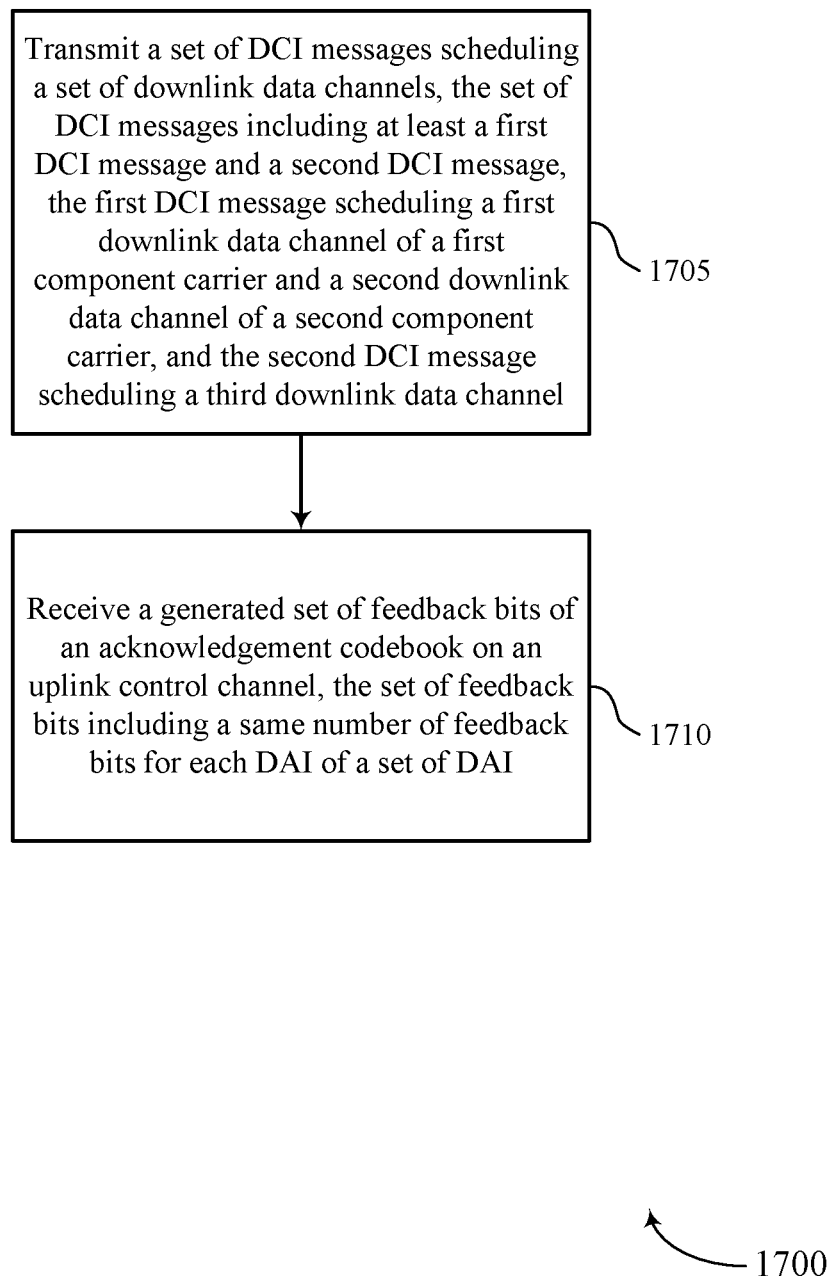

FIG. 17 shows a flowchart illustrating a method 1700 that supports DAI for multi-component carrier scheduling in accordance with aspects of the present disclosure. The operations of method 1700 may be implemented by a base station 105 or its components as described herein. For example, the operations of method 1700 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may transmit a set of DCI messages scheduling a set of downlink data channels, the set of DCI messages including at least a first DCI message and a second DCI message, the first DCI message scheduling a first downlink data channel of a first component carrier and a second downlink data channel of a second component carrier, and the second DCI message scheduling a third downlink data channel. The operations of 1705 may be performed according to the methods described herein. In some examples, aspects of the operations of 1705 may be performed by a control component as described with reference to FIGS. 12 through 15.

At 1710, the base station may receive a generated set of feedback bits of an acknowledgement codebook on an uplink control channel, the set of feedback bits including a same number of feedback bits for each DAI of a set of DAI. The operations of 1710 may be performed according to the methods described herein. In some examples, aspects of the operations of 1710 may be performed by a feedback component as described with reference to FIGS. 12 through 15.

Figure 18:
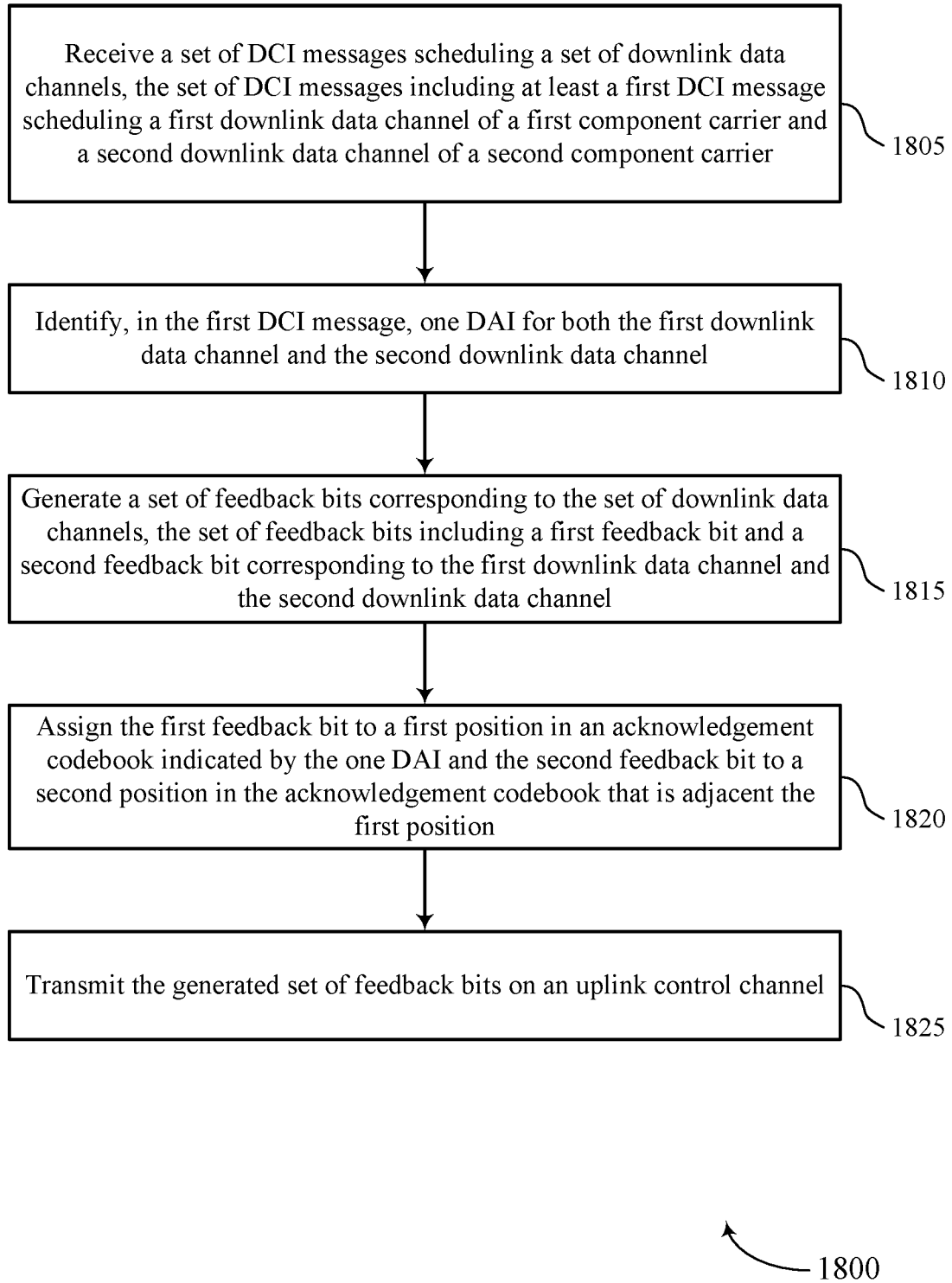

FIG. 18 shows a flowchart illustrating a method 1800 that supports DAI for multi-component carrier scheduling in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive a set of DCI messages scheduling a set of downlink data channels, the set of DCI messages including at least a first DCI message scheduling a first downlink data channel of a first component carrier and a second downlink data channel of a second component carrier. The operations of 1805 may be performed according to the methods described herein. In some examples, aspects of the operations of 1805 may be performed by a control component as described with reference to FIGS. 8 through 11.

At 1810, the UE may identify, in the first DCI message, one DAI for both the first downlink data channel and the second downlink data channel. The operations of 1810 may be performed according to the methods described herein. In some examples, aspects of the operations of 1810 may be performed by a field component as described with reference to FIGS. 8 through 11.

At 1815, the UE may generate a set of feedback bits corresponding to the set of downlink data channels, the set of feedback bits including a first feedback bit and a second feedback bit corresponding to the first downlink data channel and the second downlink data channel. The operations of 1815 may be performed according to the methods described herein. In some examples, aspects of the operations of 1815 may be performed by a feedback component as described with reference to FIGS. 8 through 11.

At 1820, the UE may assign the first feedback bit to a first position in an acknowledgement codebook indicated by the one DAI and the second feedback bit to a second position in the acknowledgement codebook that is adjacent the first position. The operations of 1820 may be performed according to the methods described herein. In some examples, aspects of the operations of 1820 may be performed by a feedback component as described with reference to FIGS. 8 through 11.

At 1825, the UE may transmit the generated set of feedback bits on an uplink control channel. The operations of 1825 may be performed according to the methods described herein. In some examples, aspects of the operations of 1825 may be performed by a feedback component as described with reference to FIGS. 8 through 11.

Figure 19:
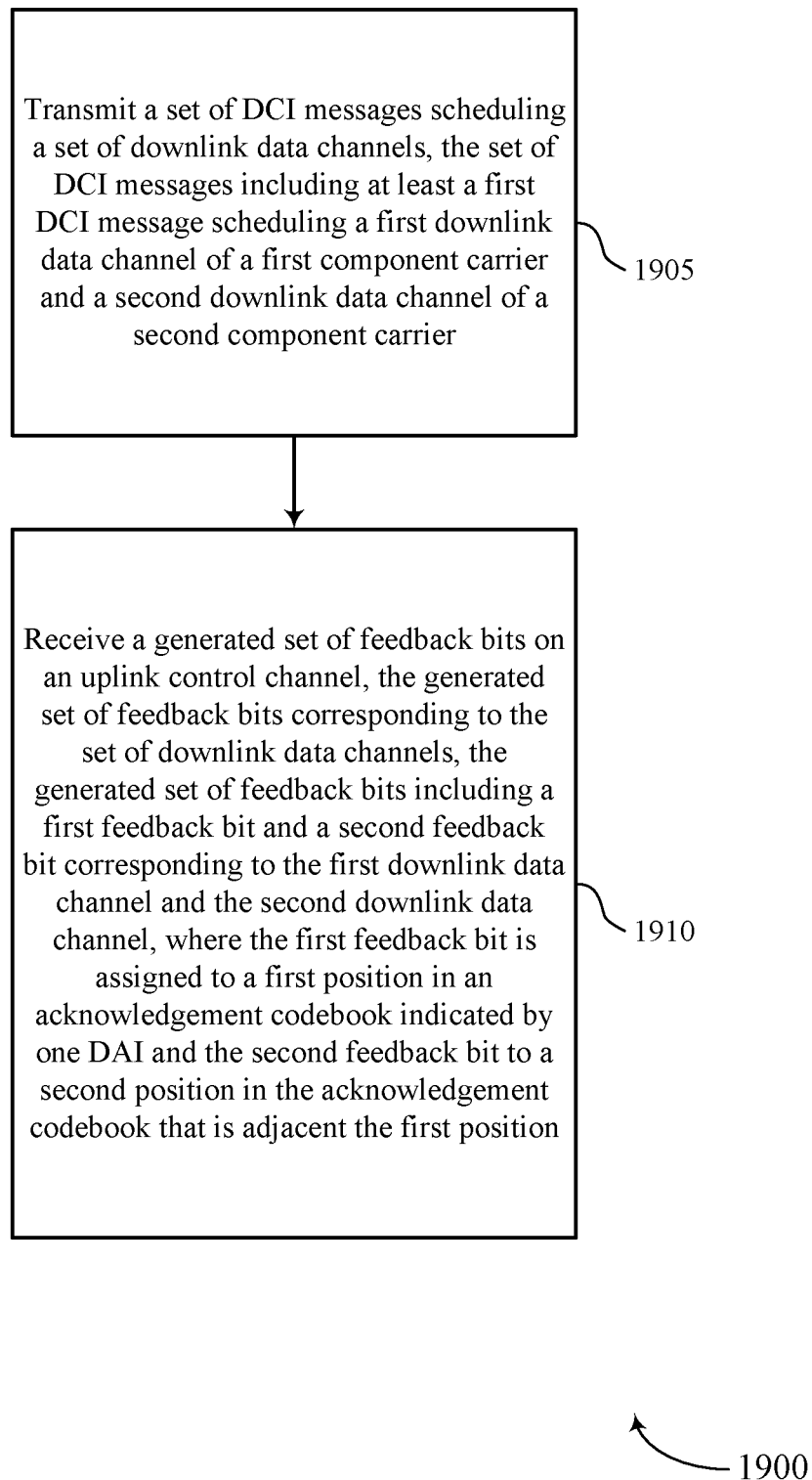

FIG. 19 shows a flowchart illustrating a method 1900 that supports DAI for multi-component carrier scheduling in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit a set of DCI messages scheduling a set of downlink data channels, the set of DCI messages including at least a first DCI message scheduling a first downlink data channel of a first component carrier and a second downlink data channel of a second component carrier. The operations of 1905 may be performed according to the methods described herein. In some examples, aspects of the operations of 1905 may be performed by a control component as described with reference to FIGS. 12 through 15.

At 1910, the base station may receive a generated set of feedback bits on an uplink control channel, the generated set of feedback bits corresponding to the set of downlink data channels, the generated set of feedback bits including a first feedback bit and a second feedback bit corresponding to the first downlink data channel and the second downlink data channel, where the first feedback bit is assigned to a first position in an acknowledgement codebook indicated by one DAI and the second feedback bit to a second position in the acknowledgement codebook that is adjacent the first position. The operations of 1910 may be performed according to the methods described herein. In some examples, aspects of the operations of 1910 may be performed by a feedback component as described with reference to FIGS. 12 through 15.

Figure 20:
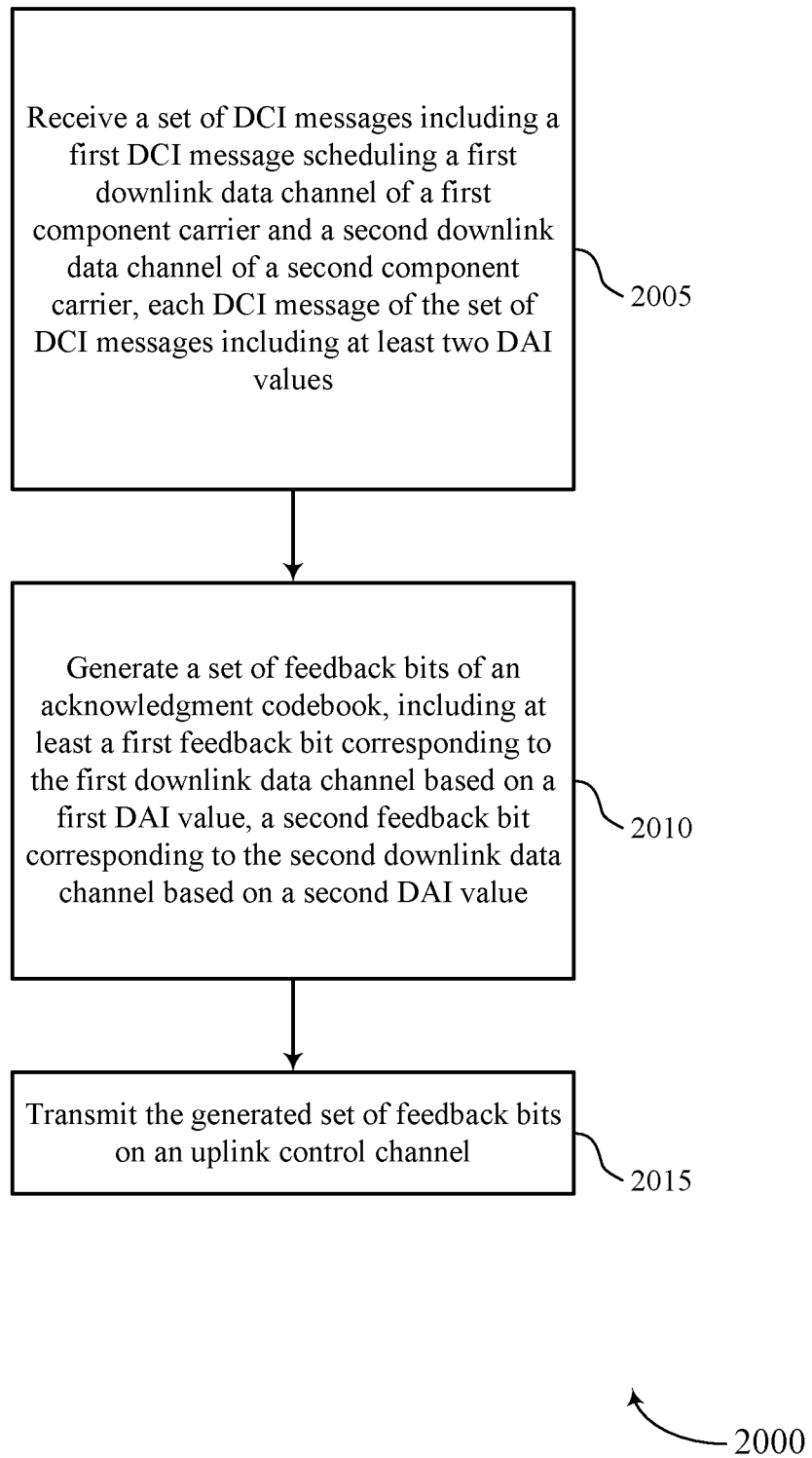

FIG. 20 shows a flowchart illustrating a method 2000 that supports DAI for multi-component carrier scheduling in accordance with aspects of the present disclosure. The operations of method 2000 may be implemented by a UE 115 or its components as described herein. For example, the operations of method 2000 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive a set of DCI messages including a first DCI message scheduling a first downlink data channel of a first component carrier and a second downlink data channel of a second component carrier, each DCI message of the set of DCI messages including at least two DAI values. The operations of 2005 may be performed according to the methods described herein. In some examples, aspects of the operations of 2005 may be performed by a control component as described with reference to FIGS. 8 through 11.

At 2010, the UE may generate a set of feedback bits of an acknowledgement codebook, including at least a first feedback bit corresponding to the first downlink data channel based on a first DAI value, a second feedback bit corresponding to the second downlink data channel based on a second DAI value. The operations of 2010 may be performed according to the methods described herein. In some examples, aspects of the operations of 2010 may be performed by a feedback component as described with reference to FIGS. 8 through 11.

At 2015, the UE may transmit the generated set of feedback bits on an uplink control channel. The operations of 2015 may be performed according to the methods described herein. In some examples, aspects of the operations of 2015 may be performed by a feedback component as described with reference to FIGS. 8 through 11.

Figure 21:
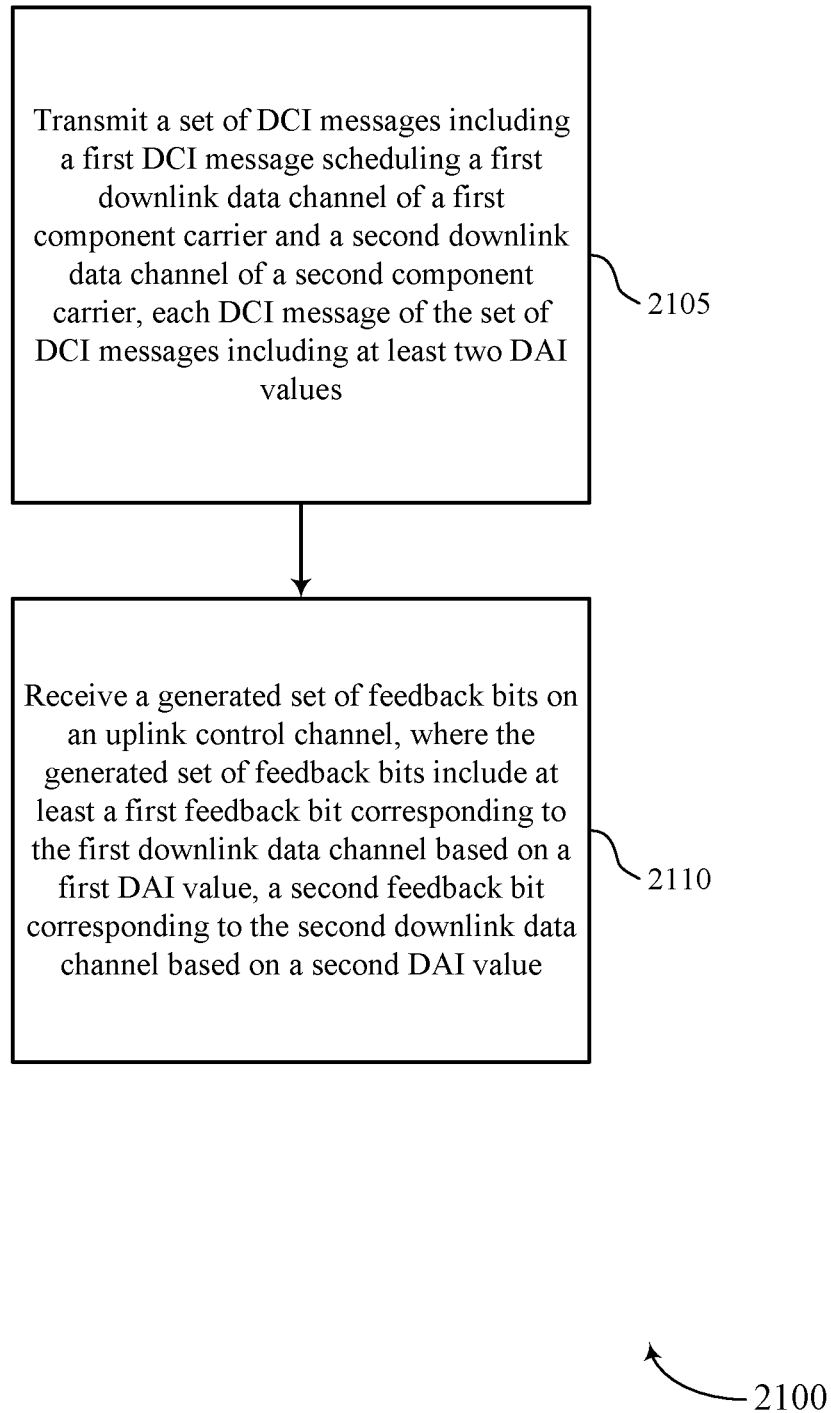

FIG. 21 shows a flowchart illustrating a method 2100 that supports DAI for multi-component carrier scheduling in accordance with aspects of the present disclosure. The operations of method 2100 may be implemented by a base station 105 or its components as described herein. For example, the operations of method 2100 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit a set of DCI messages including a first DCI message scheduling a first downlink data channel of a first component carrier and a second downlink data channel of a second component carrier, each DCI message of the set of DCI messages including at least two DAI values. The operations of 2105 may be performed according to the methods described herein. In some examples, aspects of the operations of 2105 may be performed by a control component as described with reference to FIGS. 12 through 15.

At 2110, the base station may receive a generated set of feedback bits on an uplink control channel, where the generated set of feedback bits include at least a first feedback bit corresponding to the first downlink data channel based on a first DAI value, a second feedback bit corresponding to the second downlink data channel based on a second DAI value. The operations of 2110 may be performed according to the methods described herein. In some examples, aspects of the operations of 2110 may be performed by a feedback component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel; identifying a set of downlink assignment indices in the received plurality of downlink control information messages, each downlink control information message of the plurality of downlink control information messages including a unique downlink assignment index of the set of downlink assignment indices; generating a set of feedback bits of an acknowledgement codebook, the set of feedback bits including a same number of feedback bits for each downlink assignment index of the set of downlink assignment indices; and transmitting the generated set of feedback bits on an uplink control channel.

Aspect 2: The method of aspect 1, wherein each unique downlink assignment index associated with each downlink control information message of the plurality of downlink control information messages are assigned a single value by incrementing each unique downlink assignment index.

Aspect 3: The method of any of aspects 1 through 2, further comprising: ordering the plurality of downlink control information messages based at least in part on, for each downlink control information message of the plurality of downlink control information messages, one or more component carrier indices indicated by the downlink control information message or a control channel occasion associated with the downlink control information message, or both.

Aspect 4: The method of aspect 3, wherein a corresponding value of each unique downlink assignment index of the set of downlink assignment indices for each downlink control information message of the plurality of downlink control information messages is based at least in part on the ordering of the plurality of downlink control information messages.

Aspect 5: The method of aspect 4, wherein the value of each unique downlink assignment index of the set of downlink assignment indices corresponds to one or more pairs of an accumulative number of downlink control information messages and control channel occasions associated with the number of downlink control information messages.

Aspect 6: The method of any of aspects 3 through 5, further comprising: identifying a component carrier index of the one or more component carrier indices that is greater than one or more other component carrier indices of the one or more component carrier indices, wherein ordering the plurality of downlink control information messages is based at least in part on the identified component carrier index of the one or more component carrier indices that is greater than one or more other component carrier indices of the one or more component carrier indices for each downlink control information message of the plurality of downlink control information messages.

Aspect 7: The method of any of aspects 3 through 6, further comprising: identifying a component carrier index of the one or more component carrier indices that is less than one or more other component carrier indices of the one or more component carrier indices, wherein ordering the plurality of downlink control information messages is based at least in part on the identified component carrier index of the one or more component carrier indices that is less than one or more other component carrier indices of the one or more component carrier indices for each downlink control information message of the plurality of downlink control information messages.

Aspect 8: The method of any of aspects 1 through 7, wherein generating the set of feedback bits of the acknowledgement codebook comprises: generating at least two feedback bits for each downlink assignment index of the set of downlink assignment indices in the acknowledgement codebook.

Aspect 9: The method of any of aspects 1 through 8, wherein generating the set of feedback bits of the acknowledgement codebook comprises: generating at least one feedback bit for each downlink assignment index of the set of downlink assignment indices in the acknowledgement codebook based at least in part on a bundling rule.

Aspect 10: The method of aspect 9, wherein the at least one feedback bit comprises acknowledgement information for the first downlink data channel and the second downlink data channel.

Aspect 11: The method of aspect 10, wherein the at least one feedback bit is one feedback bit based at least in part on a binary AND operation of a first bit of acknowledgement information for the first downlink data channel and a second bit of acknowledgement information for the second downlink data channel.

Aspect 12: The method of any of aspects 9 through 11, wherein the at least one feedback bit comprises acknowledgement information for the third downlink data channel.

Aspect 13: The method of any of aspects 1 through 12, further comprising: determining that at least one of the first component carrier or the second component carrier are configured for a code block group-based feedback, wherein generating the set of feedback bits of the acknowledgement codebook is based at least in part on the code block group-based feedback.

Aspect 14: The method of aspect 13, wherein generating the set of feedback bits of the acknowledgement codebook comprises: generating, for each unique downlink assignment index of the set of downlink assignment indices for each downlink control information message of the plurality of downlink control information messages, the same number of feedback bits for the first component carrier and the second component carrier based at least in part on the determining.

Aspect 15: The method of any of aspects 1 through 14, further comprising: determining that the first component carrier is configured for a code block group-based feedback and the second component carrier is not configured for the code block group-based feedback, wherein generating the set of feedback bits of the acknowledgement codebook is based at least in part on a code block group-based subcodebook.

Aspect 16: The method of any of aspects 1 through 15, wherein a number of acknowledgement bits related to the generated set of feedback bits of the acknowledgement codebook is based at least in part on a multi-component carrier scheduling configuration of the UE.

Aspect 17: The method of aspect 16, further comprising: determining a power level for the uplink control channel transmitting the generated set of feedback bits based at least in part on the number of acknowledgement bits.

Aspect 18: The method of any of aspects 1 through 17, wherein a number of acknowledgement bits related to the generated set of feedback bits of the acknowledgement codebook is based at least in part on a bundling configuration related to the generated set of feedback bits of the acknowledgement codebook.

Aspect 19: A method for wireless communication at a base station, comprising: transmitting a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel, including a set of downlink assignment indices in the transmitted plurality of downlink control information messages, each downlink control information message of the plurality of downlink control information messages including a unique downlink assignment index of the set of downlink assignment indices; and receiving a generated set of feedback bits of an acknowledgement codebook on an uplink control channel, the set of feedback bits including a same number of feedback bits for each downlink assignment index of a set of downlink assignment indices.

Aspect 20: The method of aspect 19, wherein at least one of the first component carrier or the second component carrier are configured for a code block group-based feedback, and the generated set of feedback bits of the acknowledgement codebook is based at least in part on the code block group-based feedback.

Aspect 21: The method of aspect 20, wherein the generated set of feedback bits of the acknowledgement codebook comprise a same number of feedback bits for the first component carrier and the second component carrier.

Aspect 22: The method of any of aspects 19 through 21, wherein the first component carrier is configured for a code block group-based feedback and the second component carrier is not configured for the code block group-based feedback, and the generated set of feedback bits of the acknowledgement codebook is based at least in part on the code block group-based subcodebook.

Aspect 23: The method of any of aspects 19 through 22, wherein a number of acknowledgement bits related to the generated set of feedback bits of the acknowledgement codebook is based at least in part on a multi-component carrier scheduling configuration of a UE.

Aspect 24: The method of any of aspects 19 through 23, wherein a number of acknowledgement bits related to the generated set of feedback bits of the acknowledgement codebook is based at least in part on a bundling configuration related to the generated set of feedback bits of the acknowledgement codebook.

Aspect 25: A method for wireless communication at a UE, comprising: receiving a plurality of downlink control information messages scheduling a plurality of downlink data channels, the plurality of downlink control information messages including at least a first downlink control information message scheduling a first downlink data channel of a first component carrier and a second downlink data channel of a second component carrier; identifying, in the first downlink control information message, one downlink assignment index for both the first downlink data channel and the second downlink data channel; generating a set of feedback bits corresponding to the plurality of downlink data channels, the set of feedback bits including a first feedback bit and a second feedback bit corresponding to the first downlink data channel and the second downlink data channel; assigning the first feedback bit to a first position in an acknowledgement codebook indicated by the one downlink assignment index and the second feedback bit to a second position in the acknowledgement codebook that is adjacent the first position; and transmitting the generated set of feedback bits on an uplink control channel.

Aspect 26: The method of aspect 25, further comprising: assigning a value to the one downlink assignment index, based at least in part on the first downlink control information message scheduling the first downlink data channel of the first component carrier and the second downlink data channel of the second component carrier, by incrementing a downlink assignment index count by two.

Aspect 27: The method of any of aspects 25 through 26, further comprising: assigning a value to a downlink assignment index of a second downlink control information message, based at least in part on the first downlink control information message scheduling the first downlink data channel of the first component carrier and the second downlink data channel of the second component carrier, by incrementing a downlink assignment index count by two, wherein the first downlink control information message precedes the second downlink control information message.

Aspect 28: The method of any of aspects 25 through 27, wherein receiving the plurality of downlink control information messages comprises: receiving a second downlink control information message scheduling a third downlink data channel.

Aspect 29: The method of aspect 28, further comprising: assigning a value to a second downlink assignment index for the third downlink data channel based at least in part on the second downlink control information message scheduling the third downlink data channel by incrementing a downlink assignment index count by one.

Aspect 30: The method of any of aspects 25 through 29, wherein assigning the first feedback bit to the first position in the acknowledgement codebook indicated by the one downlink assignment index and the second feedback bit to the second position in the acknowledgement codebook that is after the first position.

Aspect 31: The method of any of aspects 25 through 30, wherein assigning the first feedback bit to the first position in the acknowledgement codebook indicated by the one downlink assignment index and the second feedback bit to the second position in the acknowledgement codebook that is before the first position.

Aspect 32: The method of any of aspects 25 through 31, further comprising: ordering the plurality of downlink control information messages based at least in part on, for each downlink control information message of the plurality of downlink control information messages, one or more component carrier indices indicated by the plurality of downlink control information messages or a control channel occasion associated with the plurality downlink control information messages, or both.

Aspect 33: The method of aspect 32, wherein a corresponding value of each downlink assignment index for each downlink control information message of the plurality of downlink control information messages is based at least in part on the ordering.

Aspect 34: The method of any of aspects 32 through 33, further comprising: identifying a component carrier index of the one or more component carrier indices that is greater than one or more other component carrier indices of the one or more component carrier indices, wherein ordering the plurality of downlink control information messages is based at least in part on the identified component carrier index of the one or more component carrier indices that is greater than one or more other component carrier indices of the one or more component carrier indices for each downlink control information message of the plurality of downlink control information messages.

Aspect 35: The method of any of aspects 32 through 34, further comprising: identifying, based at least in part on the ordering, a component carrier index of the one or more component carrier indices that is less than one or more other component carrier indices of the one or more component carrier indices, wherein ordering the plurality of downlink control information messages is based at least in part on the identified component carrier index of the one or more component carrier indices that is less than one or more other component carrier indices of the one or more component carrier indices for each downlink control information message of the plurality of downlink control information messages.

Aspect 36: The method of any of aspects 25 through 35, further comprising: determining that at least one of the first component carrier or the second component carrier are configured for a code block group-based feedback, wherein generating the set of feedback bits is based at least in part on the code block group-based feedback.

Aspect 37: The method of aspect 36, wherein generating the set of feedback bits comprises: generating, for each unique downlink assignment index for each downlink control information message of the plurality of downlink control information messages, the same number of feedback bits for the first component carrier and the second component carrier based at least in part on the determining.

Aspect 38: The method of any of aspects 25 through 37, further comprising: determining that the first component carrier is configured for a code block group-based feedback and the second component carrier is not configured for a code block group-based feedback, wherein generating the set of feedback bits is based at least in part on a code block group-based subcodebook.

Aspect 39: The method of any of aspects 25 through 38, wherein a number of acknowledgement bits related to the generated set of feedback bits of the acknowledgement codebook is based at least in part on the first downlink control information message scheduling the first downlink data channel of the first component carrier and the second downlink data channel of the second component carrier.

Aspect 40: A method for wireless communication at a base station, comprising: transmitting a plurality of downlink control information messages scheduling a plurality of downlink data channels, the plurality of downlink control information messages including at least a first downlink control information message scheduling a first downlink data channel of a first component carrier and a second downlink data channel of a second component carrier; and receiving a generated set of feedback bits on an uplink control channel, the generated set of feedback bits corresponding to the plurality of downlink data channels, the generated set of feedback bits including a first feedback bit and a second feedback bit corresponding to the first downlink data channel and the second downlink data channel, wherein the first feedback bit is assigned to a first position in an acknowledgement codebook indicated by one downlink assignment index and the second feedback bit to a second position in the acknowledgement codebook that is adjacent the first position.

Aspect 41: The method of aspect 40, further comprising: determining that at least one of the first component carrier or the second component carrier are configured for a code block group-based feedback, wherein generating the set of feedback bits is based at least in part on the code block group-based feedback.

Aspect 42: The method of aspect 41, wherein the generated set of feedback bits comprises a same number of feedback bits for the first component carrier and the second component carrier based at least in part on the determining.

Aspect 43: The method of any of aspects 40 through 42, wherein the first component carrier is configured for a code block group-based feedback and the second component carrier is not configured for the code block group-based feedback, the generated set of feedback bits is based at least in part on a code block group-based subcodebook.

Aspect 44: The method of any of aspects 40 through 43, wherein a number of acknowledgement bits related to the generated set of feedback bits of the acknowledgement codebook is based at least in part on the downlink control information message comprising at least two downlink assignment index values.

Aspect 45: A method for wireless communication at a UE, comprising: receiving a set of downlink control information messages including a first downlink control information message scheduling a first downlink data channel of a first component carrier and a second downlink data channel of a second component carrier, each downlink control information message of the set of downlink control information messages comprising at least two downlink assignment index values; generating a set of feedback bits of an acknowledgement codebook, including at least a first feedback bit corresponding to the first downlink data channel based at least in part on a first downlink assignment index value, a second feedback bit corresponding to the second downlink data channel based at least in part on a second downlink assignment index value; and transmitting the generated set of feedback bits on an uplink control channel.

Aspect 46: The method of aspect 45, wherein the set of downlink control information messages further includes a second downlink control information message scheduling a third downlink data channel of a third component carrier.

Aspect 47: The method of any of aspects 45 through 46, further comprising: selecting the first downlink assignment index value from the at least two downlink assignment index values to use to generate feedback information and ignoring the second downlink assignment index value, wherein generating the set of feedback bits of the acknowledgement codebook comprises: generating the set of feedback bits of the acknowledgement codebook, including at least a third feedback bit corresponding to the third downlink data channel, based at least in part on the selected first downlink assignment index value.

Aspect 48: The method of any of aspects 45 through 47, wherein generating the set of feedback bits of the acknowledgement codebook including at least the first feedback bit corresponding to the first downlink data channel is based at least in part on the first component carrier being configured for a code block group-based feedback.

Aspect 49: The method of any of aspects 45 through 48, wherein the first component carrier is configured for a code block group-based feedback.

Aspect 50: The method of aspect 49, further comprising: generating a code block group-based feedback sub-codebook based at least in part on the selected first downlink assignment index value.

Aspect 51: The method of any of aspects 45 through 50, wherein the second component carrier is not configured for a code block group-based feedback.

Aspect 52: The method of aspect 51, further comprising: generating a transport block-based feedback sub-codebook based at least in part on a second downlink assignment index value from the at least two downlink assignment index values.

Aspect 53: The method of any of aspects 45 through 52, wherein a number of acknowledgement bits related to the generated set of feedback bits of the acknowledgement codebook is based at least in part on the first downlink control information message scheduling the first downlink data channel of the first component carrier and the second downlink data channel of the second component carrier.

Aspect 54: A method for wireless communication at a base station, comprising: transmitting a set of downlink control information messages including a first downlink control information message scheduling a first downlink data channel of a first component carrier and a second downlink data channel of a second component carrier, each downlink control information message of the set of downlink control information messages comprising at least two downlink assignment index values; and receiving a generated set of feedback bits on an uplink control channel, wherein the generated set of feedback bits include at least a first feedback bit corresponding to the first downlink data channel based at least in part on a first downlink assignment index value, a second feedback bit corresponding to the second downlink data channel based at least in part on a second downlink assignment index value.

Aspect 55: The method of aspect 54, wherein the generated set of feedback bits of the acknowledgement codebook including at least the first feedback bit corresponding to the first downlink data channel is based at least in part on the first component carrier being configured for a code block group-based feedback.

Aspect 56: The method of any of aspects 54 through 55, wherein the first component carrier is configured for a code block group-based feedback.

Aspect 57: The method of any of aspects 54 through 56, wherein the second component carrier is not configured for a code block group-based feedback.

Aspect 58: The method of any of aspects 54 through 57, wherein a number of acknowledgement bits related to the generated set of feedback bits of the acknowledgement codebook is based at least in part on the downlink control information message comprising at least two downlink assignment index values.

Aspect 59: An apparatus for wireless communication at a UE, comprising a processor; memory coupled with the processor; and instructions stored in the memory and executable by the processor to cause the apparatus to perform a method of any of aspects 1 through 18.

Aspect 60: An apparatus for wireless communication at a UE, comprising at least one means for performing a method of any of aspects 1 through 18.

Aspect 61: A non-transitory computer-readable medium storing code for wireless communication at a UE, the code comprising instructions executable by a processor to perform a method of any of aspects 1 through 18.

Aspect 62: An apparatus for wireless communication at a base station, comprising a processor; memory coupled with the processor; and instructions stored in the memory and executable by the processor to cause the apparatus to perform a method of any of aspects 19 through 24.

Aspect 63: An apparatus for wireless communication at a base station, comprising at least one means for performing a method of any of aspects 19 through 24.

Aspect 64: A non-transitory computer-readable medium storing code for wireless communication at a base station, the code comprising instructions executable by a processor to perform a method of any of aspects 19 through 24.

Aspect 65: An apparatus for wireless communication at a UE, comprising a processor; memory coupled with the processor; and instructions stored in the memory and executable by the processor to cause the apparatus to perform a method of any of aspects 25 through 39.

Aspect 66: An apparatus for wireless communication at a UE, comprising at least one means for performing a method of any of aspects 25 through 39.

Aspect 67: A non-transitory computer-readable medium storing code for wireless communication at a UE, the code comprising instructions executable by a processor to perform a method of any of aspects 25 through 39.

Aspect 68: An apparatus for wireless communication at a base station, comprising a processor; memory coupled with the processor; and instructions stored in the memory and executable by the processor to cause the apparatus to perform a method of any of aspects 40 through 44.

Aspect 69: An apparatus for wireless communication at a base station, comprising at least one means for performing a method of any of aspects 40 through 44.

Aspect 70: A non-transitory computer-readable medium storing code for wireless communication at a base station, the code comprising instructions executable by a processor to perform a method of any of aspects 40 through 44.

Aspect 71: An apparatus for wireless communication at a UE, comprising a processor; memory coupled with the processor; and instructions stored in the memory and executable by the processor to cause the apparatus to perform a method of any of aspects 45 through 53.

Aspect 72: An apparatus for wireless communication at a UE, comprising at least one means for performing a method of any of aspects 45 through 53.

Aspect 73: A non-transitory computer-readable medium storing code for wireless communication at a UE, the code comprising instructions executable by a processor to perform a method of any of aspects 45 through 53.

Aspect 74: An apparatus for wireless communication at a base station, comprising a processor; memory coupled with the processor; and instructions stored in the memory and executable by the processor to cause the apparatus to perform a method of any of aspects 54 through 58.

Aspect 75: An apparatus for wireless communication at a base station, comprising at least one means for performing a method of any of aspects 54 through 58.

Aspect 76: A non-transitory computer-readable medium storing code for wireless communication at a base station, the code comprising instructions executable by a processor to perform a method of any of aspects 54 through 58.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel;
identifying a set of downlink assignment indices in the received plurality of downlink control information messages, each downlink control information message of the plurality of downlink control information messages including a unique downlink assignment index of the set of downlink assignment indices;
generating a set of feedback bits of an acknowledgement codebook, the set of feedback bits including a same number of feedback bits for each downlink assignment index of the set of downlink assignment indices, wherein the set of feedback bits are ordered within the acknowledgement codebook based at least in part on a control channel occasion associated with each respective downlink control information message of the plurality of downlink control information messages; and
transmitting the generated set of feedback bits on an uplink control channel.

2. The method of claim 1, wherein
each unique downlink assignment index associated with each downlink control information message of the plurality of downlink control information messages are assigned a single value by incrementing each unique downlink assignment index.

3. The method of claim 1, wherein a corresponding value of each unique downlink assignment index of the set of downlink assignment indices for each downlink control information message of the plurality of downlink control information messages is based at least in part on the ordering of the set of feedback bits.

4. The method of claim 3, wherein the value of each unique downlink assignment index of the set of downlink assignment indices corresponds to one or more pairs of an accumulative number of downlink control information messages and control channel occasions associated with the accumulative number of downlink control information messages.

5. The method of claim 1, further comprising:
identifying a component carrier index of one or more component carrier indices that is greater than one or more other component carrier indices of the one or more component carrier indices, wherein ordering the set of feedback bits is based at least in part on the identified component carrier index of the one or more component carrier indices that is greater than one or more other component carrier indices of the one or more component carrier indices for each downlink control information message of the plurality of downlink control information messages.

6. The method of claim 1, further comprising:
identifying a component carrier index of one or more component carrier indices that is less than one or more other component carrier indices of the one or more component carrier indices, wherein ordering the set of feedback bits is based at least in part on the identified component carrier index of the one or more component carrier indices that is less than one or more other component carrier indices of the one or more component carrier indices for each downlink control information message of the plurality of downlink control information messages.

7. The method of claim 1, wherein generating the set of feedback bits of the acknowledgement codebook comprises:
generating at least two feedback bits for each downlink assignment index of the set of downlink assignment indices in the acknowledgement codebook.

8. The method of claim 7, wherein the at least two feedback bits for a first downlink assignment index of the set of downlink assignment indices includes one feedback bit for the first downlink data channel and one feedback bit for the second downlink data channel.

9. The method of claim 7, wherein the at least two feedback bits for a second downlink assignment index of the set of downlink assignment indices includes one feedback bit for the third downlink data channel and one non-acknowledgement (NACK) bit.

10. The method of claim 1, wherein generating the set of feedback bits of the acknowledgement codebook comprises:
generating at least one feedback bit for each downlink assignment index of the set of downlink assignment indices in the acknowledgement codebook based at least in part on a bundling rule.

11. The method of claim 10, wherein the at least one feedback bit comprises acknowledgement information for the first downlink data channel and the second downlink data channel.

12. The method of claim 11, wherein the at least one feedback bit is one feedback bit based at least in part on a binary AND operation of a first bit of acknowledgement information for the first downlink data channel and a second bit of acknowledgement information for the second downlink data channel.

13. The method of claim 10, wherein the at least one feedback bit comprises acknowledgement information for the third downlink data channel.

14. The method of claim 1, further comprising:
determining that at least one of the first component carrier or the second component carrier are configured for a code block group-based feedback,
wherein generating the set of feedback bits of the acknowledgement codebook is based at least in part on the code block group-based feedback.

15. The method of claim 14, wherein generating the set of feedback bits of the acknowledgement codebook comprises:
generating, for each unique downlink assignment index of the set of downlink assignment indices for each downlink control information message of the plurality of downlink control information messages, a same number of feedback bits for the first component carrier and the second component carrier based at least in part on the determining.

16. The method of claim 14, further comprising:
determining that the first component carrier is configured for a code block group-based feedback and the second component carrier is not configured for the code block group-based feedback,
wherein generating the set of feedback bits of the acknowledgement codebook is based at least in part on a code block group-based subcodebook.

17. The method of claim 1, wherein a number of acknowledgement bits related to the generated set of feedback bits of the acknowledgement codebook is based at least in part on a multi-component carrier scheduling configuration of the UE.

18. The method of claim 17, further comprising:
determining a power level for the uplink control channel transmitting the generated set of feedback bits based at least in part on the number of acknowledgement bits.

19. The method of claim 1, wherein a number of acknowledgement bits related to the generated set of feedback bits of the acknowledgement codebook is based at least in part on a bundling configuration related to the generated set of feedback bits of the acknowledgement codebook.

20. A method for wireless communication at a base station, comprising:
transmitting a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel, including a set of downlink assignment indices in the plurality of downlink control information messages, each downlink control information message of the plurality of downlink control information messages including a unique downlink assignment index of the set of downlink assignment indices; and
receiving a set of feedback bits of an acknowledgement codebook on an uplink control channel, the set of feedback bits including a same number of feedback bits for each downlink assignment index of the set of downlink assignment indices, wherein the set of feedback bits are ordered within the acknowledgement codebook based at least in part on a control channel occasion associated with each respective downlink control information message of the plurality of downlink control information messages.

21. The method of claim 20, wherein at least one of the first component carrier or the second component carrier are configured for a code block group-based feedback, and the set of feedback bits of the acknowledgement codebook is based at least in part on the code block group-based feedback.

22. The method of claim 21, wherein the set of feedback bits of the acknowledgement codebook comprise a same number of feedback bits for the first component carrier and the second component carrier.

23. The method of claim 20, wherein the first component carrier is configured for a code block group-based feedback and the second component carrier is not configured for the code block group-based feedback, and the set of feedback bits of the acknowledgement codebook is based at least in part on the code block group-based feedback.

24. The method of claim 20, wherein a number of acknowledgement bits related to the set of feedback bits of the acknowledgement codebook is based at least in part on a multi-component carrier scheduling configuration of a user equipment (UE).

25. The method of claim 20, wherein a number of acknowledgement bits related to the set of feedback bits of the acknowledgement codebook is based at least in part on a bundling configuration related to the set of feedback bits of the acknowledgement codebook.

26. An apparatus for wireless communication, comprising:
one or more processors,
memory coupled with the one or more processors; and
instructions stored in the memory and executable by the one or more processors to cause the apparatus to:
receive a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel;

identify a set of downlink assignment indices in the received plurality of downlink control information messages, each downlink control information message of the plurality of downlink control information messages including a unique downlink assignment index of the set of downlink assignment indices;

generate a set of feedback bits of an acknowledgement codebook, the set of feedback bits including a same number of feedback bits for each downlink assignment index of the set of downlink assignment indices, wherein the set of feedback bits are ordered within the acknowledgement codebook based at least in part on a control channel occasion associated with each respective downlink control information message of the plurality of downlink control information messages; and transmit the generated set of feedback bits on an uplink control channel.

27. The apparatus of claim 26, wherein each unique downlink assignment index associated with each downlink control information message of the plurality of downlink control information messages are assigned a single value by incrementing each unique downlink assignment index.

28. An apparatus for wireless communication, comprising:
one or more processors,
memory coupled with the one or more processors; and
instructions stored in the memory and executable by the one or more processors to cause the apparatus to:
transmit a plurality of downlink control information messages scheduling a plurality of downlink data channels, the plurality of downlink control information messages including at least a first downlink control information message and a second downlink control information message, the first downlink control information message scheduling a first downlink data channel of a first component carrier and a second downlink data channel of a second component carrier, and the second downlink control information message scheduling a third downlink data channel, including a set of downlink assignment indices in the plurality of downlink control information messages, each downlink control information message of the plurality of downlink control information messages including a unique downlink assignment index of the set of downlink assignment indices; and receive a set of feedback bits of an acknowledgement codebook on an uplink control channel, the set of feedback bits including a same number of feedback bits for each downlink assignment index of the set of downlink assignment indices, wherein the set of feedback bits are ordered within the acknowledgement codebook based at least in part on a control channel occasion associated with each respective downlink control information message of the plurality of downlink control information messages.

29. The apparatus of claim 28, wherein at least one of the first component carrier or the second component carrier are configured for a code block group-based feedback, and the set of feedback bits of the acknowledgement codebook is based at least in part on the code block group-based feedback, wherein the set of feedback bits of the acknowledgement codebook comprise a same number of feedback bits for the first component carrier and the second component carrier.

* * * * *